(12) United States Patent
Zhan et al.

(10) Patent No.: US 12,466,644 B2
(45) Date of Patent: Nov. 11, 2025

(54) GOODS BOX TAKE-OUT MECHANISM, DEVICE, AND METHOD, AND TRANSPORT ROBOT

(71) Applicant: HAI ROBOTICS CO., LTD., Guangdong (CN)

(72) Inventors: Qingxin Zhan, Guangdong (CN); Zhe Kong, Guangdong (CN)

(73) Assignee: HAI ROBOTICS CO., LTD., Guangdong (CN)

(*) Notice: Subject to any disclaimer, the term of this patent is extended or adjusted under 35 U.S.C. 154(b) by 553 days.

(21) Appl. No.: 18/054,257

(22) Filed: Nov. 10, 2022

(65) Prior Publication Data
US 2023/0066277 A1 Mar. 2, 2023

Related U.S. Application Data

(63) Continuation of application No. PCT/CN2021/092383, filed on May 8, 2021.

(30) Foreign Application Priority Data

May 12, 2020 (CN) .......................... 202010398662.4
May 12, 2020 (CN) .......................... 202010398778.8
(Continued)

(51) Int. Cl.
*B65G 1/04* (2006.01)
*B25J 5/00* (2006.01)
(Continued)

(52) U.S. Cl.
CPC ............ *B65G 1/0421* (2013.01); *B25J 5/007* (2013.01); *B25J 9/0009* (2013.01); *B25J 15/0616* (2013.01)

(58) Field of Classification Search
CPC .. B65G 1/0421; B65G 1/0435; B25J 15/0014; B25J 9/023; B25J 15/0616; B25J 9/0009; B25J 5/007
See application file for complete search history.

(56) References Cited

U.S. PATENT DOCUMENTS

| 3,820,667 | A | 6/1974 | Critchlow et al. |
| 11,767,181 | B2 * | 9/2023 | Lei .................. G05B 19/40935 414/792.9 |

(Continued)

FOREIGN PATENT DOCUMENTS

| CN | 101318589 A | 12/2008 |
| CN | 104590884 A | 5/2015 |

(Continued)

OTHER PUBLICATIONS

First Office Action of CN202211261748.8.
The Second Office Action of CN202211261748.8.
International Search Report for PCT/CN2021/092383.

*Primary Examiner* — Ramya P Burgess
(74) *Attorney, Agent, or Firm* — Frank Gao, Esq.

(57) ABSTRACT

The embodiments of this application provide a goods box take-out mechanism, device, and method, and a transport robot, belong to the field of transport robot technologies, and are intended to resolve the problem of wasting part of storage space of the warehouse when the current transport robots are used to carry goods boxes. The goods box take-out device includes a take-out assembly that is connected to a front surface of a to-be-transferred goods box and that can take out the goods box from a warehousing shelving unit. Since the take-out assembly is connected to the front surface of the to-be-transferred goods box, there is no need to reserve space below, above, or on left and right sides of the goods box for insertion and movement of the take-out assembly. Therefore, the storage space of the warehouse is (Continued)

fully utilized, and the storage density of the warehouse is improved.

10 Claims, 60 Drawing Sheets

(30) Foreign Application Priority Data

May 12, 2020 (CN) .......................... 202010399452.7
May 12, 2020 (CN) .......................... 202020778803.0
May 12, 2020 (CN) .......................... 202020780272.9

(51) Int. Cl.
*B25J 9/00* (2006.01)
*B25J 15/06* (2006.01)

(56) References Cited

U.S. PATENT DOCUMENTS

| | | | | |
|---|---|---|---|---|
| 2012/0128454 | A1* | 5/2012 | Hayduchok | B65G 1/065 |
| | | | | 414/273 |
| 2016/0247702 | A1 | 8/2016 | Adachi et al. | |
| 2016/0304280 | A1 | 10/2016 | Elazary et al. | |
| 2018/0057283 | A1 | 3/2018 | Peters et al. | |
| 2018/0229987 | A1 | 8/2018 | Kaup | |
| 2022/0219902 | A1* | 7/2022 | Zheng | G05D 1/0246 |

FOREIGN PATENT DOCUMENTS

| | | |
|---|---|---|
| CN | 106081453 A | 11/2016 |
| CN | 106241161 A | 12/2016 |
| CN | 106477349 A | 3/2017 |
| CN | 206068642 U | 4/2017 |
| CN | 107117561 A | 9/2017 |
| CN | 107618801 A | 1/2018 |
| CN | 206970149 U | 2/2018 |
| CN | 108217038 A | 6/2018 |
| CN | 208516470 U | 2/2019 |
| CN | 212558399 U | 2/2019 |
| CN | 109534237 A | 3/2019 |
| CN | 208603140 U | 3/2019 |
| CN | 208603336 U | 3/2019 |
| CN | 109650061 A | 4/2019 |
| CN | 109795832 A | 5/2019 |
| CN | 208882647 U | 5/2019 |
| CN | 109941652 A | 6/2019 |
| CN | 109941653 A | 6/2019 |
| CN | 208948349 U | 6/2019 |
| CN | 109969669 A | 7/2019 |
| CN | 109969670 A | 7/2019 |
| CN | 109997108 A | 7/2019 |
| CN | 110065761 A | 7/2019 |
| CN | 209192822 U | 8/2019 |
| CN | 209442068 U | 9/2019 |
| CN | 110342167 A | 10/2019 |
| CN | 209455443 U | 10/2019 |
| CN | 209522153 U | 10/2019 |
| CN | 110498172 A | 11/2019 |
| CN | 110803442 A | 2/2020 |
| CN | 110919623 A | 3/2020 |
| CN | 212402315 U | 1/2021 |
| DE | 4112830 A1 | 10/1992 |
| JP | S5830608 U | 2/1983 |
| JP | H09235004 A | 9/1997 |
| JP | 2003081443 A | 3/2003 |

* cited by examiner

GOODS BOX TAKE-OUT MECHANISM, DEVICE, AND METHOD, AND TRANSPORT ROBOT

CROSS-REFERENCE TO RELATED APPLICATIONS

This application is a continuation of international patent application No. PCT/CN2021/092383 filed on May 8, 2021, which claims priorities to Chinese Patent Application No. 202010398662.4, filed on May 12, 2020; Chinese Patent Application No. 202010399452.7, filed on May 12, 2020; Chinese Patent Application No. 202010398778.8, filed on May 12, 2020; Chinese Patent Application No. 202020778803.0, filed on May 12, 2020; and Chinese Patent Application No. 202020780272.9, filed on May 12, 2020, the entire contents of which are incorporated by reference in this application.

TECHNICAL FIELD

This application relates to the field of warehousing and logistics technologies, and in particular, to a goods box take-out mechanism, device, and method, and a transport robot.

BACKGROUND

With the development of the logistics industry, transport robots are gradually applied to the goods box carrying work, which can improve the efficiency of carrying goods boxes. Therefore, transport robots have become a research hotspot in the logistics industry.

Transport robots may be divided into a gripping transport robot or a lifting transport robot according to a manner of taking out goods boxes by gripping arms of the transport robots. Two gripping arms of a gripping robot are gripped on both sides of a goods box. Therefore, space for the insertion of the gripping arms and space for the two gripping arms to move toward each other need to be reserved between two adjacent goods boxes, which wastes the storage space in the horizontal direction of the warehouse. A fork of a lifting transport robot is inserted into a bottom of a goods box, which requires space reserved between the bottom of the goods box and the shelving unit for the insertion of the fork. In addition, space above the to-be-transferred goods box also needs to be reserved for the movement of the goods box, which wastes the storage space in the height direction of the warehouse.

In other words, when the current transport robots are used to carry goods boxes, large operating space needs to be reserved, which wastes part of storage space of the warehouse and reduces the storage density of the warehouse.

SUMMARY

To resolve the foregoing technical problems, the embodiments of this application provide a goods box take-out device and method, and a transport robot, which are used to reduce the operation space for the transport robot when carrying goods boxes, thereby fully utilizing the storage space of the warehouse and improving the storage density of the warehouse.

To resolve the foregoing technical problems, the embodiments of this application provide the following technical solutions:

According to a first aspect, this application provides a goods box take-out device, including: a pedestal, a transmission mechanism, and a take-out assembly, where the take-out assembly is configured to be connected to a front surface of a to-be-transferred goods box to transfer the goods box; the transmission mechanism includes a fixed wheel assembly, a movable wheel assembly, and a transmission belt, and the fixed wheel assembly includes at least two fixed wheels mounted apart on the pedestal; the movable wheel assembly includes a sliding seat slidably mounted on the pedestal and at least two movable wheels mounted apart on the sliding seat; and along a moving direction of the sliding seat toward the goods box, the sliding seat is provided with a first limiting structure at a front end of the sliding seat, and a rear end of the sliding seat is connected to a reset mechanism; and the take-out assembly is disposed on the transmission belt; the transmission belt is wound around each of the movable wheels and each of the fixed wheels; when the take-out assembly is driven by the transmission belt to move toward the goods box and move to the first limiting structure, the transmission belt drives the take-out assembly and the movable wheel assembly to move toward the goods box together; and when the transmission belt is driven in an opposite direction, the reset mechanism is configured to reset the movable wheel assembly, and after the movable wheel assembly is reset, the transmission belt drives the take-out assembly to reset.

According to a second aspect, an embodiment of this application provides a transport robot, including: a robot body and a goods box take-out device, where the goods box take-out device is mounted on the robot body.

According to a third aspect, an embodiment of this application provides a goods box take-out method using the transport robot, where the transport robot includes a goods box take-out device; the goods box take-out device includes a pedestal, a transmission mechanism, and a take-out assembly; the take-out assembly is configured to be connected to a front surface of a to-be-transferred goods box to transfer the goods box; the transmission mechanism includes a fixed wheel assembly, a movable wheel assembly, and a transmission belt; the movable wheel assembly includes a sliding seat slidably mounted on the pedestal; along a moving direction of the sliding seat toward the goods box, the sliding seat is provided with a first limiting structure at a front end of the sliding seat, and a rear end of the sliding seat is connected to a reset mechanism; and the method includes the following steps:

the transport robot with the goods box take-out device moving to be in front of a warehousing shelving unit where the to-be-transferred goods box is located;
  driving, by using the transmission mechanism, the take-out assembly to move toward the front surface of the goods box;
  driving, by the transmission mechanism when the take-out assembly moves to the first limiting structure, the movable wheel assembly and the take-out assembly to move toward the front surface of the goods box together;
  connecting, after the take-out assembly is in contact with the front surface of the goods box, the take-out assembly to the front surface of the to-be-transferred goods box to transfer the goods box;
  driving, by the reset mechanism when the transmission mechanism drives the take-out assembly to move in an opposite direction, the movable wheel assembly to reset; and continuously driving, by the transmission mechanism after the movable wheel assembly is reset, the take-out assembly to move in the opposite direction and reset.

According to a fourth aspect, an embodiment of this application provides a transport robot, including: a pedestal, a tray assembly, a take-out assembly, and a transmission mechanism, where the tray assembly and the transmission mechanism are mounted on the pedestal; the tray assembly includes a tray, a tension generating mechanism, and a first limiting structure; the tray is slidably mounted on the pedestal; the first limiting structure is disposed at a rear end of the tray; the tension generating mechanism is connected to the tray; the transmission mechanism is connected to the take-out assembly; and the transmission mechanism is configured to drive the take-out assembly to reciprocate relative to the pedestal; and when the take-out assembly moves toward a warehousing shelving unit, the tray moves toward a goods box under the tension of the tension generating mechanism and abuts against the warehousing shelving unit; and when the take-out assembly moves in a direction away from the warehousing shelving unit, the take-out assembly abuts against the first limiting structure and drives the tray to reset together.

According to a fifth aspect, an embodiment of this application provides a method for transferring a goods box using the transport robot, where the transport robot includes a pedestal, a tray assembly, a take-out assembly, and a transmission mechanism; the tray assembly includes a tray, a tension generating mechanism, and a first limiting structure; the tray is slidably mounted on the pedestal; the first limiting structure is disposed at a rear end of the tray; and the tension generating mechanism is connected to the tray; the transmission mechanism includes a fixed wheel assembly, a movable wheel assembly, and a transmission belt; the movable wheel assembly includes a sliding seat and a second limiting structure mounted at a front end of the sliding seat; the transmission belt is wound around movable wheels in the movable wheel assembly and fixed wheels in the fixed wheel assembly; the transmission belt is connected to the take-out assembly; and the method includes the following steps:

the transport robot moving to be in front of a warehousing shelving unit where a to-be-transferred goods box is located;

driving, by using the transmission mechanism, the take-out assembly to move toward the goods box, where the tray moves toward the goods box under the tension of the tension generating mechanism and abuts against the warehousing shelving unit;

driving, by the transmission mechanism when the take-out assembly moves to the second limiting structure, the movable wheel assembly and the take-out assembly to move toward the goods box together;

connecting, after the take-out assembly is in contact with the goods box, the take-out assembly to the to-be-transferred goods box to transfer the goods box;

driving, by the reset mechanism when the transmission mechanism drives the take-out assembly to move in an opposite direction, the movable wheel assembly to reset; and continuously driving, by the transmission mechanism when the take-out assembly moves to the first limiting structure, the tray and the take-out assembly to move in the opposite direction and reset.

According to a sixth aspect, a transport robot provided in the embodiments of this application includes: a movable base, a robot rack, a support beam, a goods box take-out mechanism, and a driving device, where the robot rack is mounted on the movable base; the support beam is mounted on the robot rack and capable of moving up and down relative to the robot rack; and the goods box take-out mechanism is pivotally mounted on the support beam, and the goods box take-out mechanism is configured to be connected to a front surface of a to-be-transferred goods box to transfer the to-be-transferred goods box; the driving device is mounted on the support beam and connected to the goods box take-out mechanism, and the driving device is configured to drive the goods box take-out mechanism to rotate, so that the goods box take-out mechanism is located above or below the support beam.

According to a seventh aspect, a goods box take-out method provided in the embodiments of this application includes the following steps: driving a transport robot to move to be in front of a warehousing shelving unit where a to-be-transferred goods box is located;

selectively moving a goods box take-out mechanism up and down according to a height of the to-be-transferred goods box, and driving the goods box take-out mechanism to rotate, so that the goods box take-out mechanism is located above or below a support beam, and a height of the goods box take-out mechanism is consistent with a position of the to-be-transferred goods box; and connecting the goods box take-out mechanism to a front surface of the to-be-transferred goods box to transfer the to-be-transferred goods box.

According to an eighth aspect, a goods box take-out device provided in this application is mounted on a support beam of a rack and includes a goods box take-out mechanism and a driving device, where the goods box take-out mechanism is pivotally mounted on the support beam, and the goods box take-out mechanism is configured to be connected to a front surface of a to-be-transferred goods box to transfer the to-be-transferred goods box; the driving device is mounted on the support beam and connected to the goods box take-out mechanism, and the driving device is configured to drive the goods box take-out mechanism to rotate, so that the goods box take-out mechanism is located above or below the support beam; and the goods box take-out mechanism includes a take-out assembly, and a first tray and a second tray disposed oppositely and located on two sides of the take-out assembly, and the first tray and the second tray are configured to carry the to-be-transferred goods box taken out by the take-out assembly.

According to a ninth aspect, a transport robot provided in the embodiments of this application includes: a movable base, a robot rack, a support beam, and a goods box take-out mechanism, where the movable base is configured to move on the floor of a warehousing area; the robot rack is mounted on the movable base; the support beam is mounted on the robot rack and capable of moving up and down relative to the robot rack; and the goods box take-out mechanism includes a mounting frame, a rotary assembly, a transmission assembly, and a take-out assembly; and the take-out assembly is mounted above the transmission assembly; the transmission assembly is mounted on the rotary assembly; the rotary assembly is mounted on the mounting frame; the mounting frame is mounted on the support beam; the rotary assembly is configured to drive the transmission assembly and the take-out assembly to rotate in a plane perpendicular to a lifting direction of the support beam; and the transmission assembly is configured to drive the take-out assembly to move toward or away from a front surface of a to-be-transferred goods box; and the take-out assembly is configured to be connected to the front surface of the to-be-transferred goods box to transfer the to-be-transferred goods box.

According to a tenth aspect, a transport robot provided in the embodiments of this application includes: a movable base, a robot rack, a support beam, and a goods box take-out mechanism, where the movable base is configured to move on the floor of a warehousing area; the robot rack is mounted on the movable base; the support beam is mounted on the robot rack and capable of moving up and down relative to the robot rack; and the goods box take-out mechanism includes a mounting frame, a rotary assembly, a transmission assembly, and a take-out assembly; and the take-out assembly, the transmission assembly, and the rotary assembly are sequentially mounted on the mounting frame from bottom to top along a lifting direction of the support beam; the mounting frame is mounted on the support beam; the rotary assembly is configured to drive the transmission assembly and the take-out assembly to rotate in a plane perpendicular to a lifting direction of the support beam; the transmission assembly is configured to drive the take-out assembly to move toward or away from a front surface of a to-be-transferred goods box; and the take-out assembly is configured to be connected to the front surface of the to-be-transferred goods box to transfer the to-be-transferred goods box.

According to an eleventh aspect, a goods box take-out mechanism provided in this application is disposed on a support beam of a rack. The goods box take-out mechanism includes a mounting frame, a rotary assembly, a transmission assembly, and a take-out assembly, where the take-out assembly, the transmission assembly, the rotary assembly, and the mounting frame are sequentially mounted on the mounting frame from bottom to top along a lifting direction of the support beam; the mounting frame is mounted on the support beam; the rotary assembly is configured to drive the transmission assembly and the take-out assembly to rotate in a plane perpendicular to a lifting direction of the support beam; the transmission assembly is configured to drive the take-out assembly to move toward or away from a front surface of a to-be-transferred goods box; and the take-out assembly is configured to be connected to the front surface of the to-be-transferred goods box to transfer the to-be-transferred goods box; a pedestal is disposed on the transmission assembly, and the pedestal is mounted on the rotary assembly; and the goods box take-out mechanism further includes a tray mounted on the pedestal, and the tray is located below the take-out assembly and configured to carry the to-be-transferred goods box taken out by the take-out assembly.

By using the foregoing technical solutions, this application has at least the following technical effects:

In the goods box take-out device provided in this application, the take-out assembly is configured to be connected to the front surface of the to-be-transferred goods box, so that the goods box can be taken out from the warehousing shelving unit and transferred to the robot rack or other storage areas of the warehousing shelving unit. In the transfer process of the goods box, since the take-out assembly is connected to the front surface of the goods box, there is no need to reserve horizontal operation space on the left and right sides of the goods box, and there is no need to reserve space for fork insertion at the bottom of the goods box and the lifting space for the goods box when the goods box is lifted. That is, when the goods box take-out device provided in the embodiments of this application is used to transfer the goods box, the operation space for the take-out assembly when the transport robot carries the goods box can be significantly reduced, thereby fully utilizing the storage space of the warehouse, and improving the storage density of the warehouse.

In addition, in the goods box take-out device provided in the embodiments of this application, the movable wheel assembly in the transmission mechanism is mounted on the pedestal through the sliding seat, and the sliding seat is provided with a first limiting structure at the front end of the sliding seat. When the take-out assembly moves toward the goods box and abuts against the first limiting structure, the take-out assembly and the sliding seat can move toward the front surface of the goods box as a whole, which increases the stroke of the take-out assembly, so that the take-out assembly can easily extend into the interior of the warehousing shelving unit, to take out the goods box deep in the warehousing shelving unit, thereby improving the reliability of carrying the goods box by the transport robot.

DETAILED DESCRIPTION

Embodiment I

When a gripping transport robot or a lifting transport robot is used to carry goods boxes, large operating space needs to be reserved, which wastes the storage space of the warehouse and reduces the storage density of the warehouse. To resolve the foregoing problems, in a take-out device provided in the embodiments of this application, a take-out assembly for transferring a goods box is connected to a front surface of the goods box. There is no need to reserve space below, above, or on left and right sides of the goods box for insertion and movement of the take-out assembly. Therefore, the storage space of the warehouse can be fully utilized, and the storage density of the warehouse can be improved.

To make the foregoing objectives, features, and advantages of this application more comprehensible, the following clearly and completely describes the technical solutions in the embodiments of this application with reference to accompanying drawings in the embodiments of this application. Apparently, the described embodiments are merely some but not all of the embodiments of this application. All other embodiments obtained by a person of ordinary skill in the art based on the embodiments of this application without creative efforts shall fall within the protection scope of the embodiments of this application.

Figure 1:
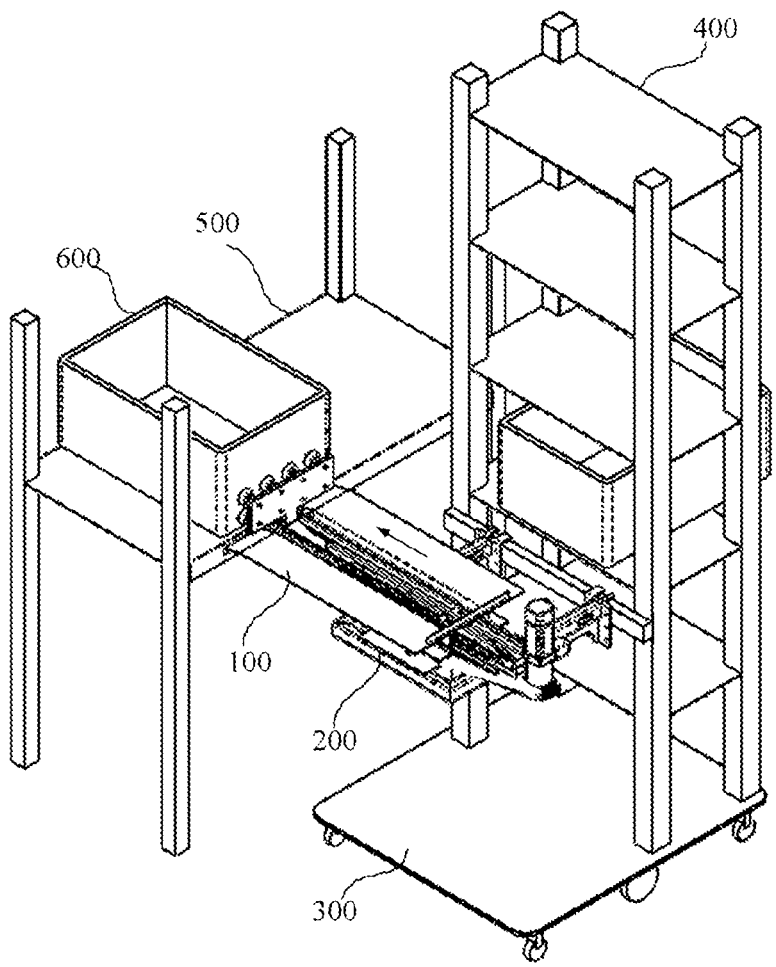
FIG. 1 is a schematic diagram of an operating status of a transport robot according to an embodiment of this application.

FIG. 1 is a schematic diagram of an operating status of a transport robot according to an embodiment of this application. As shown in FIG. 1, the transport robot provided in this embodiment of this application includes: a robot body and a goods box take-out device 100 mounted on the robot body, where the robot body includes a rotary mechanism 200, a base 300, and a robot rack 400. The base 300 is configured to support components or devices mounted on the base 300. The base 300 is provided with a walking mechanism for driving the base 300 to move on the ground of the warehousing area. The robot rack 400 is fixedly mounted on the base 300. The robot rack 400 includes a plurality of goods box storage space for temporarily storing a transported goods box 600.

Figure 2:
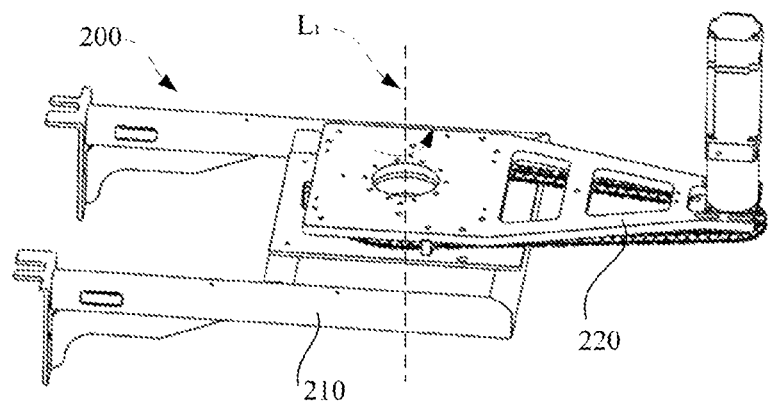
FIG. 2 is a schematic structural diagram of a rotary mechanism according to an embodiment of this application.

FIG. 2 is a schematic structural diagram of a rotary mechanism according to an embodiment of this application. As shown in FIG. 2, a rotary mechanism 200 is mounted on a beam of the robot rack 400 and can move up and down along the robot rack 400. The rotary mechanism 200 includes a mounting frame 210 and a rotary assembly 220, where one end of the mounting frame 210 is fixedly connected to the beam through screws and bolts, and can move up and down along the robot rack 400 along with the beam. The rotary assembly 220 is mounted on the mounting frame 210 and can rotate relative to the mounting frame 210 around a rotation axis of the rotary assembly 220. For example, taking a placement orientation of the rotary mechanism in FIG. 2 as an example, the mounting frame 210 is disposed approximately parallel to the ground, that is, the mounting frame 210 extends in the horizontal direction. A rotation axis Li of the rotary assembly 220 is perpendicular to the ground. When the rotary assembly 220 rotates relative to the mounting frame 210 around the rotation axis, the rotary assembly 220 rotates in the space substantially parallel to the ground.

Figure 3:
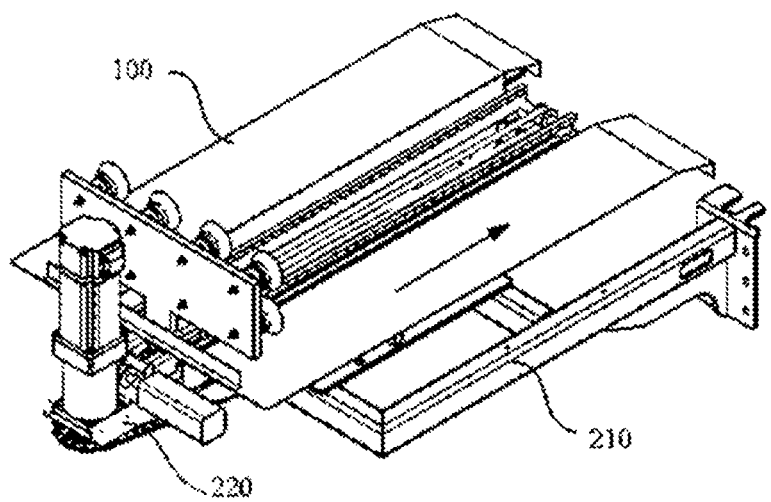
FIG. 3 is a schematic diagram of connection between a rotary mechanism and a goods box take-out device according to an embodiment of this application.

FIG. 3 is a schematic diagram of connection between a rotary mechanism and a goods box take-out device according to an embodiment of this application. As shown in FIG. 3, the goods box take-out device 100 is mounted on the rotary assembly 220. When the rotary assembly 220 rotates relative to the mounting frame 210 around the rotation axis, driven by the rotary assembly 220, the goods box take-out device 100 can rotate relative to the mounting frame 210 around the rotation axis of the rotary assembly 220, so that after taking out the goods box 600, the goods box take-out device 100 can rotate by a specific angle, for example, 90°; and place the goods box 600 on the robot rack 400. When the rotary mechanism 200 moves up and down along the robot rack 400, the goods box take-out device 100 follows the rotary mechanism 200 to move up and down along the robot rack 400 to adjust the height of the goods box take-out device 100 from the ground, to facilitate taking out or placing the goods box 600 on a warehousing shelving unit 500 at different heights.

Figure 4:
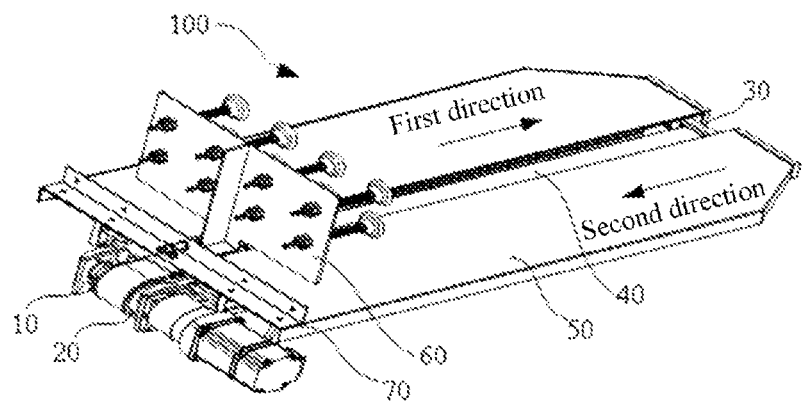
FIG. 4 is a schematic structural diagram of a goods box take-out device according to an embodiment of this application.

FIG. 4 is a schematic structural diagram of a goods box take-out device according to an embodiment of this application. As shown in FIG. 4, the goods box take-out device 100 includes: a pedestal 10, a transmission mechanism, a take-out assembly 60, and a driving device 70, where the pedestal 10 is mounted on the rotary assembly 220 and can rotate with the rotary assembly 220. The transmission mechanism and the driving device 70 are both mounted on the pedestal 10, and the driving device 70 is connected to the transmission mechanism for driving the transmission mechanism to perform power transmission. The transmission mechanism includes a fixed wheel assembly 20, a movable wheel assembly 30, and a transmission belt 40 wound around fixed wheels of the fixed wheel assembly 20 and movable wheels of the movable wheel assembly 30. The take-out assembly 60 is fixed on the transmission belt 40. When the driving device 70 drives the transmission mechanism to perform power transmission, the take-out assembly 60 is driven by the transmission belt 40 to move toward the front surface of the goods box 600. When the take-out assembly 60 moves to a set position, the take-out assembly 60 is connected to the front surface of the goods box 600, so that the goods box 600 is taken out from the warehousing shelving unit 500 and transferred to the robot rack 400 or other warehousing shelving units 500. Similarly, the goods box take-out device 100 can also be used to transfer the to-be-transferred goods box 600 located on the transport robot grid to the warehousing shelving unit 500.

When the goods box take-out device provided in the embodiments of this application is used to transfer the goods box, the take-out assembly 60 is connected to the front surface of the goods box 600, and there is no need to reserve operation space below, above, or on left and right sides of the goods box 600. Compared to the related art in which the gripping arms of the gripping transport robot are gripped on the left and right sides of the goods box, wasting the storage space of the warehouse in the horizontal direction, and the fork of the lifting transport robot is inserted into the bottom of the goods box, wasting the storage space of the warehouse in the height direction, there is no need to reserve operation space below, above, or on left and right sides of the goods box 600, so that the warehousing space of the warehouse can be fully utilized and the storage density of the warehouse can be improved.

The goods box take-out device is further described below with reference to the accompanying drawings. First, a first direction and a second direction defined in the embodiments are described: When the take-out assembly 60 is used to take out the goods box 600 located on the warehousing shelving unit 500, a direction in which the take-out assembly 60 moves toward the front surface of the goods box 600 is the first direction, and the moving direction of the take-out assembly 60 as shown in FIG. 1 and FIG. 4 is the first direction. A direction in which the take-out assembly 60 moves away from the warehousing shelving unit 500 is the second direction, that is, the first direction is opposite to the second direction. In this embodiment, the defined front surface of the goods box 600 refers to a surface of the goods box 600 facing the outside of the warehousing shelving unit 500 when the to-be-transferred goods box 600 is placed on the warehousing shelving unit 500, or, in other words, a surface exposed to the warehousing shelving unit 500.

In addition, in the state of the goods box take-out device 100 shown in FIG. 1, to facilitate the description of the transmission mechanism and a motion status of the take-out assembly 60, two ends of the pedestal 10 are respectively defined as a rear end of the pedestal 10 and a front end of the pedestal 10 along the first direction. When the goods box 600 located on the warehousing shelving unit 500 is taken out by the take-out assembly 60, the front end of the pedestal 10 needs to be close to the warehousing shelving unit 500, and the end opposite to the front end of the pedestal 10 is the rear end of the pedestal 10. In the state of the goods box take-out device 100 shown in FIG. 4, when the take-out assembly 60 is located at the rear end of the pedestal 10, the rear end may be defined as an initial position of the take-out assembly 60.

Figure 5:
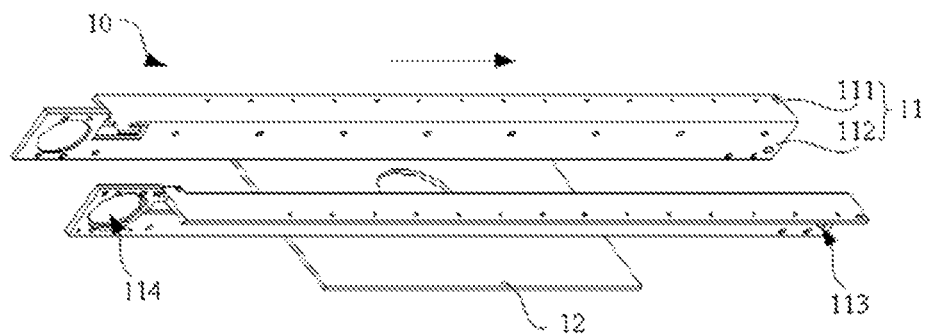
FIG. 5 is a schematic structural diagram of a pedestal according to an embodiment of this application.

FIG. 5 is a schematic structural diagram of a pedestal according to an embodiment of this application. As shown in FIG. 5, the pedestal 10 provided in this embodiment includes two support plates 11 and a bottom connecting plate 12 connecting the two support plates 11. The two support plates 11 are disposed in parallel and spaced apart along the first direction, and mounting space for the fixed wheel assembly 20 and the movable wheel assembly 30 is formed between the two support plates 11. The fixed wheel assembly is fixedly mounted between the two support plates 11, and the movable wheel assembly 30 is slidably mounted between the two support plates 11 through the sliding seat 31 (referring to the sliding seat shown in FIG. 9). The bottom connecting plate 12 is disposed at the bottom of the two support plates 12 and connects the two support plates 12 together. The bottom connecting plate 12 is connected to the rotary assembly 220, so that the pedestal 10 can rotate following the rotary assembly 220.

For ease of description, the two support plates 11 may be respectively defined as a first support plate and a second support plate, where the first support plate and the second support plate each include a first bearing plate 111 and a second bearing plate 112. The first bearing plate 111 is disposed in the horizontal direction, the second bearing plate 112 is disposed in the vertical direction, and the first bearing plate 111 and the second bearing plate 112 are vertically connected to form the L-shaped support plate 11, or each support plate 11 may be made of angle steel.

The first bearing plate 111 is configured to carry components or devices disposed above the pedestal 10. For example, a tray 50 is disposed above the pedestal 10, and the tray 50 may be fixed on the first bearing plate 111 or slidably disposed on the first bearing plate 111. If the tray 50 is slidably mounted on the pedestal 10, a third guide rail 14 for the tray 50 to slide relative to the pedestal 10 is disposed on each of the first bearing plates 111.

Figure 6:
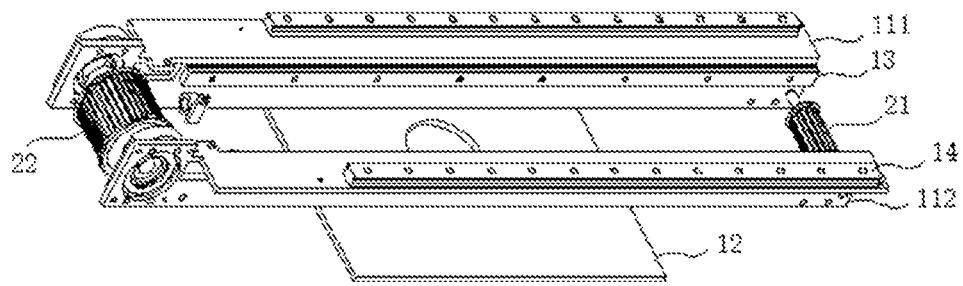
FIG. 6 is a schematic diagram 1 of mounting of a fixed wheel assembly and a pedestal according to an embodiment of this application.
Figure 7:
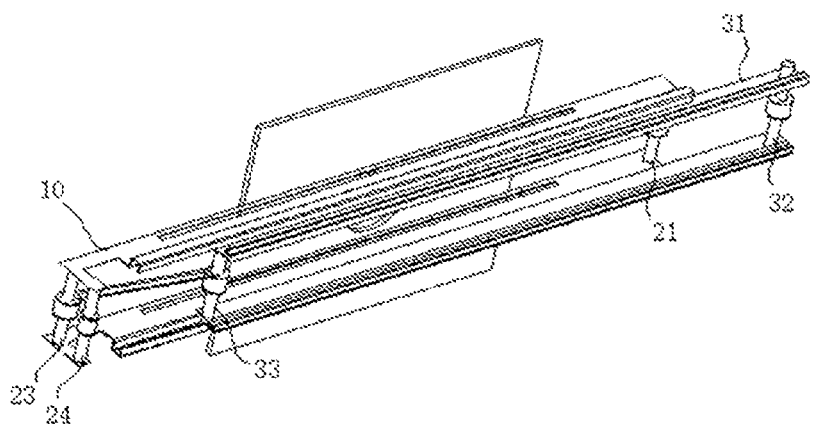
FIG. 7 is a schematic diagram 2 of mounting of a fixed wheel assembly and a pedestal according to an embodiment of this application.

The second bearing plate 112 may be used to mount the fixed wheel assembly 20. Along the first direction, a front end and a rear end of the second bearing plate 112 are respectively provided with mounting holes for mounting the fixed wheels in the fixed wheel assembly 20. A rotation axis of each fixed wheel is perpendicular to the second bearing plate 112. It may be understood that, since the quantity of fixed wheels of the fixed wheel assembly 20 located between the two bearing plates 112 may be set according to actual needs, in some embodiments, the fixed wheel assembly includes two fixed wheels, and a schematic diagram of mounting of the fixed wheel assembly and the pedestal is shown in FIG. 6. In some embodiments, the fixed wheel assembly may further include three or more fixed wheels. When the fixed wheel assembly includes three fixed wheels, a schematic diagram of mounting of the fixed wheel assembly and the pedestal is shown in FIG. 7.

FIG. 6 is a schematic diagram 1 of mounting of a fixed wheel assembly and a pedestal according to an embodiment of this application. As shown in FIG. 6, the fixed wheel assembly 20 includes two fixed wheels, the two fixed wheels are a first fixed wheel 21 and a second fixed wheel 22 respectively, and the first fixed wheel 21 and the second fixed wheel 22 are respectively mounted at the front end and the rear end of the pedestal 10. The transmission belt 40 is wound around the first fixed wheel 21 and the second fixed wheel 22 respectively, and space formed by the transmission belt 40, and the first fixed wheel 21 and the second fixed wheel 22 is mounting space for the movable wheels in the movable wheel assembly 30.

The first fixed wheel 21 is mounted at a front end of each second bearing plate 112 and is located between the two second bearing plates 112. The first fixed wheel 21 is configured to guide the transmission belt 40. The first fixed wheel 21 includes a wheel body and a wheel shaft connected to the wheel body, and two ends of the wheel shaft may be respectively mounted on the second bearing plates 112. Each second bearing plate 112 is provided with a first mounting hole 113 matching the wheel shaft of the first fixed wheel 21, the wheel shaft of the first fixed wheel 21 is mounted in the first mounting hole 113, and the first fixed wheel 21 can rotate relative to the second bearing plate 112.

The second fixed wheel 22 is mounted on the rear end of the second bearing plate 112, a second mounting hole 114 is disposed at the rear end of each second bearing plate 112, and each second mounting hole 114 is provided with a bearing seat. The wheel shaft of the second fixed wheel 22 is mounted in a bearing located in the bearing seat, and under the action of an external force, the second fixed wheel can rotate relative to the pedestal 10. The second fixed wheel may be used as a movable wheel, and drives the first fixed wheel to rotate through the transmission belt 40.

Further, as shown in FIG. 6, the second fixed wheel 22 is mounted at the rear end of the pedestal 10, and the second fixed wheel may be connected to the driving device 70 through the wheel shaft. Driven by the driving device 70, the second fixed wheel 22 can rotate relative to the pedestal 10, thereby driving the transmission belt 40 to move relative to the pedestal 10. In addition, the driving device 70 includes a motor and a reducer connected to the motor. The motor is connected to the wheel shaft of the second fixed wheel 22 through the reducer. By controlling the forward and reverse rotation of the motor, the transmission belt 40 can move in the first direction or the second direction. The moving direction of the transmission belt 40 may be consistent with the moving direction of the take-out assembly 60, referring to the first direction and the second direction shown in FIG. 4.

FIG. 7 is a schematic diagram 2 of mounting of a fixed wheel assembly and a pedestal according to an embodiment of this application. As shown in FIG. 7, the fixed wheel assembly 20 includes three fixed wheels, including a first fixed wheel 21, a third fixed wheel 23, and a fourth fixed wheel 24. The first fixed wheel 21 is mounted at the front end of the pedestal 10, and the third fixed wheel 23 and the fourth fixed wheel 24 are mounted at the rear end of the pedestal 10, the third fixed wheel 23 and the fourth fixed wheel 24 are distributed at the rear end of the pedestal 10 at an interval along the direction perpendicular to the first direction. The transmission belt 40 is wound around the first fixed wheel 21, the third fixed wheel 23, and the fourth fixed wheel 24 respectively to form the mounting space for the movable wheels of the movable wheel assembly 30.

The manner in which the first fixed wheel 21 is mounted at the front end of the pedestal 10 remains unchanged, and the details are not repeated herein. The difference between the embodiment shown in FIG. 7 and the embodiment shown in FIG. 6 is that the rear end of the pedestal 10 is provided with a third mounting hole and a fourth mounting hole respectively, and the third mounting hole and the fourth mounting hole are disposed at the rear end of the pedestal 10 at an interval in the vertical direction. The wheel shaft of the third fixed wheel 23 is mounted in the third mounting hole of the pedestal 10, and the third fixed wheel 23 can rotate relative to the pedestal 10. The wheel shaft of the fourth fixed wheel 24 is mounted in the fourth mounting hole of the pedestal 10, and the fourth fixed wheel 24 can rotate relative to the pedestal 10. Moreover, the driving device 70 can be selectively connected to one of the third fixed wheel 23 and the fourth fixed wheel 24, to drive the transmission belt 40 to move relative to the pedestal 10.

The second bearing plate 112 can be used to mount the fixed wheel assembly 20, and the second bearing plate 112 can be further used to mount the movable wheel assembly. A first guide block 13 for mounting the movable wheel assembly 30 is disposed on the second bearing plate 112. The first guide block 13 is disposed in a strip shape on the second bearing plate 112 along the first direction, so that the movable wheel assembly 30 can slide relative to the pedestal 10 along the first direction.

Figure 8:
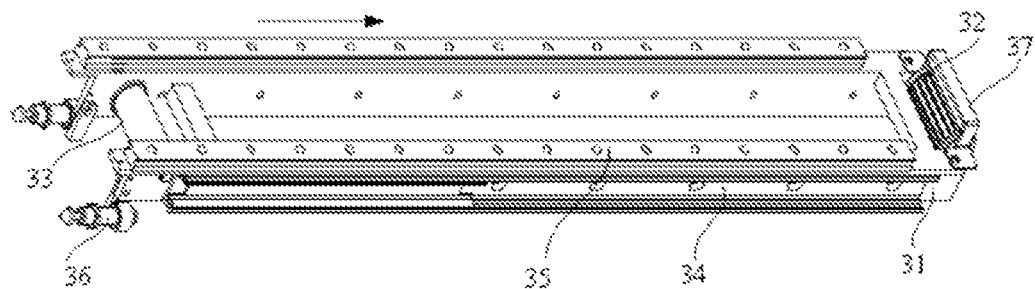
FIG. 8 is a schematic diagram of arrangement of a first movable wheel, a second movable wheel, a first buffer, a first guide rail, and a second guide rail on a sliding seat according to an embodiment of this application.
Figure 9:
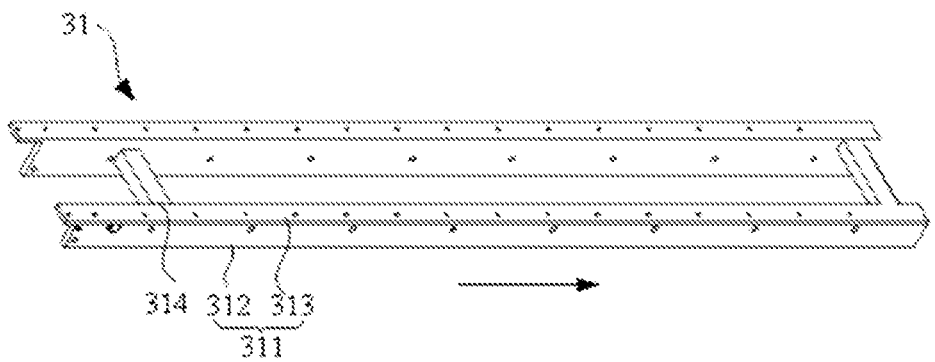
FIG. 9 is a schematic structural diagram of a sliding seat according to an embodiment of this application.

FIG. 8 is a schematic diagram of arrangement of a first movable wheel, a second movable wheel, a first buffer, a first guide rail, and a second guide rail on a sliding seat according to an embodiment of this application. FIG. 9 is a schematic structural diagram of a sliding seat according to an embodiment of this application.

As shown in FIG. 8, the movable wheel assembly 30 includes a first movable wheel 32, a second movable wheel 33, and a sliding seat 31. Along the first direction (the first direction is shown in FIG. 8), two ends of the sliding seat 30 may be defined as a front end and a rear end, the first movable wheel 32 is mounted at the front end of the sliding seat 31, and the second movable wheel 33 is mounted at the rear end of sliding seat 31. The sliding seat 31 is slidably mounted on the pedestal 10, and the sliding seat 31 is provided with a first guide rail 34 slidably connected to the pedestal 10. The first guide rail 34 cooperates with the first guide block 13 disposed on the second bearing plate 112, so that the sliding seat 31 can move in the first direction or the second direction along the pedestal 10.

As shown in FIG. 9, the sliding seat 31 includes two mounting plates 311 and a connecting plate 314 located between the two mounting plates 311. A connecting plate 314 may be disposed at a front end and a rear end of each of the two mounting plates 311 to enhance the structural strength of the sliding seat 31. For ease of description, the two mounting plates 311 may be a first mounting plate and a second mounting plate respectively. The first mounting plate and the second mounting plate each include a vertical plate 312 and a horizontal plate 313, and the vertical plate 312 and the horizontal plate 313 are connected vertically and form an L-shaped mounting plate 311. Length directions of the first mounting plate and the second mounting plate are parallel to the first direction (the first direction is shown in FIG. 9). The first mounting plate and the second mounting plate are spaced apart and parallel to each other, and form mounting space for the first movable wheel 32 and the second movable wheel 33.

Two ends of the wheel shaft of the first movable wheel 32 are respectively connected to a front end of each vertical plate 312, and the first movable wheel 32 mounted on the sliding seat 31 can rotate relative to the sliding seat 31. Two ends of the wheel shaft of the second movable wheel 33 are respectively connected to a rear end of each vertical plate 312, and the second movable wheel 33 mounted on the sliding seat 31 can rotate relative to the sliding seat 31.

The first guide rail 34 is located on the vertical plate 312, a length direction of the first guide rail 34 is parallel to the first direction, and the first guide rail 34 is matched with the first guide block 13 on the pedestal 10. A second guide rail 35 is mounted on the horizontal plate 313, and the second guide rail 35 cooperates with a second guide block disposed on the take-out assembly 60, so that the take-out assembly 60 can slide relative to the sliding seat 31 along the second guide rail 35 in the first direction or the second direction.

The front end of the sliding seat 31 is further provided with a first limiting structure 37 abutting against the take-out assembly 60. The first limiting structure 37 may be a first limiting plate, and two ends of the first limiting plate are respectively fixed on the horizontal plates 313. That is, the first limiting plate spans between the two mounting plates 311, so that the first limiting plate can abut against the take-out assembly 60. When the take-out assembly 60 moves toward the front surface of the goods box 600, the first limiting plate may abut against the take-out assembly 60. As the transmission belt 40 continues to be driven toward the goods box 600, the take-out assembly 60 drives the first limiting plate and the sliding seat 31 to continue to move toward the front surface of the goods box 600, so that the take-out assembly 60 moves toward the interior of the warehousing shelving unit 500 and is connected to the to-be-transferred goods box 600, thereby expanding the moving stroke of the take-out assembly 60. Therefore, the goods box 600 located deeper in the warehousing shelving unit 500 can be taken out, which improves the reliability of the operation of the take-out assembly 60.

After the take-out assembly 60 is connected to the to-be-transferred goods box 600, the take-out assembly 60 needs to move in the second direction to take out the to-be-transferred goods box from the warehousing shelving unit 500. In this case, the take-out assembly 60 and the sliding seat 31 need to quickly move away from the warehousing shelving unit 500. In some embodiments, when the sliding seat 31 moves toward the second direction and retreats to the initial position, to prevent the sliding seat 31 from sliding out of the pedestal instead of reaching the preset initial position, a limiting device that cooperates with the sliding seat 31 is generally disposed on the pedestal 10, as shown in FIG. 10.

Figure 10:
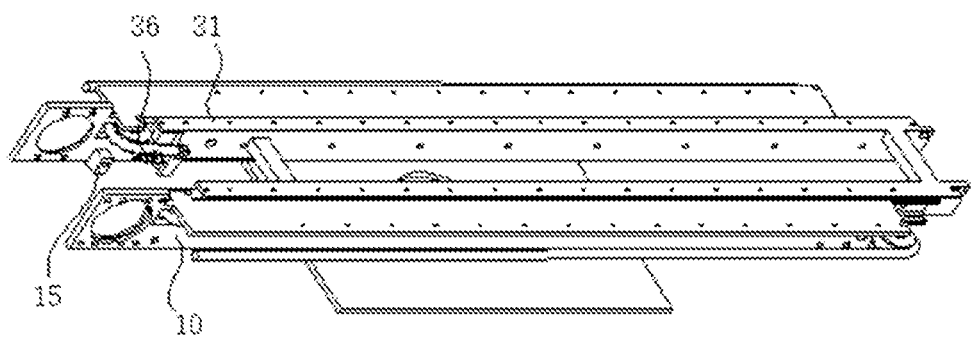
FIG. 10 is a schematic diagram of mounting of a first buffer and a collision block according to an embodiment of this application.

FIG. 10 is a schematic diagram of mounting of a first buffer and a collision block according to an embodiment of this application. As shown in FIG. 10, when the sliding seat 31 rapidly moves toward the rear end of the pedestal 10, to limit the sliding seat 31: two collision blocks 15 are disposed at the rear end of the pedestal 10, and each collision block 15 is a rectangular block and is opposite to the vertical plate 312 of the sliding seat 31. The two collision blocks 15 are respectively fixed on the rear ends of the first support plate and the second support plate of the pedestal 10, and the collision blocks 15 may be located on the second bearing plate 112 of the support plate 11.

To reduce the impact force when the sliding seat 31 is in contact with the pedestal 10, the rear end of the sliding seat 31 is provided with two first buffers 36. The two first buffers 36 are respectively located at the rear ends of the first mounting plate and the second mounting plate of the sliding seat 31. The first buffers 36 may be located on the vertical plate 312 of each mounting plate 311, and the first buffers 36 and the collision blocks 15 are oppositely disposed. When the sliding seat 31 moves to the rear end of the pedestal 10 in the second direction, the first buffers 36 abut against the collision blocks 15. The first buffers 36 reduce the impact force between the sliding seat 31 and the pedestal 10.

Therefore, the shock to the goods take-out device is reduced, so that the goods box 600 can be stably fixed on the take-out assembly 60 in the process of transferring the goods box 600.

In another embodiment, to enable the sliding seat 31 to quickly retreat to the initial position, the rear end of the sliding seat 31 is provided with a reset mechanism. When the take-out assembly 60 moves toward the front surface of the goods box 600 and abuts against the first limiting structure 37, the sliding seat 31 needs to overcome the restoring force of the reset mechanism and move to the front end of the pedestal 10. That is, when the take-out assembly 60 abuts against the first limiting structure 37 at the front end of the sliding seat 31, if the transmission belt 40 continues to be driven in the first direction, the sliding seat 31 and the take-out assembly 60 move toward the front surface of the goods box 600 relative to the pedestal 10 as a whole, and move to the goods box 600.

After the take-out assembly 60 is in contact with the front surface of the goods box 600 and the goods box 600 is fixed, the take-out assembly 60 starts to return and is ready to transfer the goods box 600 to the tray 50. The reset mechanism starts to work, so that under the action of the restoring force of the reset mechanism, the sliding seat 31 moves along the second direction and can quickly return to the initial position, thereby improving the efficiency of carrying the goods box by the transport robot.

Further, the reset mechanism provided in this embodiment may be an elastic element or a counterweight disposed at the rear end of the sliding seat 31. Certainly, the reset mechanism may be alternatively other elements or assemblies that can provide the restoring force for the sliding seat 31 to move toward the second direction. According to different structural forms of the reset mechanism, this embodiment may include but not limited to the following implementations, as shown in FIG. 11 to FIG. 13.

Figure 11:
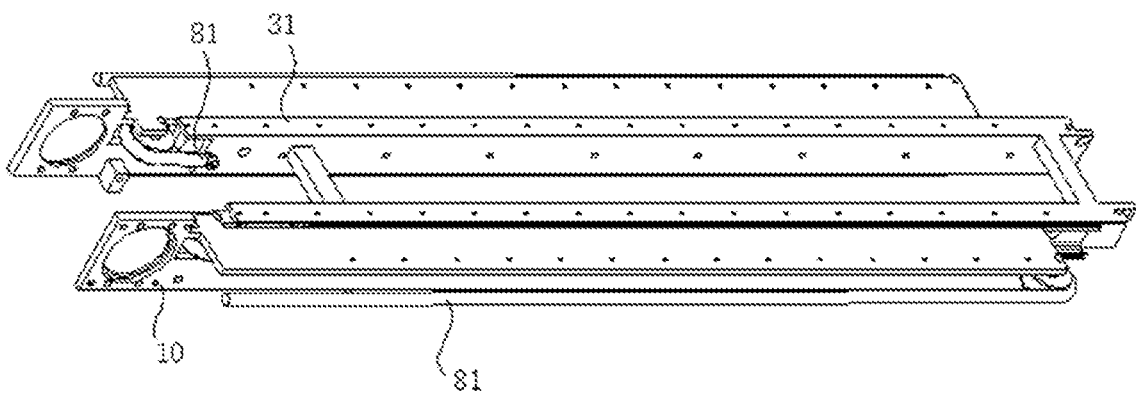
FIG. 11 is a schematic diagram 1 of mounting of a reset mechanism according to an embodiment of this application.

FIG. 11 is a schematic diagram 1 of mounting of a reset mechanism according to an embodiment of this application. For example, the reset mechanism may be a reset spring 81, where one end of the reset spring 81 is connected to the rear end of the sliding seat 31, and the other end of the reset spring 81 is connected to the rear end of the pedestal 10. When the take-out assembly 60 and the sliding seat 31 move to the goods box 600 together, the reset spring 81 is continuously stretched during the forward movement of the sliding seat 31. When the take-out assembly 60 returns, the reset spring 81 provides a restoring force for the sliding seat 31 to quickly return to the initial position.

Figure 12:
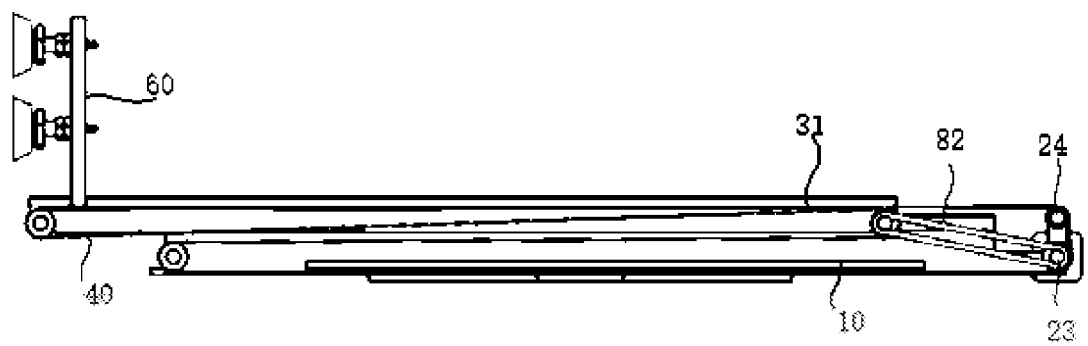
FIG. 12 is a schematic diagram 2 of mounting of a reset mechanism according to an embodiment of this application.

FIG. 12 is a schematic diagram 2 of mounting of a reset mechanism according to an embodiment of this application. As shown in FIG. 12, the reset mechanism may be alternatively a belt 82. One end of the belt 82 is sleeved on the wheel shaft of the second movable wheel 33 at the rear end of the sliding seat 31, and the other end of the belt 82 is sleeved on the wheel shaft of the second fixed wheel 22. Alternatively, the other end of the belt 82 is sleeved on the wheel shaft of one of the third fixed wheel 23 and the fourth fixed wheel 24. When the take-out assembly 60 moves to the goods box 600 together with the sliding seat 31, the belt 82 is continuously stretched during the forward movement of the sliding seat 31. When the take-out assembly 60 returns, the belt 82 provides a restoring force for the sliding seat 31 to quickly return to the initial position.

Figure 13:
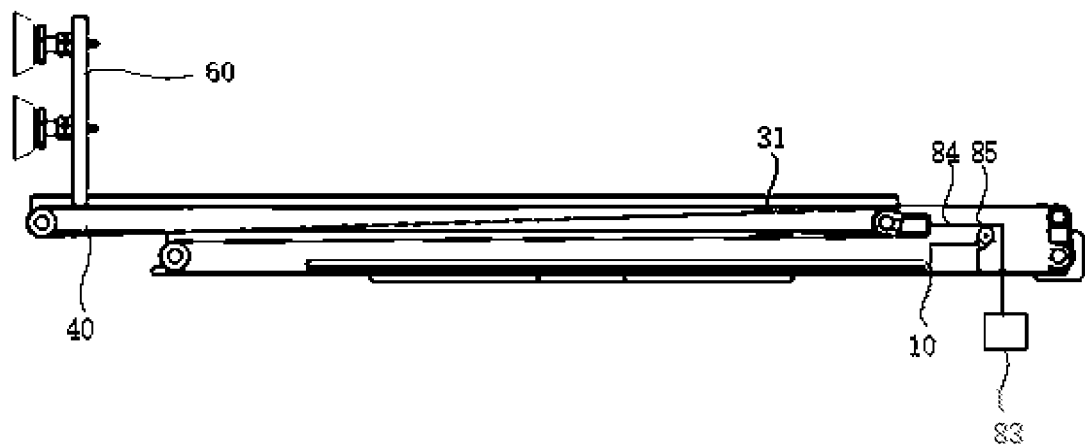
FIG. 13 is a schematic diagram 3 of mounting of a reset mechanism according to an embodiment of this application.

FIG. 13 is a schematic diagram 3 of mounting of a reset mechanism according to an embodiment of this application. As shown in FIG. 13, the reset mechanism includes a counterweight 83, a rope 84, and a direction-changing wheel 85, and uses the gravity generated by the counterweight 83 to change the direction of action of the force through the direction-changing wheel 85, to provide the sliding seat 31 with a tension for the movement along the second direction. For example, the direction-changing wheel 85 is mounted at the rear end of the pedestal 10. A direction-changing wheel 85 may be mounted on each of the two support plates 11 of the pedestal 10, and the two direction-changing wheels 85 may be disposed oppositely and located on the second bearing plate 112. An axis of a rotation shaft of the direction-changing wheel 85 is perpendicular to the second bearing plate 112.

One end of the rope 84 is wound around the direction-changing wheels 85 and horizontally connected to the rear end of the sliding seat 31, and may be connected to the horizontal plate of each mounting plate 311 of the sliding seat 31. The other end of the rope 84 extends in the direction perpendicular to the ground after passing through the direction-changing wheels 85 and is connected to the counterweight 83. Therefore, the gravity generated by the counterweight 83 is transmitted to the sliding seat 31 along the rope 84 to provide the sliding seat 31 with a tension in the second direction, so that the sliding seat 31 can be restored to the initial position.

Figure 14:
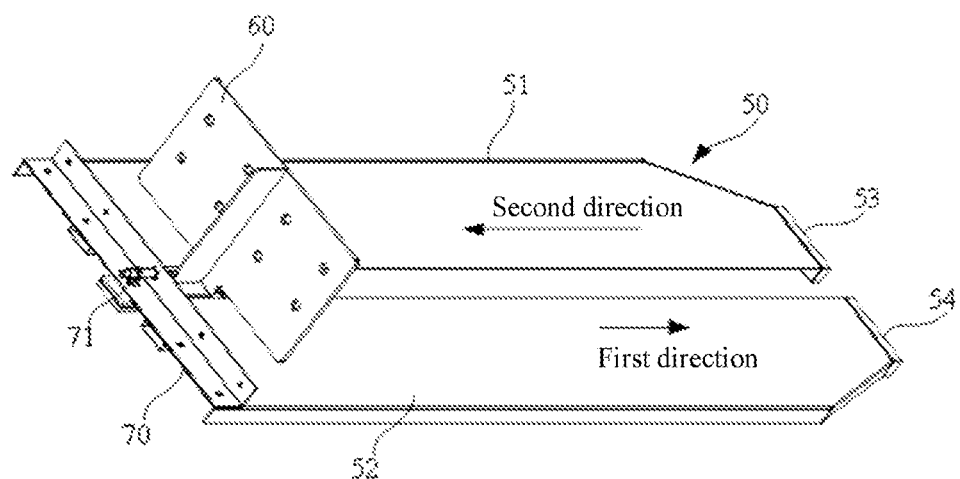
FIG. 14 is a schematic diagram of connection between a take-out assembly and a tray according to an embodiment of this application.

FIG. 14 is a schematic diagram of connection between a take-out assembly and a tray according to an embodiment of this application. As shown in FIG. 14 and in conjunction with FIG. 1, a tray 50 for carrying the goods box 600 is further disposed above the pedestal 10, and a middle portion of the tray 50 forms a passage along which the take-out assembly 60 slides. After the take-out assembly 60 is fixedly connected to the to-be-transferred goods box 600, the take-out assembly 60 moves in the second direction and moves to the initial position. The to-be-transferred goods box 600 is completely detached from the warehousing shelving unit 500 and placed on the tray 50.

For example, the tray 50 includes a first supporting plate 51 and a second supporting plate 52 disposed oppositely and spaced apart, and form a passage for accommodating the movement of the take-out assembly 60. Similarly, the first limiting structure 37 and the transmission mechanism are also located in the passage. An end of the take-out assembly 60 is fixedly connected to the transmission belt 40 in the passage, and an end of the take-out assembly 60 away from the transmission belt 40 protrudes out of the tray 50, so that the taken out goods box 600 can be placed on the tray 50.

The first supporting plate 51 and the second supporting plate 52 are strip-shaped plates, the first supporting plate 51 is mounted on the first support plate of the pedestal 10, and the second supporting plate 52 is mounted on the second support plate of the pedestal 10. Both the first supporting plate 51 and the second supporting plate 52 are located on the first bearing plate 111 of each support plate 11. It may be understood that, the tray 50 may be slidably mounted on the pedestal 10, and a third guide block 56 is disposed on a side of each supporting plate of the tray 50 facing each support plate 11 of the pedestal 10. The third guide block 56 is matched with the third guide rail 14 on the support plate 11, so that the tray 50 is slidably mounted on the pedestal 10.

Further, a second limiting plate 55 is disposed at rear ends of the first supporting plate 51 and the second supporting plate 52, the second limiting plate 55 connects the first supporting plate 51 and the second supporting plate 52, and the second limiting plate 55 further limits the take-out assembly 60.

The front end of the first supporting plate 51, the front end of the second supporting plate 52, the side of the first supporting plate 51 away from the second supporting plate 52, and the side of the second supporting plate 52 away from the first supporting plate 51 are each provided with a flange. The flanges are disposed on the first supporting plate 51 and the second supporting plate 52, which can form protective space below the tray 50, and facilitate the mounting of protective devices at an edge position of each supporting plate. For example, an anti-collision rubber pad or the like is disposed on the outer flange of each supporting plate to provide effective protection when the transport robot collides with pedestrians or other objects when transporting the goods box.

For example, the first supporting plate 51 is provided with a first buffer pad 53, and the first buffer pad 53 is located at the front end of the first supporting plate 51 and faces an end surface of the goods box 600. The first buffer pad 53 can cover front end surface of the entire first supporting plate 51, and is used to buffer the impact force generated when the tray 50 moves to the warehousing shelving unit 500 and is in contact with the warehousing shelving unit 500, to avoid the risk of tipping the warehousing shelving unit 500 due to the impact force. The first buffer pad 53 may be made of an elastic rubber pad, and the first buffer pad 53 has a specific thickness. Similarly, the front end of the second supporting plate 52 is provided with a second buffer pad 54, and the second buffer pad 54 is located on the end surface of the second supporting plate 52 facing the goods box 600. For this arrangement, reference may be made to the connection manner of the first buffer pad 53 and the first supporting plate 51, and the details are not described herein again.

Figure 15:
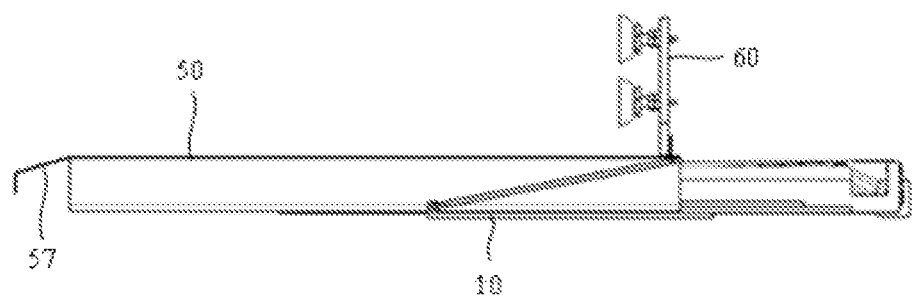
FIG. 15 is a schematic structural diagram of a guide surface at a front end of a supporting plate according to an embodiment of this application.

FIG. 15 is a schematic structural diagram of a guide surface at a front end of a tray according to an embodiment of this application. As shown in FIG. 15, the tray 50 is configured to carry the goods box 600. To facilitate the transfer of the goods box 600 to the tray 50, the front end of each supporting plate is provided with a guide surface 57. For example, the front end of the first supporting plate 51 is provided with a first guide surface to reduce the frictional force when the tray 50 moves along the first supporting plate 51. The first guide surface is located on the surface of the first supporting plate 51 facing away from the pedestal 10, and is formed by a bearing surface of the front end portion of the first supporting plate 51, which extends obliquely downward toward the bottom surface, and extends to the front end of the first supporting plate 51. Similarly, a second guide surface is disposed on the surface of the front end of the second supporting plate 52 and away from the pedestal 10. The second guide surface extends obliquely downward toward the ground, whose setting manner is the same as that of the first guide surface, and the details are not described herein again. It may be understood that, in another implementation, as shown in the structure of the tray 50 in FIG. 14, the bearing surface at the front end portion of the first supporting plate 51 may be a plane extending to the end surface and perpendicular to the end surface. The structure of the bearing surface at the front end portion of the second supporting plate 52 may be the same as that of the first supporting plate, and the details are not described herein again.

The take-out assembly 60 provided in this embodiment moves between the first supporting plate 51 and the second supporting plate 52, and the take-out assembly 60 can be in contact with the front surface of the goods box 600 and fix the goods box 600. According to different connection manners of the take-out assembly 60 and the front surface of the goods box 600, this embodiment may include but not limited to the following implementations.

Figure 16:
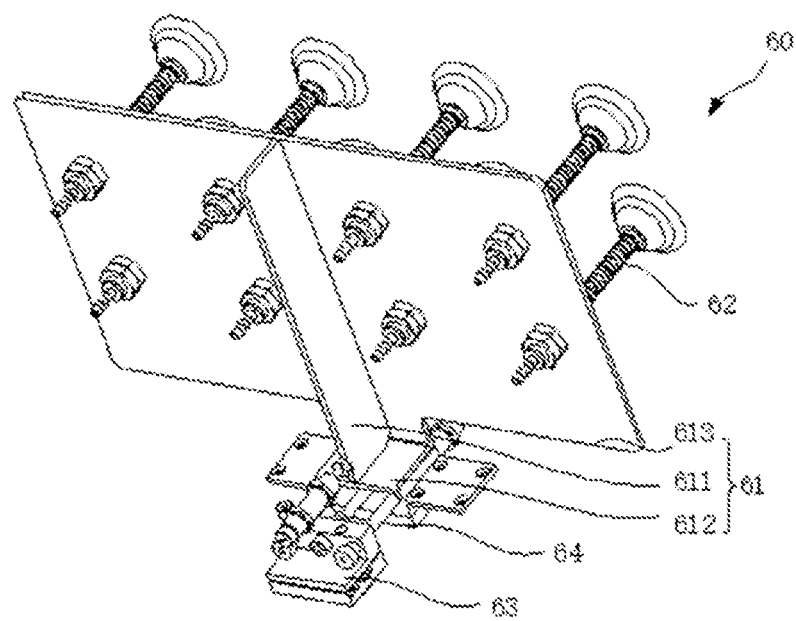
FIG. 16 is a schematic structural diagram of a take-out assembly according to an embodiment of this application.

FIG. 16 is a schematic structural diagram of a take-out assembly according to an embodiment of this application. As shown in FIG. 16, the take-out assembly 60 includes a fixed bracket 61 and a plurality of suction cups 62, where each suction cup 62 may be connected to a negative pressure generating device. When the suction cup 62 is in contact with the front surface of the goods box 600, the negative pressure generating device sucks the air in the suction cup 62, so that the pressure in the suction cup 62 is lower than the atmospheric pressure. Under the action of atmospheric pressure, the suction cup 62 may be firmly adsorbed on the front surface of the goods box 600, thereby fixing the goods box 600.

Each suction cup 62 is located at an end of the fixed bracket 61 away from the transmission belt 40. The fixed bracket 61 includes a fixed connecting plate 611 and a suction cup mounting plate 613 extending in the vertical direction. The fixed connecting plate 611 may be an L-shaped plate or a T-shaped plate, one end of which with a horizontal mounting portion 612 is fixed on the transmission belt 40, and the other end of which is fixedly connected to the suction cup mounting plate 613. The suction cup mounting plate 613 is opposite to the front surface of the goods box 600, and may be a rectangular plate. The plurality of suction cups 62 may be evenly disposed on the suction cup mounting plate 613, and a suction surface of each suction cup 62 faces the front surface of the goods box 600.

In another implementation, the take-out assembly 60 includes a fixed bracket 61 and a magnet. The fixed bracket 61 may be the same as the fixed bracket 61 configured to mount the suction cup 62, and the details are not described herein again. The difference is that the plurality of suction cups 62 on the suction cup mounting plate 613 may be replaced with one or more magnets, and the magnets may be used to attract the front surface of the goods box 600. It may be understood that, at least the front surface of the goods box 600 is guaranteed to be a magnetic adsorption surface. To facilitate the use of magnets to fix the goods box 600, the goods box 600 may be an iron box. The magnet may be an electromagnet, which has magnetism to attract the goods box 600 when energized, and the magnetism disappears when the power is off, so that the goods box 600 can be easily detached from the fixed bracket 61 as needed.

In another implementation, the take-out assembly 60 includes a fixed bracket 61 and a buckle disposed on the fixed bracket 61. The fixed bracket 61 may be the same as the fixed bracket 61 configured to mount the suction cup 62, and the details are not described herein again. The difference is that the plurality of suction cups 62 on the suction cup mounting plate 613 may be replaced with a buckle, and the front surface of the goods box 600 is provided with a slot matched with the buckle. When the fixed bracket 61 moves to the goods box 600 and is in contact with the goods box 600, the buckle may be engaged into the slot to fix the goods box 600 on the take-out assembly. It may be understood that, the suction cups 62 on the suction cup mounting plate 613 may be alternatively replaced with a hook, and the front surface of the goods box 600 is provided with a hook hole matched with the hook.

Based on the foregoing embodiment, to facilitate fixing the end of the fixed bracket 61 facing the transmission belt 40 on the transmission belt 40, a gripper is disposed below the fixing connecting plate 611 of the fixed bracket 61, and the horizontal mounting portion 612 of the fixed connecting plate 611 may be fixed on the surface of the gripper. The transmission belt 40 may be a synchronous belt with transmission teeth on a side. The side of the gripper facing the transmission teeth is provided with a tooth plate that meshing with the teeth, and the transmission belt 40 is fixed in the gripper, to prevent slippage between the transmission belt 40 and the gripper, enhancing the fixing effect of the gripper and the transmission belt 40, so that the transmission belt 40 and the take-out assembly 60 move synchronously.

Figure 17:
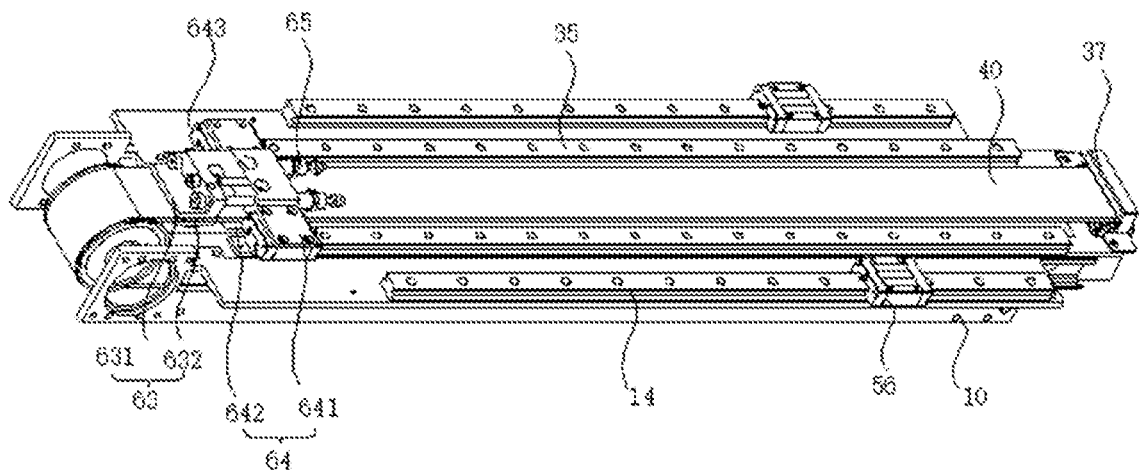
FIG. 17 is a schematic diagram 1 of connection between a take-out assembly and a transmission belt according to an embodiment of this application.

FIG. 17 is a schematic diagram 1 of connection between a take-out assembly and a transmission belt according to an embodiment of this application. As shown in FIG. 17, the gripper provided in this embodiment includes at least one set of gripping assemblies. For example, the gripper includes a first gripping assembly 63, and the first gripping assembly 63 includes a first pressing plate 631 and a first tooth plate 632 disposed oppositely. The first pressing plate 631 is located on and fits with the toothless side of the synchronous belt, the first tooth plate 632 is located on the tooth side of the synchronous belt, and the first tooth plate 632 meshes with the transmission teeth of the synchronous belt. The first tooth plate 632 and the first pressing plate 631 are fixed together by a connecting member, so that the transmission belt 40 is fixed between the first pressing plate 631 and the first tooth plate 632, and the synchronous movement of the fixed bracket 61 and the transmission belt 40 is realized.

The gripper further includes a second gripping assembly 64, the second gripping assembly 64 and the first gripping assembly 63 are disposed oppositely and spaced apart along the first direction, and the second gripping assembly 64 is closer to the goods box 600. The second gripping assembly 64 includes a second pressing plate 641 and a second tooth plate 642 disposed oppositely. The second pressing plate 641 is located on and fits with the toothless side of the synchronous belt, the second tooth plate 642 is located on the tooth side of the synchronous belt, and the second tooth plate 642 meshes with the transmission teeth of the synchronous belt. The second tooth plate 642 and the second pressing plate 641 are fixed together by a connecting member, to fix the synchronous belt in the second gripping assembly 65. The first gripping assembly 63 and the second gripping assembly 64 are connected by a connecting member, to increase the fixing effect of the fixed bracket 61 and the transmission belt 40. That is, the first pressing plate 631 in the first gripping assembly 63 and the second pressing plate 641 in the second gripping assembly 64 may be connected through the connecting member. The fixed connecting plate 611 of the fixed bracket 61 may be fixed to the first pressing plate 631 or the second pressing plate 641, or the bottom of the fixed connecting plate 611 may be fixed to both the first pressing plate 631 and the second pressing plate 641.

Further, to improve the stability of the movement of the take-out assembly 60 in the first direction, a second guide block 643 is disposed on two ends of the second pressing plate 641 in the second gripping assembly 64, and the two ends of the second pressing plate 641 extend toward the sliding seat 31 and form an extension portion. The second guide blocks 643 are located on the extension portion and are opposite to the sliding seat 31. The sliding seat 31 is provided with a second guide rail 35 matching the second guide block 643, the second guide rail 35 is disposed on the horizontal plate 313 of the sliding seat 31, and the second guide rail 35 is located at the edge of the horizontal plate 313 close to the fixed bracket 61. The length direction of the second guide rail 35 is parallel to the first direction. Further, the fixed bracket 61 is driven by the transmission belt 40 to move along the second guide rail 35 of the sliding seat 31, which can improve the sliding stability of the fixed bracket 61, reduce the shock during the movement of the fixed bracket 61, and effectively prevent the goods box 600 from falling off the take-out assembly 60.

When the take-out assembly 60 is driven by the transmission belt 40 to move toward the goods box 600, and the take-out assembly 60 moves to the first limiting structure 37, the take-out assembly 60 can drive the sliding seat 31 to move toward the goods box 600 as a whole. To reduce the impact force when the take-out assembly 60 abuts against the first limiting structure 37, a second buffer 65 may be disposed at the bottom of the fixed bracket 61. The second buffer 65 is located on the second pressing plate 641 of the second gripping assembly 64. The second gripping assembly 64 is closer to the first limiting structure 37 than the first gripping assembly 63, and the second buffer 65 and the first limiting structure 37 are disposed oppositely, that is, the first limiting structure 37 and the second buffer 65 have opposing portions at the same height. When the take-out assembly 60 moves to the first limiting structure 37, the second buffer 65 may abut against the first limiting structure 37 for reducing the impact force between the take-out assembly 60 and the sliding seat 31.

As can be learned from the foregoing embodiment, the transmission belt 40 is disposed in the passage formed by the first supporting plate and the second supporting plate, and the transmission belt 40 may be centrally disposed between the first supporting plate 51 and the second supporting plate 52. In another implementation, two transmission belts 40 are disposed in the passage formed between the first supporting plate 51 and the second supporting plate 52, and the two transmission belts 40 are disposed in parallel. An arrangement space for accommodating various electrical elements is formed between the two transmission belts 40.

Figure 18:
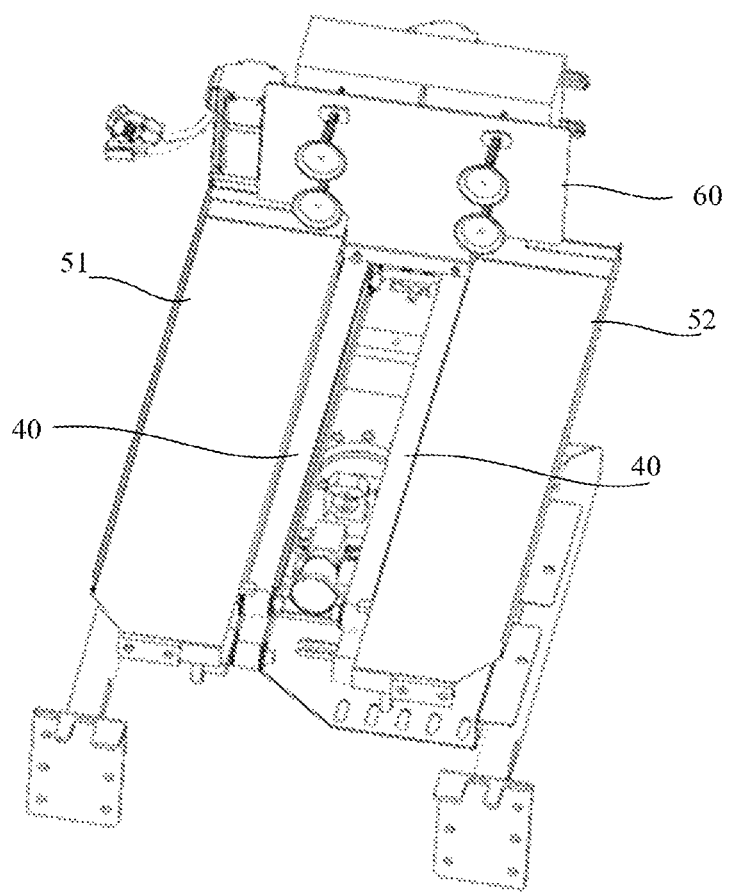
FIG. 18 is a schematic diagram 2 of connection between a take-out assembly and a transmission belt according to an embodiment of this application.

FIG. 18 is a schematic diagram 2 of connection between a take-out assembly and a transmission belt according to an embodiment of this application. As shown in FIG. 18, two synchronous transmission belts 40 are disposed between the first supporting plate 51 and the second supporting plate 52, where one transmission belt 40 is disposed close to the first supporting plate 51, and the other transmission belt 40 is disposed close to the second supporting plate 52. The take-out assembly 60 is connected to the two transmission belts 40 respectively through the foregoing grippers, and can move together with the transmission belts 40. The mounting space for the electrical elements is formed between the two parallel and oppositely disposed transmission belts. For example, a camera device may be disposed between the two transmission belts 40, and the camera device is mounted at the front end of the pedestal 10 through a fixing frame. In this embodiment, by optimizing the arrangement position of the transmission belts, the overall volume of the transport robot can be reduced, making the transport robot more compact and flexible.

Further, to further optimize the structure of the transport robot, based on the foregoing embodiment, the sliding seat 31, the first supporting plate 51, and the second supporting plate 52 may be made in one piece. The first supporting plate 51 and the second supporting plate 52 are slidably mounted on the pedestal 10 thorough the sliding seat 31, and there is no need to dispose the third guide rail 14 slidably mounted with the tray 50 on the pedestal 10, thereby simplifying the structure of the transport robot and reducing the manufacturing costs.

Figure 19:
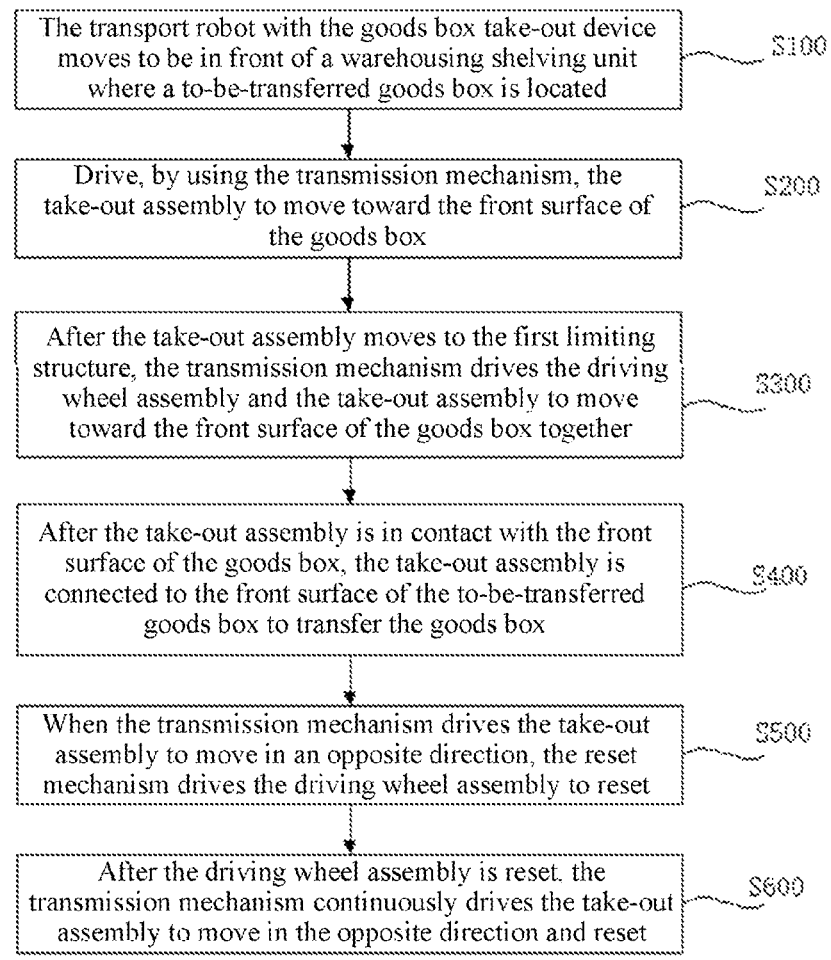
FIG. 19 is a schematic flowchart of steps of a goods box take-out method according to an embodiment of this application.

FIG. 19 is a schematic flowchart of steps of a goods box take-out method according to an embodiment of this application. As shown in FIG. 19, the goods box take-out method provided in this embodiment of this application includes the following steps:

Step S100: The transport robot with the goods box take-out device 100 moves to be in front of a warehousing shelving unit where a to-be-transferred goods box is located. For example, after receiving an instruction to transfer a goods box 600, the transport robot uses the walking mechanism of the base 300 thereof to move to the warehousing shelving unit 500 where the goods box 600 is located, and adjusts the height of the goods box take-out device 100, so that the take-out assembly 60 of the goods box take-out device 100 is opposite to the front surface of the goods box 600.

Step S200: Drive, by using the transmission mechanism, the take-out assembly 60 to move toward the front surface of the goods box 600. For example, after the take-out assembly 60 faces the front surface of the goods box 600, the driving device 70 drives the transmission mechanism and drives the transmission belt 40 in the transmission mechanism to drive in the first direction, so that the take-out assembly 60 moves toward the front surface of the goods box 600.

Step S300: After the take-out assembly 60 moves to the first limiting structure 37, the transmission mechanism drives the movable wheel assembly 30 and the take-out assembly 60 to move toward the front surface of the goods box 600 together. For example, the take-out assembly 60 is driven by the transmission belt 40 to move toward the front surface of the goods box 600, the take-out assembly 60 moves to and abuts against the first limiting structure 37 at the front end of the sliding seat 31, and the transmission belt 40 continues to move toward the first direction and overcome the restoring force of the reset mechanism, so that the take-out assembly 60 and the movable wheel assembly 30 move toward the front surface of the goods box 600 and move to the goods box 600.

Step S400: After the take-out assembly 60 is in contact with the front surface of the goods box 600, the take-out assembly is connected to the front surface of the to-be-transferred goods box 600 to transfer the goods box 600. For example, after the take-out assembly 60 moves to the front surface of the goods box 600, the take-out assembly 60 is in contact with the front surface of the goods box 600 and is connected to the goods box 600. For example, after the take-out assembly 60 moves to the goods box 600, the suction cups 62 in the take-out assembly 60 are in contact with the front surface of the goods box 600, and the suction cups 62 are adsorbed on the front surface of the goods box 600, thereby fixing the goods box 600 on the take-out assembly.

Step S500: When the transmission mechanism drives the take-out assembly 60 to move in an opposite direction, the reset mechanism drives the movable wheel assembly 30 to reset. For example, after the goods box 600 is fixed to the take-out assembly 60, the driving device 70 drives the transmission mechanism and drives the transmission belt 40 to move in the second direction. In this case, under the action of the restoring force of the reset mechanism, the movable wheel assembly returns to the initial position. That is, the motor reverses and drives the transmission belt 40 away from the warehousing shelving unit 500. In this case, the first movable wheel 32 and the second movable wheel 33 disposed on the sliding seat 31 return to the initial position under the action of the restoring force of the reset mechanism.

Step S600: After the movable wheel assembly 30 is reset, the transmission mechanism continuously drives the take-out assembly 60 to move in the opposite direction and reset. For example, after the movable wheel assembly 30 retreats to the initial position, the transmission belt 40 continues to drive in the second direction, thereby driving the take-out assembly 60 to continue to move in the direction away from the warehousing shelving unit 500 and move to the initial position.

Embodiment II

The transport robot includes a goods box take-out device, the goods box take-out device includes a pedestal, a tray mounted on the pedestal, and a take-out assembly, the tray is fixedly mounted on the pedestal, and the take-out assembly is configured to take out the goods box from the warehousing shelving unit and place the goods box on the tray. When the goods box take-out device is used to transfer the goods box, a specific gap needs to be maintained between the tray and the warehousing shelving unit to prevent the warehousing shelving unit from tipping due to the impact force generated when the tray is driven by the goods box take-out device to be in contact with the warehousing shelving unit. However, due to the gap between the tray and the warehousing shelving unit, during the transfer of the goods box from the warehousing shelving unit to the tray, once the goods box is detached from the take-out assembly, the goods box may fall from the gap to the ground and be damaged.

To resolve the foregoing problem, in the transport robot provided in the embodiments of this application, the tray may move to the warehousing shelving unit under the action of the tension generating mechanism. To eliminate the gap between the tray and the warehousing shelving unit, the tray is located under the goods box, which can prevent the goods box from falling to the floor and being damaged. In addition, the impact force generated by the tray in contact with the warehousing shelving unit under the action of the tension generating mechanism is smaller than the impact force generated by the tray driven by the goods box take-out device to be in contact with the warehousing shelving unit, thereby prevent the warehousing shelving unit from tipping.

FIG. 1 is a schematic diagram of an operating status of a transport robot according to an embodiment of this application. As shown in FIG. 1, the transport robot provided in this embodiment of this application includes: a robot body and a goods box take-out device 100 mounted on the robot body, where the robot body includes a rotary mechanism 200, a base 300, and a robot rack 400. The base 300 is configured to support assembly or devices mounted on the base 300. The base 300 is provided with a walking mechanism for driving the base 300 to move on the ground of the warehousing area. The robot rack 400 is fixedly mounted on the base 300. The robot rack 400 includes a plurality of goods box storage space for temporarily storing a transported goods box 600.

FIG. 2 is a schematic structural diagram of a rotary mechanism according to an embodiment of this application. As shown in FIG. 2, a rotary mechanism 200 is mounted on a beam of the robot rack 400 and can move up and down along the robot rack 400. The rotary mechanism 200 includes a mounting frame 210 and a rotary assembly 220, where one end of the mounting frame 210 is fixedly connected to the beam through screws and bolts, and can move up and down along the robot rack 400 along with the beam. It may be understood that, in this embodiment, the connection manner of the mounting frame 210 and the beam is not limited, and the mounting frame 220 can not only be fixed on the beam by the foregoing screws and bolts, but also can be fixed on the beam in other manners, for example, being clamped on the beam.

The rotary assembly 220 is mounted on the mounting frame 210 and can rotate relative to the mounting frame 210 around a rotation axis of the rotary assembly 220. For example, taking a placement orientation of the rotary mechanism in FIG. 2 as an example, the mounting frame 210 is disposed approximately parallel to the ground, that is, the mounting frame 210 extends in the horizontal direction. A rotation axis Li of the rotary assembly 220 is perpendicular to the ground. When the rotary assembly 220 rotates relative to the mounting frame 210 around the rotation axis, the rotary assembly 220 rotates in the space substantially parallel to the ground.

FIG. 3 is a schematic diagram of connection between a rotary mechanism and a goods box take-out device according to an embodiment of this application. As shown in FIG. 3, the goods box take-out device 100 is mounted on the rotary assembly 220. When the rotary assembly 220 rotates relative to the mounting frame 210 around the rotation axis, driven by the rotary assembly 220, the goods box take-out device 100 can rotate relative to the mounting frame 210 around the rotation axis of the rotary assembly 220, so that after taking out the goods box 600, the goods box take-out device 100 can rotate by a specific angle, for example, 90°; and place the goods box 600 on the robot rack 400. When the rotary mechanism 200 moves up and down along the robot rack 400, the goods box take-out device 100 follows the rotary mechanism 200 to move up and down along the robot rack 400 to adjust the height of the goods box take-out device 100 from the ground, to facilitate taking out or placing the goods box 600 on a warehousing shelving unit 500 at different heights.

Figure 20:
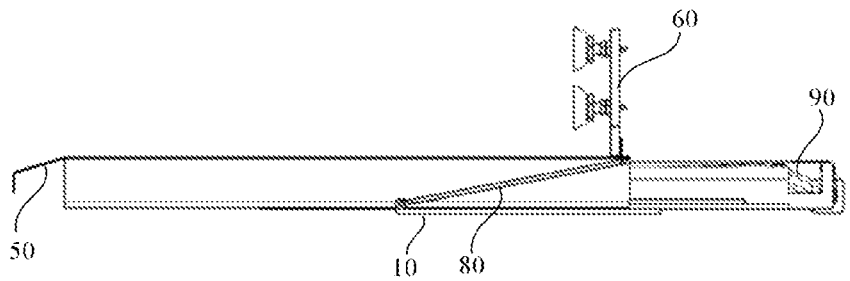
FIG. 20 is a schematic diagram of connection between a tension generating mechanism, and a pedestal and a tray according to an embodiment of this application.

FIG. 4 is a schematic structural diagram of a goods box take-out device according to an embodiment of this application. FIG. 20 is a schematic diagram of connection between a tension generating mechanism, and a pedestal and a tray according to an embodiment of this application. The goods box take-out device is further described below with reference to the accompanying drawings. First, a first direction and a second direction defined in the embodiments are described: When the take-out assembly 60 is used to take out the goods box 600 located on the warehousing shelving unit 500, a direction in which the take-out assembly 60 moves toward the warehousing shelving unit 500 is the first direction, and the moving direction of the take-out assembly 60 as shown in FIG. 1 and FIG. 4 is the first direction. A direction in which the take-out assembly 60 moves away from the warehousing shelving unit 500 is the second direction, that is, the first direction is opposite to the second direction.

In addition, in the state of the goods box take-out device 100 shown in FIG. 1, to facilitate the description of the transmission mechanism and a motion status of the take-out assembly 60, two ends of the pedestal 10 are respectively defined as a rear end of the pedestal 10 and a front end of the pedestal 10 along the first direction. When the goods box 600 located on the warehousing shelving unit 500 is taken out by the take-out assembly 60, the front end of the pedestal 10 needs to be close to the warehousing shelving unit 500, and the end opposite to the front end of the pedestal 10 is the rear end of the pedestal 10. In the state of the goods box take-out device 100 shown in FIG. 4, when the take-out assembly 60 is located at the rear end of the pedestal 10, the rear end may be defined as an initial position of the take-out assembly 60.

As shown in FIG. 4 and FIG. 20, the goods box take-out device 100 includes: a pedestal 10, a transmission mechanism, a tray assembly, a take-out assembly 60, and a driving device, where the pedestal 10 is mounted on the rotary assembly 220 and can rotate with the rotary assembly 220. The tray assembly is mounted on the side of the pedestal 10 away from the rotary assembly 220. The tray assembly is configured to carry the to-be-transferred goods box 600. The tray assembly includes a tray 50, a first limiting structure 70, and a tension generating mechanism 80. The tray 50 is slidably mounted on the pedestal 10. One end of the tension generating mechanism is connected to the tray 50, and can provide the tray 50 with a tension to move toward the warehousing shelving unit. Along the first direction, the end of the tray 50 close to the warehousing shelving unit 500 is defined as the front end, and the end of the tray 50 away from the warehousing shelving unit 500 is defined as the rear end. The first limiting structure 60 is located at the rear end of the tray 50, the first limiting structure 70 is closer to the rear end of the tray 50 than the take-out assembly 60, and the first limiting structure 70 abuts against the take-out assembly 60.

The transmission mechanism and the driving device are both mounted on the pedestal 10, and the driving device is connected to the transmission mechanism for driving the transmission mechanism to perform power transmission. The transmission mechanism includes a fixed wheel assembly 20, a movable wheel assembly 30, and a transmission belt 40 wound around fixed wheels of the fixed wheel assembly 20 and movable wheels of the movable wheel assembly 30. The take-out assembly 60 is fixed on the transmission belt 40. When the driving device 70 drives the transmission mechanism to perform power transmission, the take-out assembly 60 is driven by the transmission belt 40 to move toward the goods box 600. In this case, the first limiting structure 70 and the take-out assembly 60 are released from the abutment state. The tray 50 moves toward the warehousing shelving unit 500 under the action of the tension generating mechanism 80, and can abut against the warehousing shelving unit 500. When the take-out assembly 60 moves to the set position, the take-out assembly 60 may be connected to the goods box 600.

As the transmission mechanism is driven in the reverse direction, and drives the take-out assembly 60 to move in the direction away from the warehousing shelving unit 500, the take-out assembly 60 transfers the goods box 600 to the tray 50. The take-out assembly 60 continues to move, and the take-out assembly 60 can move to the first limiting structure 70 on the tray 50 and abut against the first limiting structure 70, thereby driving the tray 50 and the take-out assembly 60 to reset together. Further, the goods box 600 may be transferred from the tray 50 to the robot rack 400 or other warehousing shelving units 500.

When the transport robot provided in the embodiments of this application is used to transfer the goods box, the tray 50 may move toward the warehousing shelving unit 500 under the action of the tension generating mechanism 80, and the tray 50 may abut against the warehousing shelving unit 500, which can eliminate the gap between the warehousing shelving unit 500 and the tray 50, thereby preventing the goods box 500 from falling to the ground and being damaged during the transfer of the goods box 600. In addition, the tension of the tension generating mechanism 80 on the tray 50 is much smaller than the driving force of the goods box take-out device. Therefore, the impact force generated by the tray 50 in contact with the warehousing shelving unit 500 under the action of the tension generating mechanism 80 is smaller than the impact force generated by the tray 50 driven by the goods box take-out device to be in contact with the warehousing shelving unit, thereby prevent the warehousing shelving unit from tipping.

FIG. 5 is a schematic structural diagram of a pedestal according to an embodiment of this application. As shown in FIG. 5, the pedestal 10 provided in this embodiment includes two support plates 11 and a bottom connecting plate 12 connecting the two support plates 11. The two support plates 11 are disposed in parallel and spaced apart along the first direction, and mounting space for the fixed wheel assembly 20 and the movable wheel assembly 30 is formed between the two support plates 11. The fixed wheel assembly 20 is fixedly mounted between the two support plates 11, and the movable wheel assembly 30 is slidably mounted between the two support plates 11 through the sliding seat 31 (referring to the sliding seat shown in FIG. 9). The bottom connecting plate 12 is disposed at the bottom of the two support plates 12 and connects the two support plates 12 together. The bottom connecting plate 12 is connected to the rotary assembly 220, so that the pedestal 10 can rotate following the rotary assembly 220.

For ease of description, the two support plates 11 may be respectively defined as a first support plate and a second support plate, where the first support plate and the second support plate each include a first bearing plate 111 and a second bearing plate 112. The first bearing plate 111 is disposed in the horizontal direction, the second bearing plate 112 is disposed in the vertical direction, and the first bearing plate 111 and the second bearing plate 112 are vertically connected to form the L-shaped support plate 11, or each support plate 11 may be made of angle steel.

The first bearing plate 111 is configured to carry the tray 50 disposed above the pedestal 10, the tray 50 is slidably disposed on the first bearing plate 111, and a third guide rail 14 for the tray 50 to slide relative to the pedestal 10 may be disposed on each of the first bearing plates 111. The second bearing plate 112 may be used to mount the fixed wheel assembly 20. Along the first direction, a front end and a rear end of the second bearing plate 112 are respectively provided with mounting holes for mounting the fixed wheels in the fixed wheel assembly 20. A rotation axis of each fixed wheel is perpendicular to the second bearing plate 112.

It may be understood that, since the quantity of fixed wheels of the fixed wheel assembly 20 located between the two bearing plates 112 may be set according to actual needs, in some embodiments, the fixed wheel assembly may include two fixed wheels, and a schematic diagram of mounting of the fixed wheel assembly and the pedestal is shown in FIG. 6. In some embodiments, the fixed wheel assembly may further include three or more fixed wheels. When the fixed wheel assembly includes three fixed wheels, a schematic diagram of mounting of the fixed wheel assembly and the pedestal is shown in FIG. 7.

FIG. 6 is a schematic diagram 1 of mounting of a fixed wheel assembly and a pedestal according to an embodiment of this application. As shown in FIG. 6, the fixed wheel assembly 20 includes two fixed wheels, the two fixed wheels are a first fixed wheel 21 and a second fixed wheel 22 respectively, and the first fixed wheel 21 and the second fixed wheel 22 are respectively mounted at the front end and the rear end of the pedestal 10. The space formed by the transmission belt 40 wound around the first fixed wheel 21 and the second fixed wheel 22 respectively is mounting space for the movable wheels in the movable wheel assembly 30.

The first fixed wheel 21 is mounted at a front end of each second bearing plate 112 and is located between the two second bearing plates 112. The first fixed wheel 21 is configured to guide the transmission belt 40. The first fixed wheel 21 includes a wheel body and a wheel shaft connected to the wheel body, and two ends of the wheel shaft may be respectively mounted on the second bearing plates 112. Each second bearing plate 112 is provided with a first mounting hole 113 matching the wheel shaft of the first fixed wheel 21, the wheel shaft of the first fixed wheel 21 is mounted in the first mounting hole 113, and the first fixed wheel 21 can rotate relative to the second bearing plate 112.

The second fixed wheel 22 is mounted on the rear end of the second bearing plate 112, the rear end of each second bearing plate 112 is respectively provided with a second mounting hole 114, and each second mounting hole 114 is provided with a bearing seat. The wheel shaft of the second fixed wheel 22 is mounted in a bearing located in the bearing seat, and driven by the transmission belt 40, the second fixed wheel can rotate relative to the pedestal 10. The second fixed wheel may be used as a movable wheel, and drives the first fixed wheel to rotate through the transmission belt 40.

Further, as shown in FIG. 6, the second fixed wheel 22 is mounted at the rear end of the pedestal 10, and the second fixed wheel 22 is connected to the driving device through the wheel shaft. Driven by the driving device, the second fixed wheel 22 can rotate relative to the pedestal 10, thereby driving the transmission belt 40 to move relative to the pedestal 10. In addition, the driving device 70 includes a motor and a reducer connected to the motor. The motor is connected to the wheel shaft of the second fixed wheel 22 through the reducer. By controlling the forward and reverse rotation of the motor, the transmission belt 40 can move in the first direction or the second direction. The moving direction of the transmission belt 40 may be consistent with the moving direction of the take-out assembly 60, referring to the first direction and the second direction shown in FIG. 4.

FIG. 7 is a schematic diagram 2 of mounting of a fixed wheel assembly and a pedestal according to an embodiment of this application. As shown in FIG. 7, the fixed wheel assembly 20 includes three fixed wheels, including a first fixed wheel 21, a third fixed wheel 23, and a fourth fixed wheel 24. The first fixed wheel 21 is mounted at the front end of the pedestal 10, and the third fixed wheel 23 and the fourth fixed wheel 24 are mounted at the rear end of the pedestal 10, the third fixed wheel 23 and the fourth fixed wheel 24 are distributed at the rear end of the pedestal 10 at an interval along the direction perpendicular to the first direction. The transmission belt 40 is wound around the first fixed wheel 21, the third fixed wheel 23, and the fourth fixed wheel 24 respectively to form the mounting space for the movable wheels of the movable wheel assembly 30.

The manner in which the first fixed wheel 21 is mounted at the front end of the pedestal 10 remains unchanged, and the details are not repeated herein. The difference between the embodiment shown in FIG. 7 and the embodiment shown in FIG. 6 is that the rear end of the pedestal 10 is provided with a third mounting hole and a fourth mounting hole respectively, and the third mounting hole and the fourth mounting hole are disposed at the rear end of the pedestal 10 at an interval in the vertical direction. The wheel shaft of the third fixed wheel 23 is mounted in the third mounting hole of the pedestal 10, and the third fixed wheel 23 can rotate relative to the pedestal 10. The wheel shaft of the fourth fixed wheel 24 is mounted in the fourth mounting hole of the pedestal 10, and the fourth fixed wheel 24 can rotate relative to the pedestal 10. Moreover, the driving device 70 can be selectively connected to one of the third fixed wheel 23 and the fourth fixed wheel 24, to drive the transmission belt 40 to move relative to the pedestal 10.

The second bearing plate 112 can be used to mount the fixed wheel assembly 20, and the second bearing plate 112 can be further used to mount the movable wheel assembly 30. A first guide block 13 for mounting the movable wheel assembly 30 is disposed on the second bearing plate 112. The first guide block 13 is disposed in a strip shape on the second bearing plate 112 along the first direction, so that the movable wheel assembly 30 can slide relative to the pedestal 10 along the first direction.

FIG. 9 is a schematic structural diagram of a sliding seat according to an embodiment of this application. FIG. 8 is a schematic diagram of arrangement of a first movable wheel, a second movable wheel, a second buffer, a first guide rail, and a second guide rail on a sliding seat according to an embodiment of this application.

As shown in FIG. 8 and FIG. 9, the movable wheel assembly 30 includes a sliding seat 31, a first movable wheel 32, and a second movable wheel 33. Along the first direction (the first direction shown in FIG. 8), two ends of the sliding seat 30 may be respectively defined as a front end of the sliding seat 30 and a rear end of the sliding seat 30, the first movable wheel 32 is mounted at the front end of the sliding seat 31, and the second movable wheel 33 is mounted at the rear end of sliding seat 31. The sliding seat 31 is slidably mounted on the pedestal 10, and the sliding seat 31 is provided with a first guide rail 34 slidably connected to the pedestal 10. The first guide rail 34 cooperates with the first guide block 13 disposed on the second bearing plate 112, so that the sliding seat 31 can move in the first direction or the second direction along the pedestal 10.

The sliding seat 31 includes two mounting plates 311 and a connecting plate 314 located between the two mounting plates 311. A connecting plate 314 is respectively disposed at a front end and a rear end of the two mounting plates 311 to enhance the structural strength of the sliding seat 31. For ease of description, the two mounting plates 311 may be a first mounting plate and a second mounting plate respectively. The first mounting plate and the second mounting plate each include a vertical plate 312 and a horizontal plate 313, and the vertical plate 312 and the horizontal plate 313 are connected vertically and form an L-shaped mounting plate 311. Length directions of the first mounting plate and the second mounting plate are parallel to the first direction (the first direction shown in FIG. 9). The first mounting plate and the second mounting plate are spaced apart and parallel to each other, and form mounting space for the first movable wheel 32 and the second movable wheel 33.

Two ends of the wheel shaft of the first movable wheel 32 are respectively connected to a front end of each vertical plate 312, and the first movable wheel 32 mounted on the sliding seat 31 can rotate relative to the sliding seat 31. Two ends of the wheel shaft of the second movable wheel 33 are respectively connected to a rear end of each vertical plate 312, and the second movable wheel 33 mounted on the sliding seat 31 can rotate relative to the sliding seat 31.

The first guide rail 34 is located on the vertical plate 312, a length direction of the first guide rail 34 is parallel to the first direction, and the first guide rail 34 is matched with the first guide block 13 on the pedestal 10, so that the sliding seat 31 can be slidably mounted on the pedestal 10. A second guide rail 35 is mounted on the horizontal plate 313, and the second guide rail 35 cooperates with a second guide block disposed on the take-out assembly 60, so that the take-out assembly 60 can slide relative to the sliding seat 31 along the second guide rail 35 in the first direction or the second direction.

The front end of the sliding seat 31 is further provided with a second limiting structure 37 abutting against the take-out assembly 60. The second limiting structure 37 may be a second limiting plate, and two ends of the second limiting plate are respectively fixed on the horizontal plates 313. That is, the second limiting plate spans between the two mounting plates 311, so that the second limiting plate can abut against the take-out assembly 60.

When the take-out assembly 60 moves toward the goods box 600, the second limiting plate may abut against the take-out assembly 60. As the transmission belt 40 continues to be driven toward the goods box 600, the take-out assembly 60 drives the second limiting plate and the sliding seat 31 to continue to move toward the goods box 600, so that the take-out assembly 60 moves toward the interior of the warehousing shelving unit 500 and is connected to the to-be-transferred goods box 600, thereby expanding the moving stroke of the take-out assembly 60. Therefore, the goods box 600 located deeper in the warehousing shelving unit 500 can be taken out, which improves the reliability of the operation of the take-out assembly 60.

After the take-out assembly 60 is in contact with the goods box 600 and the goods box 600 is fixed, the take-out assembly 60 starts to return and is ready to transfer the goods box 600 to the tray 50. The reset mechanism starts to work, so that under the action of the restoring force of the reset mechanism, the sliding seat 31 moves along the second direction and can quickly return to the initial position, thereby improving the efficiency of carrying the goods box by the transport robot.

Further, the reset mechanism provided in this embodiment may be a reset spring, an elastic belt, or a counterweight disposed at the rear end of the sliding seat 31. Certainly, the reset mechanism may be alternatively other elements or assemblies that can provide the restoring force for the sliding seat 31 to move toward the second direction. According to different structural forms of the reset mechanism, this embodiment may include but not limited to the following implementations, as shown in FIG. 21 and FIG. 22.

Figure 21:
FIG. 21 is a schematic diagram 1 of mounting of a reset mechanism according to an embodiment of this application.

FIG. 21 is a schematic diagram 1 of mounting of a reset mechanism according to an embodiment of this application. As shown in FIG. 21, the reset mechanism may be alternatively an elastic belt 91. One end of the elastic belt 91 is sleeved on the wheel shaft of the second movable wheel 33 at the rear end of the sliding seat 31, and the other end of the elastic belt 91 is sleeved on the wheel shaft of the second fixed wheel 22. Alternatively, the other end of the elastic belt 91 is sleeved on the wheel shaft of one of the third fixed wheel 23 and the fourth fixed wheel 24. When the take-out assembly 60 moves to the goods box 600 together with the sliding seat 31, the elastic belt 91 is continuously stretched during the forward movement of the sliding seat 31. When the take-out assembly 60 returns, the elastic belt 91 provides a restoring force for the sliding seat 31 to quickly return to the initial position.

Figure 22:
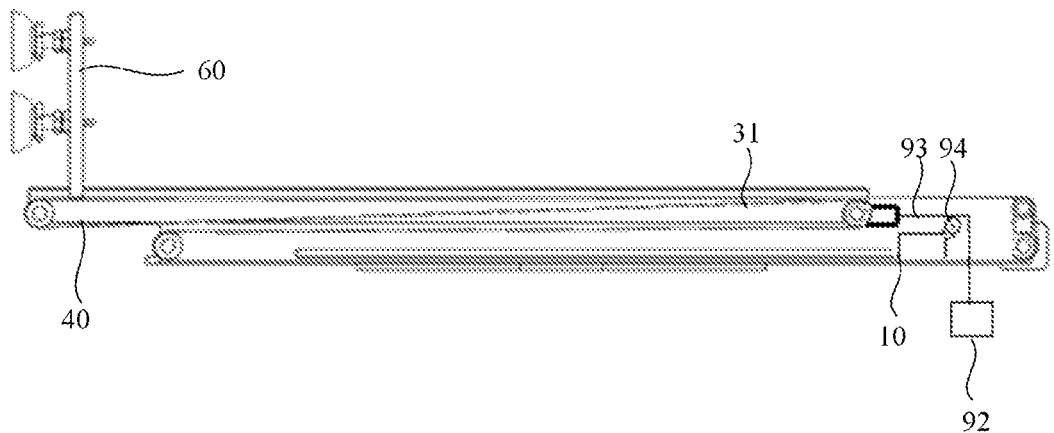
FIG. 22 is a schematic diagram 2 of mounting of a reset mechanism according to an embodiment of this application.

FIG. 22 is a schematic diagram 2 of mounting of a reset mechanism according to an embodiment of this application. As shown in FIG. 22, the reset mechanism includes a second counterweight 92, a second rope 93, and a second direction-changing wheel 94, and uses the gravity generated by the second counterweight 92 to change the direction of action of the force through the second direction-changing wheel 94, to provide the sliding seat 31 with a tension for the movement along the second direction.

For example, the second direction-changing wheel 94 is mounted at the rear end of the pedestal 10. A second direction-changing wheel 94 may be mounted on each of the two support plates 11 of the pedestal 10, and the two second direction-changing wheels 94 may be disposed oppositely and located on the second bearing plate 112. An axis of a rotation shaft of the second direction-changing wheel 94 is perpendicular to the second bearing plate 112. Correspondingly, each second direction-changing wheel 94 is provided with a second rope 93. That is, a set of reset mechanisms 90 are disposed on two sides of the sliding seat 31 respectively, and the two sets of reset mechanisms 90 are symmetrically disposed on the sliding seat 31.

One end of the second rope 93 is wound around the second direction-changing wheels 94 and horizontally connected to the rear end of the sliding seat 31, and may be connected to the horizontal plate of each mounting plate 311 of the sliding seat 31. The other end of the second rope 93 extends in the direction perpendicular to the ground after passing through the second direction-changing wheels 94 and is connected to the second counterweight 92. Therefore, the gravity generated by the second counterweight 92 is transmitted to the sliding seat 31 along the second rope 93 to provide the sliding seat 31 with a tension in the second direction, so that the sliding seat 31 can be restored to the initial position.

In some embodiments, when the sliding seat 31 moves toward the second direction and retreats to the initial position under the action of the reset mechanism, to prevent the sliding seat 31 from sliding out of the pedestal 10 instead of reaching the preset initial position, a limiting device that cooperates with the sliding seat 31 is generally disposed on the pedestal 10, as shown in FIG. 10.

FIG. 10 is a schematic diagram of mounting of a second buffer and a collision block according to an embodiment of this application. As shown in FIG. 10, when the sliding seat 31 rapidly moves toward the rear end of the pedestal 10, to limit the sliding seat 31: two collision blocks 15 are disposed at the rear end of the pedestal 10, where each collision block 15 is a rectangular block, and each collision block 15 is disposed opposite to the vertical plate 312 of the sliding seat 31. The two collision blocks 15 are respectively fixed on the rear ends of the first support plate and the second support plate of the pedestal 10, and the collision blocks 15 may be located on the second bearing plate 112 of the support plate 11.

To reduce the impact force when the sliding seat 31 is in contact with the collision blocks 15, the rear end of the sliding seat 31 is provided with two second buffers 36. The two second buffers 36 are respectively located at the rear ends of the first mounting plate and the second mounting plate of the sliding seat 31. The second buffers 36 may be located on the vertical plate 312 of each mounting plate 311, and the second buffers 36 and the collision blocks 15 are oppositely disposed. That is, when the second buffer 36 moves toward the rear end of the pedestal 10 along with the sliding seat 31, the collision blocks 15 are located on a sliding path of the second buffer 36. The second buffers 36 may abut against the collision blocks 15. The second buffers 36 reduce the impact force between the sliding seat 31 and the pedestal 10. Therefore, the shock to the goods take-out device is reduced, so that the goods box 600 can be stably fixed on the take-out assembly 60 in the process of transferring the goods box 600.

FIG. 14 is a schematic diagram of connection between a tray assembly and a take-out assembly according to an embodiment of this application. As shown in FIG. 14 and in conjunction with FIG. 1, based on the foregoing embodiment, to further improve the stability of the goods box 600 in the transfer process and prevent the goods box 600 from being damaged in the transfer process, the tray assembly provided in this embodiment includes a tray 50, a tension generating mechanism 80, and a first limiting structure 70 disposed at the rear end of the tray 50. The middle portion of the tray 50 forms a passage along which the take-out assembly 60 slides, and the first limiting structure 70 is located at the rear end of the sliding seat.

When the take-out assembly 60 is at the initial position, the first limiting structure 70 does not slide relative to the pedestal 10 under the limit of the take-out assembly 60. When the take-out assembly 60 moves toward the warehousing shelving unit 500, the tray 50 moves toward the warehousing shelving unit 500 under the action of the tension generated by the tension generating mechanism 70, and can abut against the edge of the warehousing shelving unit 500, thereby eliminating the gap between the warehousing shelving unit 500 and the tray, and preventing the goods box from falling to the ground and being damaged.

The tray 50 includes a first supporting plate 51 and a second supporting plate 52. Along the first direction, the first supporting plate 51 and the second supporting plate 52 are disposed oppositely and in parallel, and a specific interval is maintained between the first supporting plate 51 and the second supporting plate 52 to form a passage for accommodating the take-out assembly 60 and the transmission mechanism. An end of the take-out assembly 60 is fixedly connected to the transmission belt 40 in the passage, and an end of the take-out assembly 60 away from the transmission belt 40 protrudes out of the tray 50, so that the taken out goods box 600 can be placed on the tray 50.

The first supporting plate 51 and the second supporting plate 52 are strip-shaped plates, and a third guide block 55 is disposed on the bottom surface of one side of the first supporting plate 51 and the second supporting plate 52. The third guide block 55 may be matched with the third guide rail 14 on the pedestal 10, so that the first supporting plate 51 is slidably mounted on the first support plate of the pedestal 10, the second supporting plate 52 is slidably mounted on the second support plate of the pedestal 10, and the first supporting plate 51 and the second supporting plate 52 are both located on the first bearing plate 111 of each support plate 11.

Further, the rear ends of the first supporting plate 51 and the second supporting plate 52 are provided with a first limiting structure 70, and the first limiting structure 70 may be a first limiting plate. The first limiting plate connects the first supporting plate 51 and the second supporting plate 52 together. That is, the first limiting plate spans between the first supporting plate 51 and the second supporting plate 52, and is disposed opposite to the take-out assembly 60. The first limiting plate is located on the side of the take-out assembly 60 away from the warehousing shelving unit 500, and when the take-out assembly 60 is at the initial position, the second limiting plate abuts against the take-out assembly 60.

A first buffer 71 is disposed on the first limiting plate. The first buffer 71 is configured to reduce the impact force when the first limiting plate abuts against the take-out assembly 60, and reduce the shock to the take-out assembly 60. Further, the goods box 600 can be stably connected to the take-out assembly 60. For example, after the take-out assembly 60 is fixed with the to-be-transferred goods box 600, the take-out assembly 60 is driven by the transmission belt 40 to move toward the second direction. After moving for a specific distance, the take-out assembly 60 abuts against the first limiting plate, and under the action of the first buffer 71, the impact force between the take-out assembly 60 and the tray can be reduced.

In addition, the front end of the first supporting plate 51, the front end of the second supporting plate 52, the side of the first supporting plate 51 away from the second supporting plate 52, and the side of the second supporting plate 52 away from the first supporting plate 51 are each provided with a flange. The flanges are disposed on the first supporting plate 51 and the second supporting plate 52, which can form protective space below the tray 50, and facilitate the mounting of protective devices at an edge position of each supporting plate. For example, an anti-collision rubber pad or the like is disposed on the outer flange of each supporting plate to provide effective protection when the transport robot collides with pedestrians or other objects when transferring the goods box.

For example, the first supporting plate 51 is provided with a first buffer pad 53, and the first buffer pad 53 is located at the front end of the first supporting plate 51 and is located at an end surface of the first supporting plate 51 facing the goods box 600. The first buffer pad 53 can cover front end surface of the entire first supporting plate 51. The first buffer pad 53 is used to buffer the impact force generated when the tray 50 moves to the warehousing shelving unit 500, to avoid the risk of tipping the warehousing shelving unit 500 due to the impact force. The first buffer pad 53 may be made of an elastic rubber pad, and has a specific thickness. Similarly, the front end of the second supporting plate 52 is provided with a second buffer pad 54, and the second buffer pad 54 is located on the end surface of the second supporting plate 52 facing the goods box 600. For this arrangement, reference may be made to the connection manner of the first buffer pad 53 and the first supporting plate 51, and the details are not described herein again.

Referring to FIG. 20, the tension generating mechanism 80 provided in this embodiment may be a tension spring or a counterweight disposed on the tray 50. Certainly, the tension generating mechanism may be alternatively other components or assemblies that can provide the restoring force, as long as the tension can be provided for the tray to move toward the warehousing shelving unit. According to different structural forms of the reset mechanism, this embodiment may include but not limited to the following implementations, as shown in FIG. 23 and FIG. 24.

Figure 23:
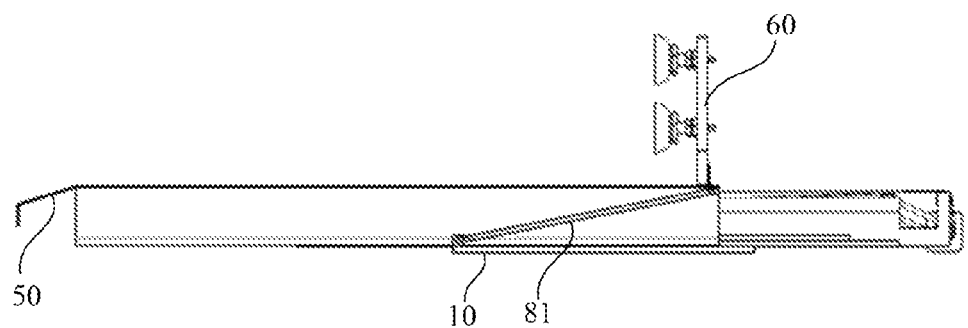
FIG. 23 is a schematic structural diagram 1 of a tension generating mechanism according to an embodiment of this application.

FIG. 23 is a schematic structural diagram 1 of a tension generating mechanism according to an embodiment of this application. As shown in FIG. 23, the tension generating mechanism 80 may be alternatively a tension spring, where one end of the tension spring 81 may be fixed at the front end of the pedestal 10, and the other end of the tension spring 81 may be fixed at the rear end of the tray 50. When the take-out assembly 60 starts to move toward the warehousing shelving unit 500, the take-out assembly 60 and the first limiting plate of the tray 50 are unlocked. The first limiting plate is under the action of the tension spring 81, the tray 50 moves toward the warehousing shelving unit 500, and the front end of the tray 50 abuts against the warehousing shelving unit 500.

Figure 24:
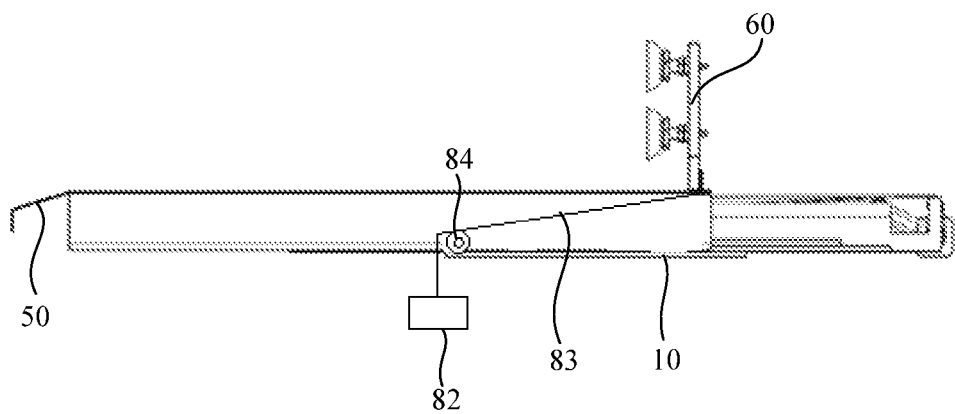
FIG. 24 is a schematic structural diagram 2 of a tension generating mechanism according to an embodiment of this application.

FIG. 24 is a schematic diagram 2 of mounting of a tension generating mechanism according to an embodiment of this application. As shown in FIG. 24, the tension generating mechanism 80 includes a first counterweight 82, a first rope 83, and a first direction-changing wheel 84, and uses the gravity generated by the first counterweight 82 to change the direction of action of the force through the first direction-changing wheel 84, to provide the tray 50 with a tension for the movement along the first direction. For example, the first direction-changing wheel 84 is mounted at the front end of the pedestal 10. A first direction-changing wheel 84 may be mounted on each of the two support plates 11 of the pedestal 10, and the two first direction-changing wheels 84 may be disposed oppositely and located on the second bearing plate 112. An axis of a rotation shaft of the first direction-changing wheel 84 is perpendicular to the second bearing plate 112. Correspondingly, each first direction-changing wheel 84 is provided with a first rope 83. That is, a set of tension generating mechanisms 80 are disposed on two sides of the pedestal 10 respectively, and the two sets of tension generating mechanisms 80 are symmetrically disposed on the pedestal.

One end of the first rope 83 is wound around the first direction-changing wheel 84 and horizontally connected to the rear end of the tray 50, and the end of the first rope 83 facing the tray 50 may be connected to the first supporting plate 51 and the second supporting plate 52. The other end of the first rope 83 extends in the direction perpendicular to the ground after passing through the first direction-changing wheels 84 and is connected to the first counterweight 82. Further, the gravity generated by the first counterweight 82 is transmitted to the tray 50 along the first rope 83, to provide the tray 50 with a tension in the first direction, so that the tray 50 can move to the warehousing shelving unit.

FIG. 16 is a schematic structural diagram of a take-out assembly according to an embodiment of this application. As shown in FIG. 16, the take-out assembly 60 includes a fixed bracket 61 and a plurality of suction cups 62, where each suction cup 62 may be connected to a negative pressure generating device through an air pipe. When the suction cup 62 is in contact with the goods box 600, the negative pressure generating device sucks the air in the suction cup 62, so that the pressure in the suction cup 62 is lower than the atmospheric pressure. Under the action of atmospheric pressure, the suction cup 62 may be firmly adsorbed on the goods box 600, thereby fixing the goods box 600.

In the mounting orientation of the take-out assembly shown in FIG. 14 in conjunction with FIG. 16, the lower end of the fixed bracket 61 is connected to the transmission belt 40, and can move together with the transmission belt 40. Each suction cup 62 is mounted on the upper end of the fixed bracket 61 and is located above the tray 50. The fixed bracket 61 includes a fixed connecting plate 611 and a suction cup mounting plate 613 extending in the vertical direction. The fixed connecting plate 611 may be a T-shaped plate, one end of which with a horizontal mounting portion 612 is fixed on the transmission belt 40, and the other end of which is fixedly connected to the suction cup mounting plate 613. The suction cup mounting plate 613 is opposite to the front surface of the goods box 600. The suction cup mounting plate 613 may be a rectangular plate. The plurality of suction cups 62 may be evenly disposed on the suction cup mounting plate 613, and a suction surface of each suction cup 62 may be disposed toward the front surface of the goods box 600.

In this embodiment, the take-out assembly 60 is connected to the front surface of the to-be-transferred goods box. There is no need to reserve space below, above, or on left and right sides of the goods box for insertion and movement of the take-out assembly 60. Therefore, the storage space of the warehouse is fully utilized, and the storage density of the warehouse is improved. In this embodiment, the defined front surface of the goods box 600 refers to a surface of the goods box 600 facing the outside of the warehousing shelving unit 500 when the to-be-transferred goods box 600 is placed on the warehousing shelving unit 500, or, in other words, a surface exposed to the warehousing shelving unit 500.

Based on the foregoing embodiment, to improve the reliability of the suction cups 62 being adsorbed on the to-be-transferred goods box 600, the transport robot further includes a fault diagnosis system. The fault diagnosis system includes a gas pressure sensor and a processor. The gas pressure sensor is signally connected to the processor. The gas pressure sensor is disposed in the air pipe. Actual pressure of gas in the air pipe is detected by the gas pressure sensor. The processor may determine whether the suction cups are leaking according to a detection result, and determines that the suction cups are leaking when the actual pressure is equal to the atmospheric pressure.

In another implementation, the take-out assembly 60 includes a fixed bracket 61 and a magnet. The fixed bracket 61 may be the same as the fixed bracket 61 configured to mount the suction cup 62, and the details are not described herein again. The difference is that the plurality of suction cups 62 on the suction cup mounting plate 613 may be replaced with one or more magnets, and the magnets may be used to attract the front surface of the goods box 600. It may be understood that, at least the front surface of the goods box 600 is guaranteed to be a magnetic adsorption surface. To facilitate the use of magnets to fix the goods box 600, the goods box 600 may be an iron box. The magnet may be an electromagnet, which has magnetism to attract the goods box 600 when energized, and the magnetism disappears when the power is off, so that the goods box 600 can be easily detached from the fixed bracket 61 as needed.

In another implementation, the take-out assembly 60 includes a fixed bracket 61 and a buckle disposed on the fixed bracket 61. The fixed bracket 61 may be the same as the fixed bracket 61 configured to mount the suction cup 62, and the details are not described herein again. The difference is that the plurality of suction cups 62 on the suction cup mounting plate 613 may be replaced with a buckle, and the front surface of the goods box 600 is provided with a slot matched with the buckle. When the fixed bracket 61 moves to the goods box 600 and is in contact with the goods box 600, the buckle may be engaged into the slot to fix the goods box 600 on the take-out assembly. It may be understood that, the suction cups 62 on the suction cup mounting plate 613 may be alternatively replaced with a hook, and the front surface of the goods box 600 is provided with a hook hole matched with the hook.

Figure 25:
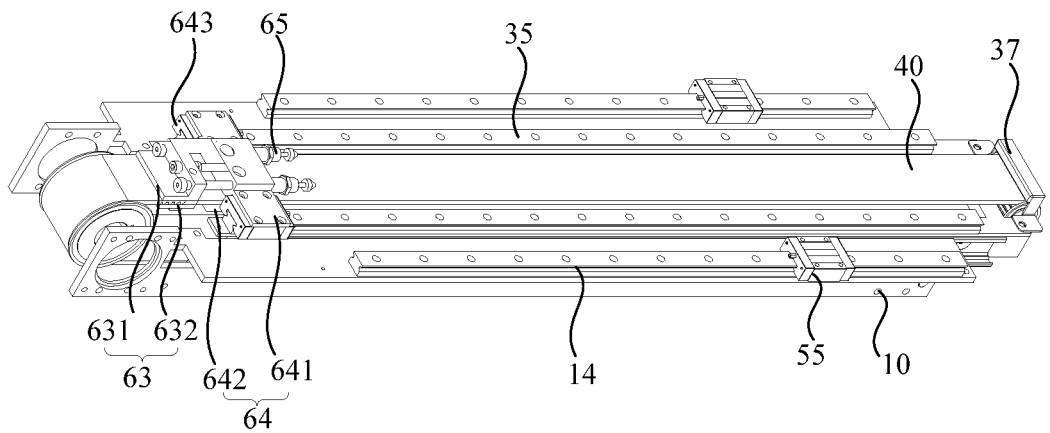
FIG. 25 is a schematic diagram of connection between a gripper and a transmission belt according to an embodiment of this application.

FIG. 25 is a schematic diagram of connection between a gripper and a transmission belt according to an embodiment of this application. As shown in FIG. 25, based on the foregoing embodiment, to facilitate fixing the end of the fixed bracket 61 facing the transmission belt 40 on the transmission belt 40, a gripper is disposed below the fixing connecting plate 611 of the fixed bracket 61, and the horizontal mounting portion 612 of the fixed connecting plate 611 may be fixed on the surface of the gripper. The transmission belt 40 may be a synchronous belt with transmission teeth on a side. The side of the gripper facing the transmission teeth is provided with a tooth plate that meshing with the teeth, and the transmission belt 40 is fixed in the gripper, to prevent slippage between the transmission belt 40 and the gripper, enhancing the fixing effect of the gripper and the transmission belt 40, so that the transmission belt 40 and the take-out assembly 60 move synchronously.

The gripper provided in this embodiment includes at least one set of gripping assemblies. For example, the gripper includes a first gripping assembly 63, and the first gripping assembly 63 includes a first pressing plate 631 and a first tooth plate 632 disposed oppositely. The first pressing plate 631 is located on and fits with the toothless side of the synchronous belt, the first tooth plate 632 is located on the tooth side of the synchronous belt, and the first tooth plate 632 meshes with the transmission teeth of the synchronous belt. The first tooth plate 632 and the first pressing plate 631 are fixed together by a connecting member, so that the transmission belt 40 is fixed between the first pressing plate 631 and the first tooth plate 632, and the synchronous movement of the fixed bracket 61 and the transmission belt 40 is realized.

The gripper further includes a second gripping assembly 64, the second gripping assembly 64 and the first gripping assembly 63 are disposed oppositely and spaced apart along the first direction, and the second gripping assembly 64 is closer to the goods box 600. The second gripping assembly 64 includes a second pressing plate 641 and a second tooth plate 642 disposed oppositely. The second pressing plate 641 is located on and fits with the toothless side of the synchronous belt, the second tooth plate 642 is located on the tooth side of the synchronous belt, and the second tooth plate 642 meshes with the transmission teeth of the synchronous belt. The second tooth plate 642 and the second pressing plate 641 are fixed together by connecting members, to fix the synchronous belt in the second gripping assembly 65. The first gripping assembly 63 and the second gripping assembly 64 are connected by a connecting member, to increase the fixing effect of the fixed bracket 61 and the transmission belt 40. That is, the first pressing plate 631 in the first gripping assembly 63 and the second pressing plate 641 in the second gripping assembly 64 may be connected through the connecting member. The fixed connecting plate 611 of the fixed bracket 61 may be fixed to the first pressing plate 631 or the second pressing plate 641, or the bottom of the fixed connecting plate 611 may be fixed to both the first pressing plate 631 and the second pressing plate 641.

Further, to improve the stability of the movement of the take-out assembly 60 in the first direction, a second guide block 643 is disposed on two ends of the second pressing plate 641 in the second gripping assembly 64, and the two ends of the second pressing plate 641 extend toward the sliding seat 31 and form an extension portion. The second guide blocks 643 are located on the extension portion and are opposite to the sliding seat 31. The sliding seat 31 is provided with a second guide rail 35 matching the second guide block 643, the second guide rail 35 is disposed on the horizontal plate 313 of the sliding seat 31, and the second guide rail 35 is located at the edge of the horizontal plate 313 close to the fixed bracket 61. The length direction of the second guide rail 35 is parallel to the first direction. Further, the fixed bracket 61 is driven by the transmission belt 40 to move along the second guide rail 35 of the sliding seat 31, which can improve the sliding stability of the fixed bracket 61, reduce the shock during the movement of the fixed bracket 61, and effectively prevent the goods box 600 from falling off the take-out assembly 60.

When the take-out assembly 60 is driven by the transmission belt 40 to move toward the goods box 600, and the take-out assembly 60 moves to the first limiting structure 37, the take-out assembly 60 can drive the sliding seat 31 to move toward the goods box 600 as a whole. To reduce the impact force when the take-out assembly 60 abuts against the first limiting structure 37, a third buffer 65 may be disposed at the bottom of the fixed bracket 61. The third buffer 65 is located on the second pressing plate 641 of the second gripping assembly 64. The second gripping assembly 64 is closer to the first limiting structure 37 than the first gripping assembly 63, and the third buffer 65 and the first limiting structure 37 are disposed oppositely, that is, the first limiting structure 37 and the third buffer 65 have opposing portions at the same height. When the take-out assembly 60 moves to the first limiting structure 37, the third buffer 65 may abut against the first limiting structure 37 for reducing the impact force between the take-out assembly 60 and the sliding seat 31.

Figure 26:
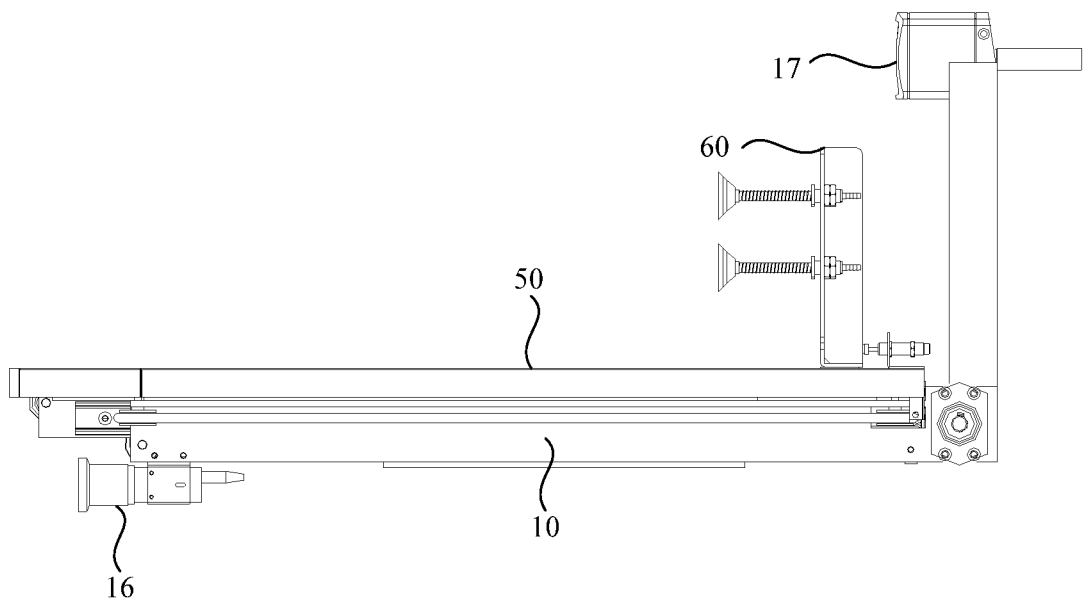
FIG. 26 is a schematic diagram of mounting of a first camera and a second camera according to an embodiment of this application.

FIG. 26 is a schematic diagram of mounting of a first camera and a second camera according to an embodiment of this application. As shown in FIG. 26, based on the foregoing embodiment, to realize full automation and multi-functionality of the transport robot, the transport robot further includes a first camera 16, where the first camera 16 is mounted on a side of the goods box take-out device facing the to-be-transferred goods box, and the first camera 16 is configured to obtain an identification code on the to-be-transferred goods box.

For example, to enable the first camera 16 to easily obtain the identification code on the to-be-transferred goods box 600, the first camera 16 may be fixed at the front end of the pedestal 10 through a camera mounting frame. In addition, the direction of the first camera 16 toward the to-be-transferred goods box 600 is not blocked, so that the first camera 16 can scan the identification code of the to-be-transferred goods box 600. In this way, when the take-out assembly 50 is close to the to-be-transferred goods box 600, the first camera 16 can scan the identification code, such as a barcode or a two-dimensional code, on the to-be-transferred goods box 600 to obtain relevant information of the to-be-transferred goods box 600, thereby improving the carrying efficiency.

Further, to enable the transport robot to quickly carry and pick goods boxes, a second camera 17 may be further disposed on the transport robot. As shown in FIG. 26, the second camera 17 may be mounted at the rear end of the pedestal 10 through a column, and a mounting height of the second camera 17 is higher than the height of the take-out assembly 60, that is, the direction of the second camera 17 facing the to-be-transferred goods box 600 is not blocked. In this way, the second camera 17 may be located at a higher position, so that physical information such as the size, the appearance, and the shape of the to-be-transferred goods box can be acquired in an all-round way, and position information of the to-be-transferred goods box on the warehousing shelving unit can be acquired, implementing rapid picking and grabbing positioning, and further improving the carrying efficiency.

Figure 27:
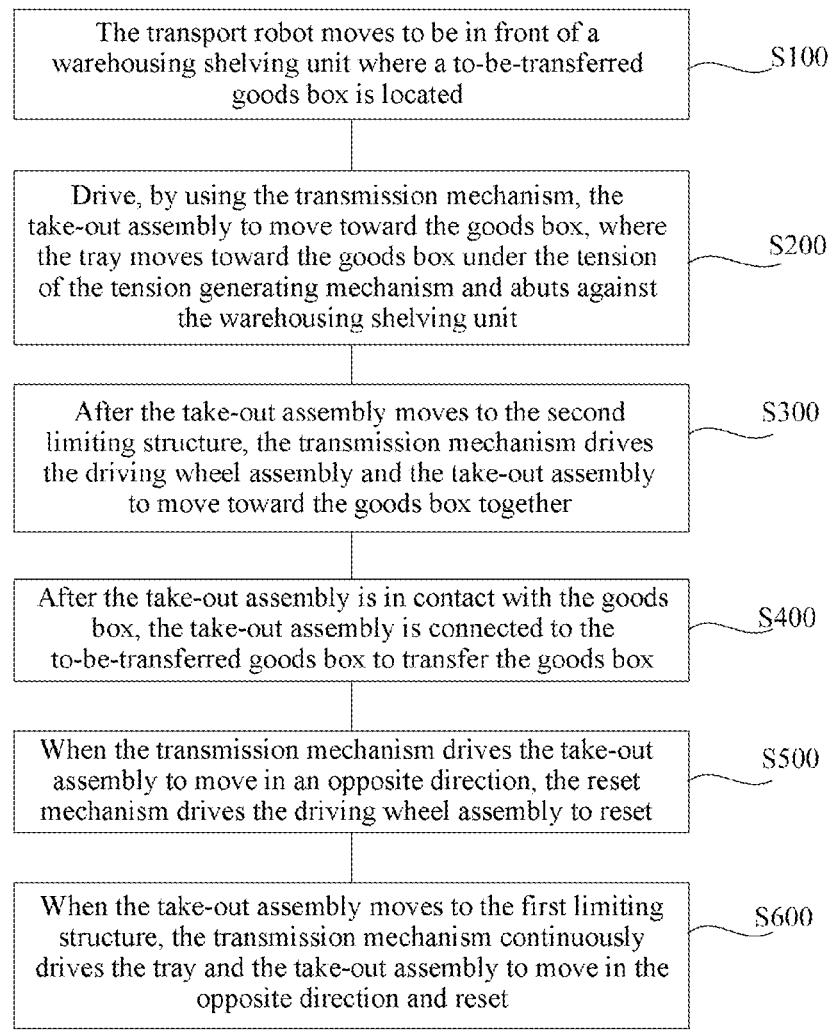
FIG. 27 is a schematic flowchart of steps of a method for transferring a goods box according to an embodiment of this application.

FIG. 27 is a schematic flowchart of steps of a method for transferring a goods box using a transport robot according to an embodiment of this application. As shown in FIG. 27, the method for transferring a goods box provided in this embodiment of this application includes the following steps:

Step S100: The transport robot moves to be in front of a warehousing shelving unit 500 where a to-be-transferred goods box 600 is located. For example, after receiving an instruction to transfer a goods box 600, the transport robot uses the walking mechanism of the base 300 thereof to move to the warehousing shelving unit 500 where the goods box 600 is located, and adjusts the height of the goods box take-out device 100, so that the take-out assembly 60 of the goods box take-out device 100 is opposite to the goods box 600.

Before performing step S200, the method further includes using the first camera 16 and/or the second camera 17 to identify the to-be-transferred goods box 600 and confirm the to-be-transferred goods box 600. For example, the first camera 16 disposed at the front end of the pedestal 10 is used to scan the barcode or two-dimensional code on the goods box 600 to obtain the relevant information of the to-be-transferred goods box. The relevant information is compared with the information of the to-be-transferred goods box in the received instruction, to confirm that the current goods box opposite the goods box take-out device is the same as the to-be-transferred goods box.

Further, in another embodiment, the second camera 17 mounted at the rear end of the pedestal 10 may be alternatively used to obtain the physical information and position information of the goods box 600, for example, the size, the appearance, and the shape of the goods box 600. By using the information about the goods box obtained by the second camera 17, it is determined whether the goods box is consistent with the to-be-transferred goods box.

It may be understood that, the first camera 16 or the second camera 17 alone may be used to confirm the to-be-transferred goods box 600, or the first camera 16 and the second camera 17 may be used together to confirm the to-be-transferred goods box 600. For example, the first camera 16 is used for the first confirmation, and the second camera 17 is used for auxiliary confirmation, to ensure the accuracy of the to-be-transferred goods box.

After the to-be-transferred goods box is confirmed, step S200 is performed, including: driving, by using the transmission mechanism, the take-out assembly 60 to move toward the goods box 600, where the tray 50 moves toward the goods box 600 under the tension of the tension generating mechanism 80 and abuts against the warehousing shelving unit 500. For example, after the take-out assembly 60 faces the goods box 600, the driving device drives the transmission mechanism and drives the transmission belt 40 to drive in the first direction, so that the take-out assembly 60 moves toward the goods box 600. In this case, the take-out assembly 60 is separated from the first limiting structure 70, and the tension generated by the tension generating mechanism 80 drives the tray 50 to move toward the warehousing shelving unit 500. The front end of the tray 50 can abut against the warehousing shelving unit 500, thereby eliminating the gap between the warehousing shelving unit 500 and the tray 50, and preventing the goods box 600 from falling to the ground and being damaged.

Step S300: After the take-out assembly 60 moves to the second limiting structure 37, the transmission mechanism drives the movable wheel assembly 30 and the take-out assembly 60 to move toward the goods box 600 together. For example, the take-out assembly 60 is driven by the transmission belt 40 to move toward the goods box 600, the take-out assembly 60 moves to and abuts against the second limiting structure 37 at the front end of the sliding seat 31, and the transmission belt 40 continues to move toward the first direction and overcome the restoring force of the reset mechanism 90, so that the take-out assembly 60 and the movable wheel assembly 30 move toward the goods box 600 and move to the goods box 600.

Step S400: After the take-out assembly 60 is in contact with the goods box 600, the take-out assembly 60 is connected to the to-be-transferred goods box 600 to transfer the goods box 600. For example, after the take-out assembly 60 moves to the goods box 600, the take-out assembly 60 is in contact with the goods box 600 and is connected to the goods box 600. For example, after the take-out assembly 60 moves to the goods box 600, the suction cups 62 in the take-out assembly 60 are in contact with the goods box 600, and the suction cups 62 may be adsorbed on the front surface of the goods box 600, thereby fixing the goods box 600 on the take-out assembly 60.

Step S500: When the transmission mechanism drives the take-out assembly 60 to move in an opposite direction, the reset mechanism 90 drives the movable wheel assembly 30 to reset. For example, after the goods box 600 is fixed to the take-out assembly 60, the driving device drives the transmission mechanism and drives the transmission belt 40 to move in the second direction. In this case, under the action of the restoring force of the reset mechanism 90, the movable wheel assembly 20 returns to the initial position. That is, the motor reverses and drives the transmission belt 40 away from the warehousing shelving unit 500. In this case, the first movable wheel 32 and the second movable wheel 33 disposed on the sliding seat 31 return to the initial position under the action of the restoring force of the reset mechanism 90.

Step S600: When the take-out assembly 60 moves to the first limiting structure 70, the transmission mechanism continuously drives the tray 50 and the take-out assembly 60 to move in the opposite direction and reset. For example, after the movable wheel assembly 30 retreats to the initial position, the transmission belt 40 continues to drive in the second direction, thereby driving the take-out assembly 60 to continue to move in the direction away from the warehousing shelving unit 500. The take-out assembly moves to the first limiting structure 70 of the tray and abuts against the first limiting structure 70. As the transmission belt 40 continues to drive in the second direction and overcomes the tension generated by the tension generating mechanism 80, the take-out assembly 60 and the tray 50 return to the initial position.

Embodiment III

A transport robot generally includes a movable base, a robot rack on the movable base, and a grabbing mechanism mounted on the robot rack. The movable base can move on the ground in the warehousing area. A beam is mounted on the robot rack and can move up and down on the robot rack. The grabbing mechanism is mounted on the beam. The grabbing mechanism includes gripping arms and gripping portions located at front ends of the gripping arms for grabbing a goods box. The gripping arms may be retracted forward and backward. The gripping arms drive the gripping portions to grip left and right sides or upper and lower sides of the goods box to move the goods box. Moreover, to avoid interference between the robot rack and the top surface of the warehousing area, a specific safety distance is reserved between the robot rack and the top surface of the warehousing area. However, the manner of grabbing the goods box by the transport robot leads to low utilization of storage space in the warehousing area, and the grabbing mechanism cannot grab a goods box placed above the robot rack or a goods box below the movable base, leading to poor versatility of the transport robot.

Therefore, the embodiments of this application provide a goods box take-out device, a transport robot, and a goods box take-out method, to transfer the to-be-transferred goods box by connecting the goods box take-out mechanism to the front surface of the to-be-transferred goods box. In this way, the utilization of the storage space can be improved, and through the rotation of the goods box take-out mechanism, the goods box take-out mechanism can be rotated to be above or below the robot rack. In this way, the goods box take-out mechanism can take out a goods box placed above the robot rack, and can also take out a goods box placed below the movable base, which improves the versatility of the transport robot.

Figure 28:
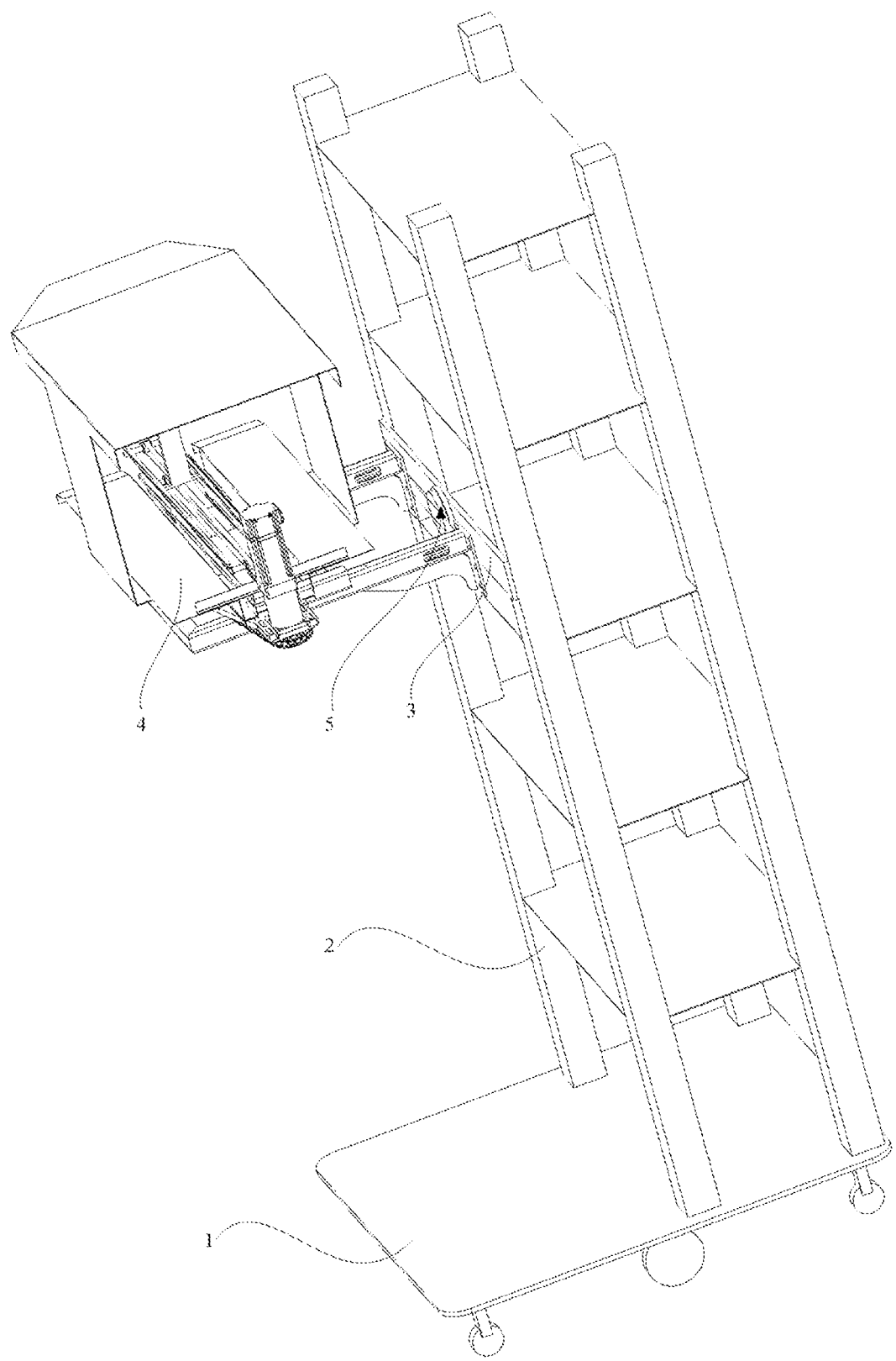
FIG. 28 is a schematic structural diagram of a first state of a transport robot according to Embodiment III of this application.
Figure 29:
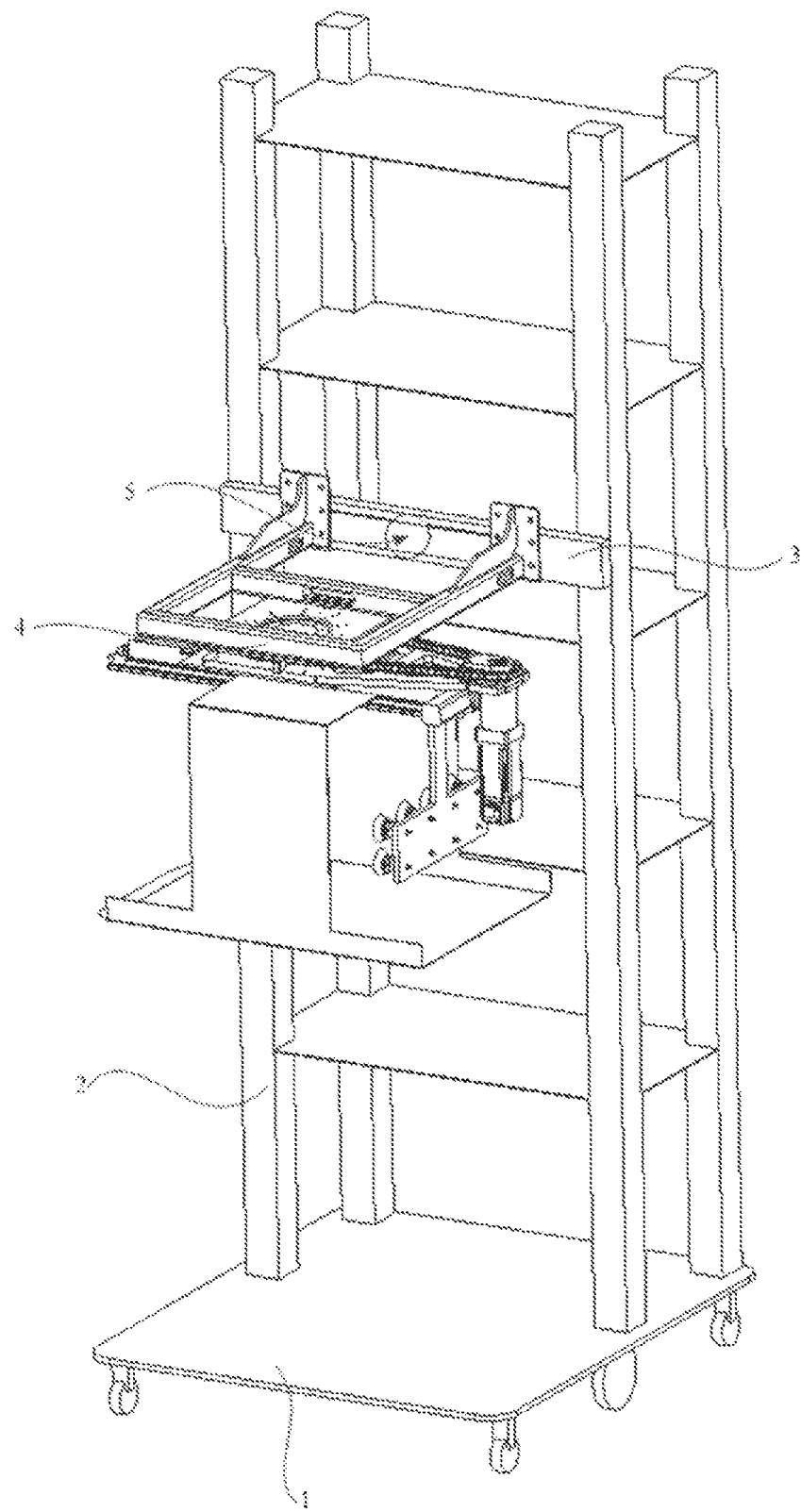
FIG. 29 is a schematic structural diagram of a second state of a transport robot according to Embodiment III of this application.
Figure 30:
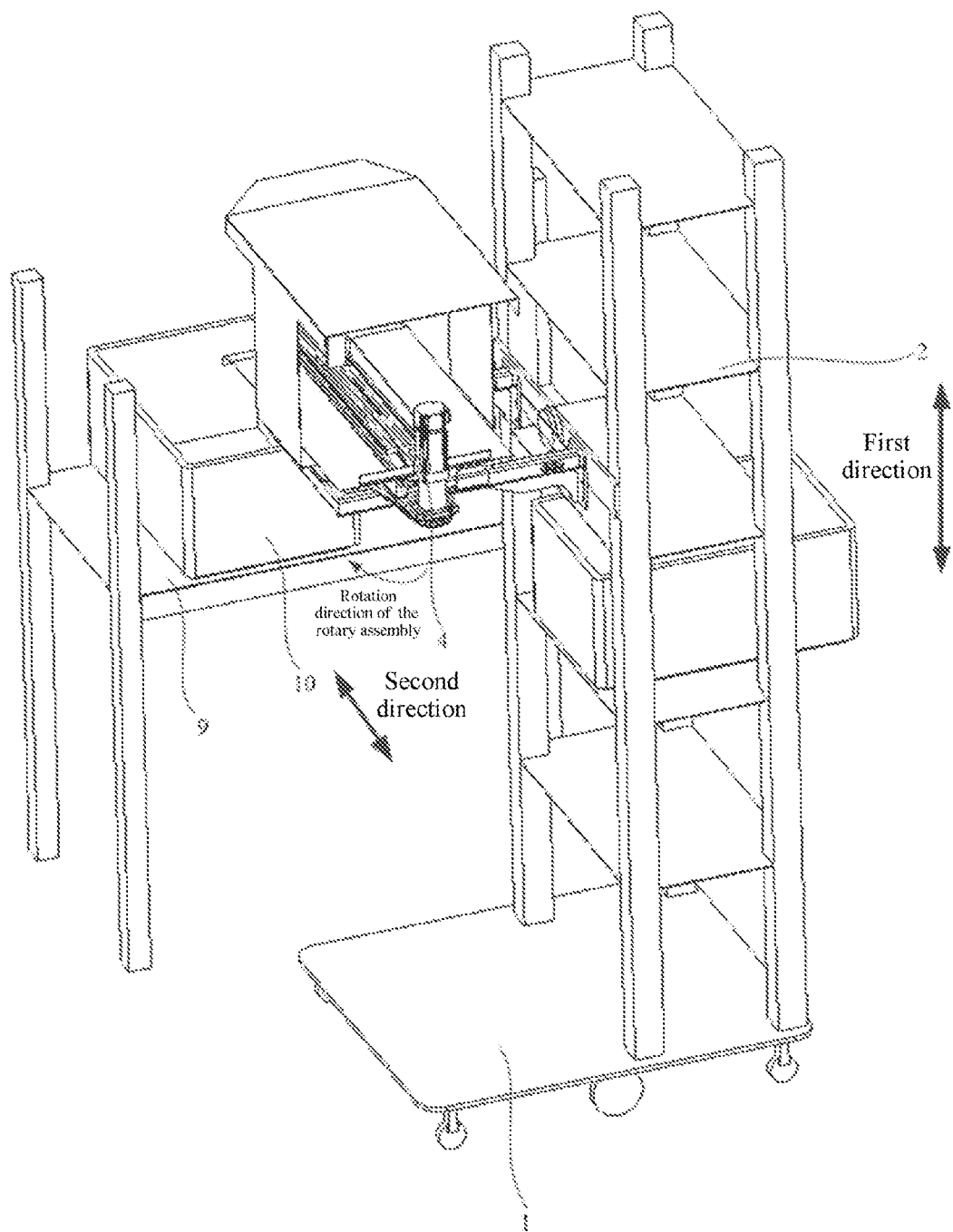
FIG. 30 is a diagram of an operating status of a transport robot according to Embodiment III of this application.

FIG. 28 is a schematic structural diagram of a first state of a transport robot according to Embodiment III of this application. FIG. 29 is a schematic structural diagram of a second state of a transport robot according to Embodiment III of this application. FIG. 30 is a diagram of an operating status of a transport robot according to Embodiment III of this application. Referring to FIG. 28 to FIG. 30, the transport robot provided in this embodiment of this application includes: a movable base 1, a robot rack 2, a support beam 3, a goods box take-out mechanism 4, and a driving device 5, where the movable base 1 is the support structure of the transport robot, and is configured to support and carry other components and/or devices of the transport robot for walking. The robot rack 2 is mounted on the movable base 1, so that the movable base 1 can carry the robot rack 2 and devices mounted on the robot rack 2 to move, or the movable base 1 can carry a goods box placed on the robot rack 2 to move in the warehousing area.

The support beam 3 is mounted on the robot rack 2. The support beam 3 may be a beam, a horizontal plate, or the like slidably mounted on the robot rack 2, and the support beam 3 can move up and down on the robot rack 2. The goods box take-out mechanism 4 is mounted on the support beam 3, and the goods box take-out mechanism 4 is pivotally mounted on the support beam 3. That is, the goods box take-out mechanism 4 is pivotally connected to the support beam 3. The goods box take-out mechanism 4 can move up and down on the robot rack 2 along with the support beam 3, and can rotate relative to the support beam 3. When the goods box take-out mechanism 4 moves to a to-be-transferred goods box 10, the goods box take-out mechanism 4 is connected to a front surface of the to-be-transferred goods box 10 to take out the to-be-transferred goods box 10. The driving device 5 is further mounted on the support beam 3. The driving device 5 is connected to the goods box take-out mechanism 4. The driving device 5 is configured to drive the goods box take-out mechanism 4 to rotate, so that the goods box take-out mechanism 4 can be rotated above or below the support beam 3.

For example, when the position of the to-be-transferred goods box 10 on the warehousing shelving unit 9 is higher than the highest position of the robot rack 2, the driving device 5 may first drive the goods box take-out mechanism 4 to rotate to be above the support beam 3, and the goods box take-out mechanism 4 then moves with the support beam 3 to the highest position of the robot rack 2. When the height of the goods box take-out mechanism 4 is the same as the height of the to-be-transferred goods box 10, the goods box take-out mechanism 4 may take out the to-be-transferred goods box 10 placed higher than the robot rack 2. However, when the position of the to-be-transferred goods box 10 on the warehousing shelving unit 9 is lower than the upper surface of the movable base 1, the driving device 5 may first drive the goods box take-out mechanism 4 to rotate to be below the support beam 3, and the goods box take-out mechanism 4 then moves with the support beam 3 to the lowest position of the robot rack 2. When the height of the goods box take-out mechanism 4 is the same as the height of the to-be-transferred goods box 10, the goods box take-out mechanism 4 may take out the to-be-transferred goods box 10 placed lower than the upper surface of the movable base 1.

When the goods box take-out mechanism 4 rotates and moves up and down with the support beam 3, the goods box take-out mechanism 4 may first rotate to a designated position, and then move up and down with the support beam 3; or the goods box take-out mechanism 4 may first move up and down with the support beam 3, and then rotate to the designated position; or the goods box take-out mechanism 4 may move up and down while rotating. However, when the to-be-transferred goods box 10 is placed at the middle height of the warehousing shelving unit 9, the goods box take-out mechanism 4 does not need to rotate. The goods box take-out mechanism 4 only needs to move up and down, so that the height of the goods box take-out mechanism 4 is the same as the height of the to-be-transferred goods box 10. Alternatively, the goods box take-out mechanism 4 does not move up and down, and the goods box take-out mechanism 4 only needs to rotate, so that the height of the goods box take-out mechanism 4 is the same as the height of the to-be-transferred goods box 10, and the to-be-transferred goods box 10 can be taken out. In a specific implementation, the specific action of the goods box take-out mechanism 4 may be selected according to the specific position of the to-be-transferred goods box 10, as long as the to-be-transferred goods box 10 can be taken out, which is not limited in this embodiment.

It should be noted that, the to-be-transferred goods box may be a goods box with a packaging box or a packing box, or a goods box without a packaging box or a packing box. The front surface of the to-be-transferred goods box 10 refers to a surface facing the outside of the warehousing shelving unit 9 when the to-be-transferred goods box 10 is placed on the warehousing shelving unit 9, or, in other words, a surface exposed to the warehousing shelving unit 9. The goods box take-out mechanism 4 is connected to the front surface of the to-be-transferred goods box 10. Therefore, there is no need to reserve operation space on the left and right sides or the upper and lower sides of the to-be-transferred goods box 10, thereby improving the utilization of the warehousing space.

In a specific implementation, the movable base 1 generally includes a base body and walking wheels disposed on the base body. When the walking wheels rotate, the moving or rotating of the movable base 1 can be realized. The specific structures of the bottom body and the walking wheels, the mounting manner between the two, and the motion principle are not limited in this embodiment. The robot rack 2 is mounted on the movable base 1, a plurality of goods box storage spaces are provided in the robot rack 2, and each goods box storage space can accommodate one or more goods boxes. In the embodiment shown in FIG. 29, the robot rack 2 includes four columns vertically disposed on the movable base 1, where the four columns may enclose a cubic space, a plurality of partitions are disposed between the four columns, and the plurality of partitions divide the cubic space into a plurality of goods box storage spaces.

The support beam 3 is slidably mounted on two columns. The driving device 5 may be a motor or formed by structures such as a motor and a reducer, as long as the driving device can drive the goods box take-out mechanism 4 to rotate, which is not limited in this embodiment.

In the foregoing embodiment, the goods box take-out mechanism 4 may follow the support beam 3 to move up and down along the robot rack 2, and may further be driven by the driving device 5 to rotate relative to the support beam 3, so that the goods box take-out mechanism 4 can be adjusted to rotate to be above or below the support beam 3.

Figure 31:
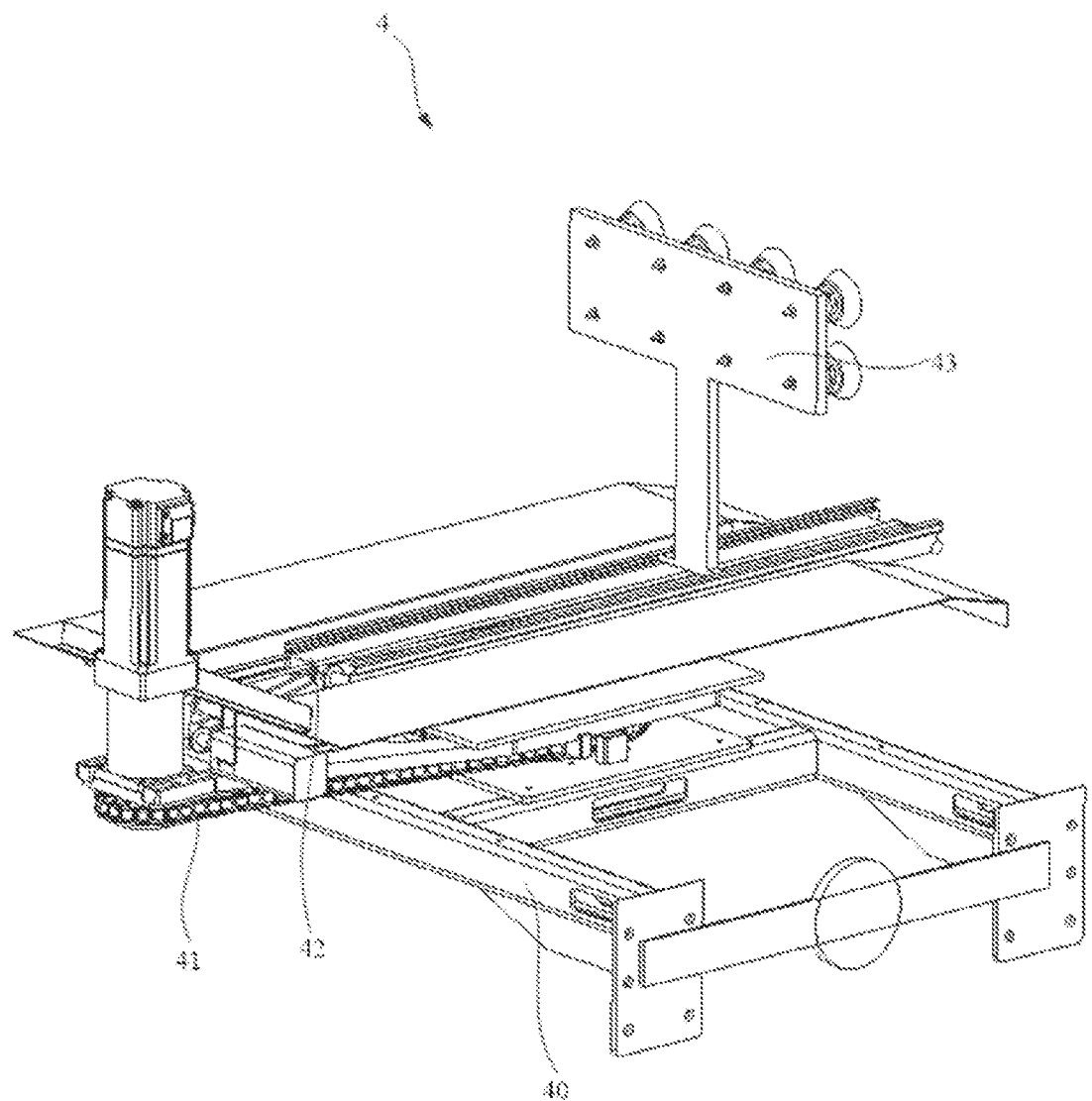
FIG. 31 is a schematic diagram of a first structure of a goods box take-out mechanism according to Embodiment III of this application.
Figure 32:
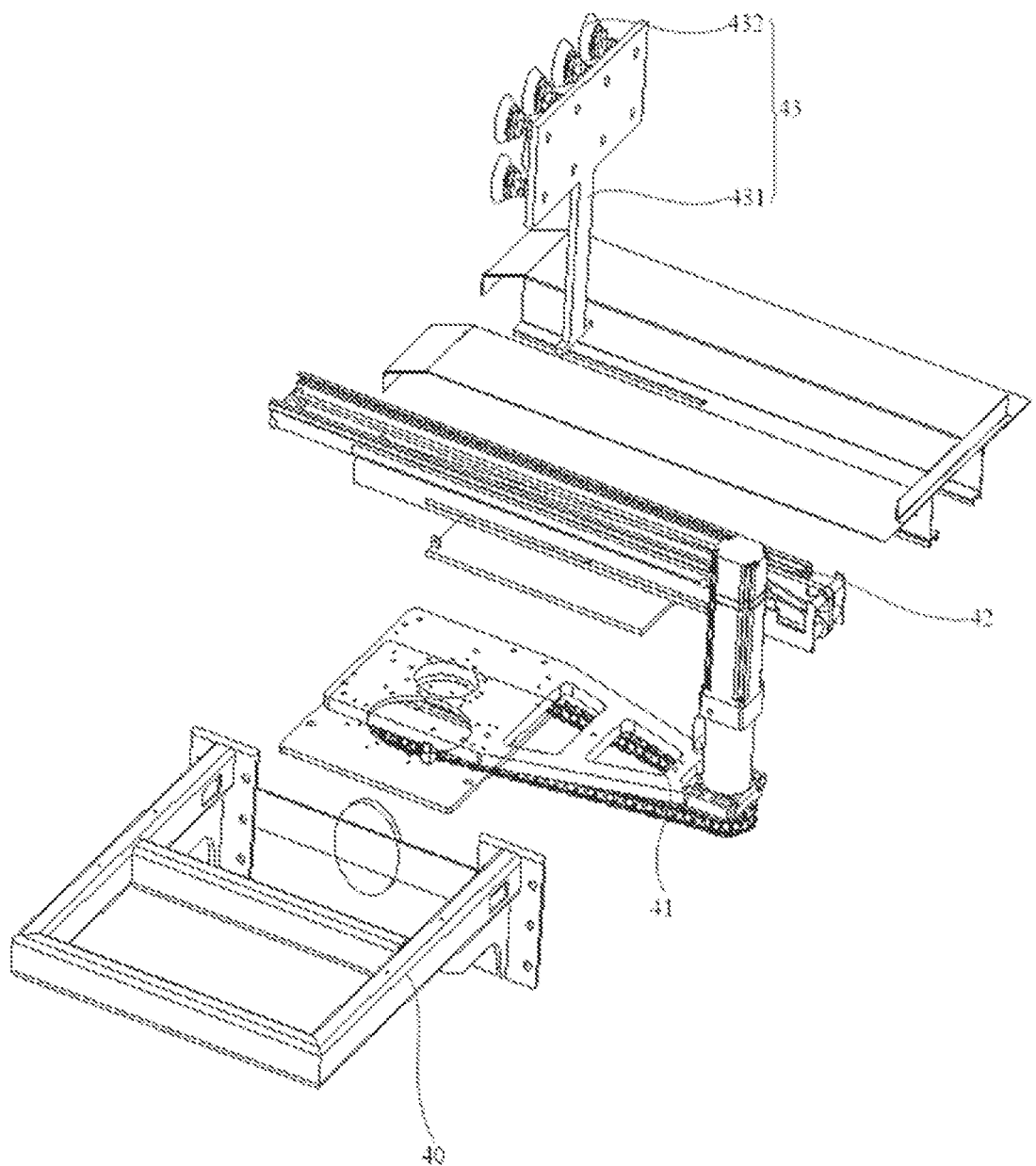
FIG. 32 is a schematic structural exploded view of FIG. 31.

FIG. 31 is a schematic diagram of a first structure of a goods box take-out mechanism according to Embodiment III of this application. FIG. 32 is a schematic structural exploded view of FIG. 31. To achieve the foregoing functions, in a possible implementation, as shown in FIG. 31 and FIG. 32, the goods box take-out mechanism 4 includes a mounting frame 40, a rotary assembly 41, a transmission assembly 42, and a take-out assembly 43, where the take-out assembly 43 is mounted above the transmission assembly 42; the transmission assembly 42 is mounted on the rotary assembly 41; the rotary assembly 41 is mounted on the mounting frame 40; and the mounting frame 40 is rotatably connected to an output end of the driving device 5. The rotary assembly 41 may be configured to drive the transmission assembly 42 and the take-out assembly 43 to rotate in a plane perpendicular to a lifting direction of the support beam 3. The transmission assembly 42 is configured to drive the take-out assembly 43 to move toward or away from a front surface of a to-be-transferred goods box 10, that is, the transmission assembly 42 enables the take-out assembly 43 mounted on the transmission assembly 42 to reciprocate toward or away from the to-be-transferred goods box 10, thereby moving the to-be-transferred goods box.

In an optional embodiment, when the driving device 5 is a motor, the support beam 3 is provided with a through hole. An output shaft of the motor is connected to the mounting frame 40 through the through hole, so that the goods box take-out mechanism 4 is pivotally mounted on the support beam 3 through the mounting frame 40, and can be driven by the motor to rotate to be above or below the support beam 3.

Figure 33:
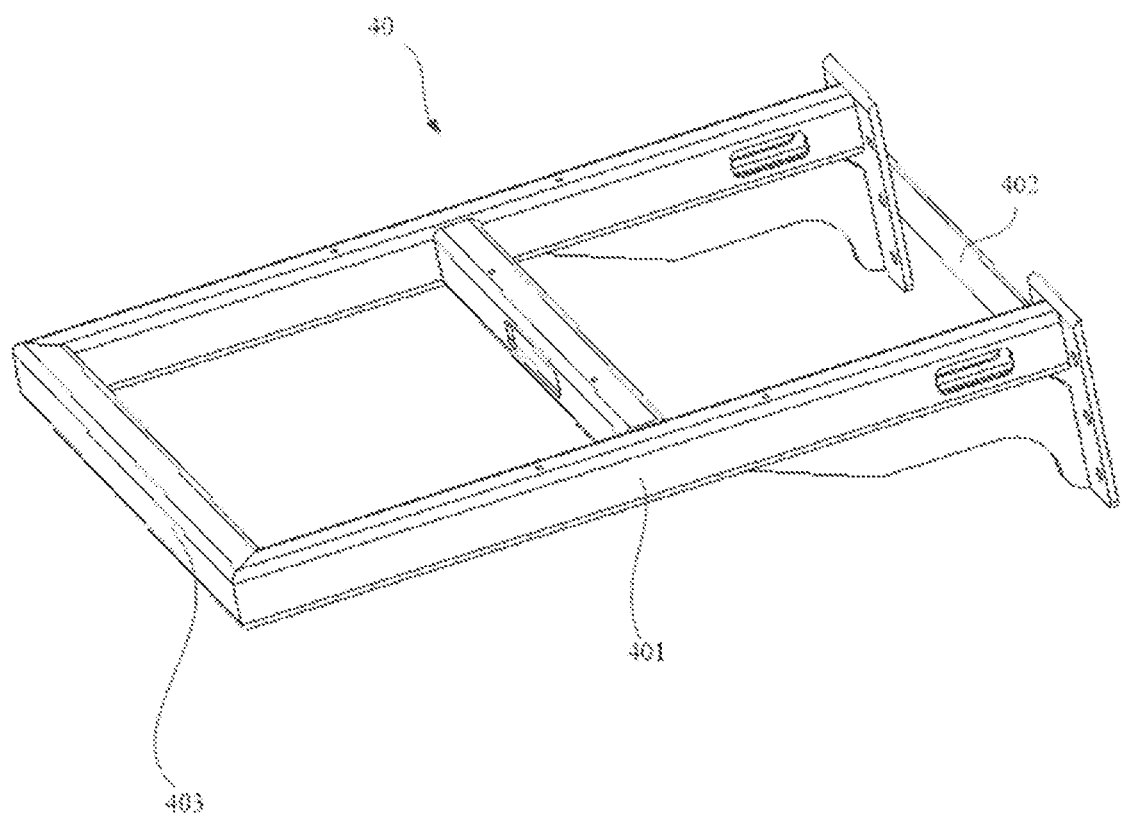
FIG. 33 is a schematic structural diagram of a mounting frame in a goods box take-out mechanism according to Embodiment III of this application.

FIG. 33 is a schematic structural diagram of a mounting frame 40 in a goods box take-out mechanism according to Embodiment III of this application. Referring to FIG. 33, the mounting frame 40 includes two oppositely disposed mounting plates 401 and a beam 402 connecting the two mounting plates 401. The beam 402 is connected to the output shaft of the motor, so that when the motor starts, the output shaft of the motor rotates to drive the goods box take-out mechanism 4 to rotate together, and thus the goods box take-out mechanism 4 can rotate to be above or below the support beam 3.

In other words, when the goods box take-out mechanism 4 rises to the highest position of the robot rack 2 along with the support beam 3, the driving device 5 drives the goods box take-out mechanism 4 to rotate to be above the support beam 3. In this case, the take-out assembly 43 in the goods box take-out mechanism 4 is located above the support beam 3. Therefore, the take-out assembly 43 can take out the to-be-transferred goods box 10 placed on the warehousing shelving unit 9 in a height direction higher than the robot rack 2. When the goods box take-out mechanism 4 is lowered to the lowest position of the robot rack 2 along with the support beam 3, the goods box take-out mechanism 4 may be driven by the driving device 5 to rotate to be below the support beam 3. In this case, the take-out assembly 43 is at a position lower than the upper surface of the movable base 1. Therefore, the take-out assembly 43 can take out the to-be-transferred goods box 10 placed on the warehousing shelving unit 9 lower than the movable base 1, or take out the to-be-transferred goods box 10 placed on the ground, improving the versatility of the transport robot.

Still referring to FIG. 33, further, the mounting frame 40 further includes a bearing beam 403 connecting the two mounting plates 401, and the rotary assembly 41 is mounted on the mounting frame 40.

Figure 34:
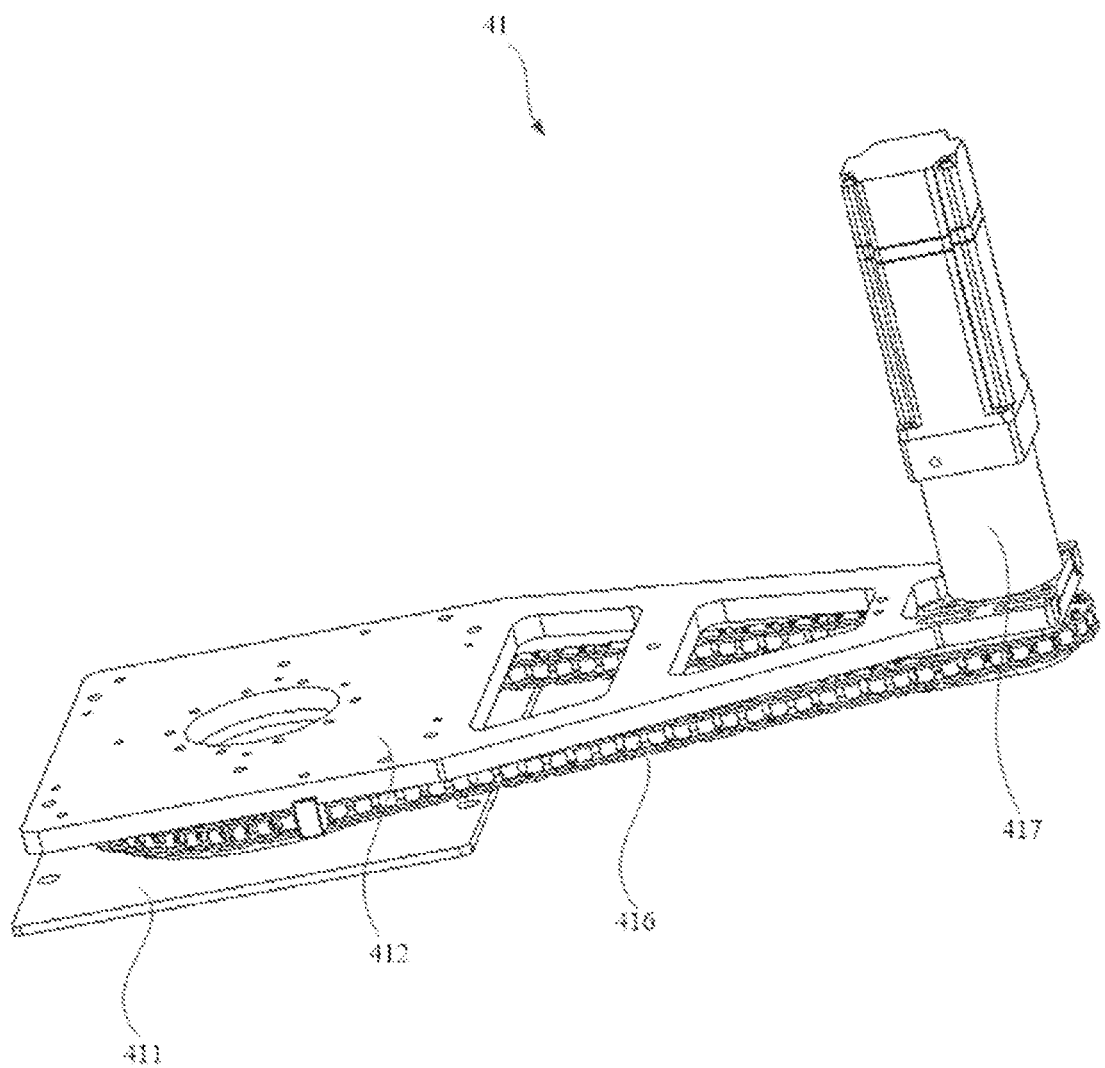
FIG. 34 is a schematic structural diagram of a rotary assembly in a goods box take-out mechanism according to Embodiment III of this application.
Figure 35:
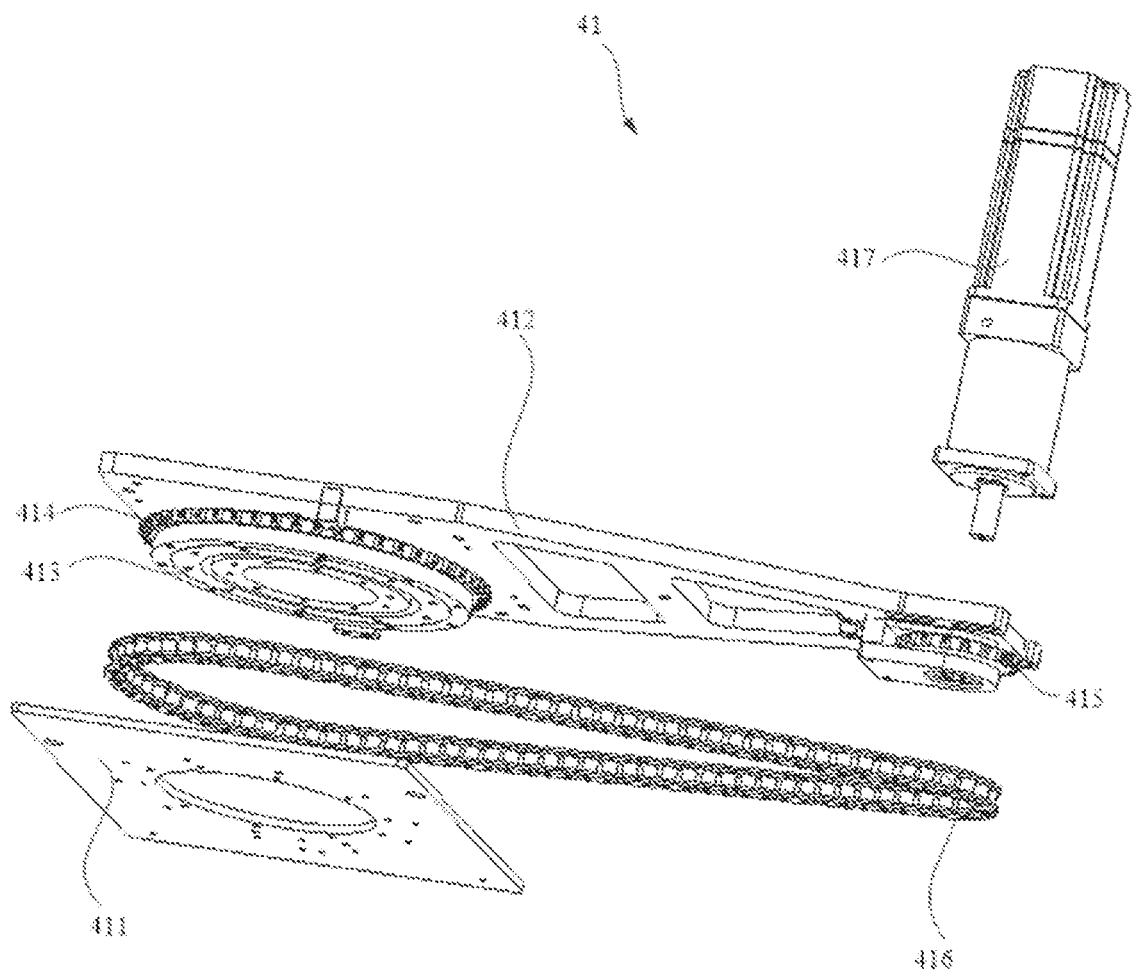
FIG. 35 is a schematic structural exploded view of FIG. 34.

FIG. 34 is a schematic structural diagram of a rotary assembly in a goods box take-out mechanism according to Embodiment III of this application. FIG. 35 is a schematic structural exploded view of FIG. 34. In this embodiment, referring to FIG. 34 and FIG. 35, the rotary assembly 41 includes a bearing plate 411 mounted on the bearing beam 403, a rotatory plate 412 spaced apart from the bearing plate 411, and a cross bearing 413 for connecting the bearing plate 411 and the rotatory plate 412; the cross bearing 413 is connected to a first sprocket 414; a second sprocket 415, a motor 417 that drives the second sprocket 415 to rotate, and the transmission assembly 42 are disposed on the rotatory plate 412; the first sprocket 414 and the second sprocket 415 are connected by a chain 416; when the motor 417 drives the second sprocket 415 to rotate, the second sprocket 415 drives the first sprocket 414 to rotate through the chain 416; and when the first sprocket 414 rotates, the transmission assembly 42 on the rotatory plate 412 is driven to rotate about an axis of the first sprocket 414.

For example, the bearing plate 411 has a through hole matching the cross bearing 413. One end of the cross bearing 413 is located in the through hole of the bearing plate 411, and the other end of the cross bearing 413 is provided with the first sprocket 414. The output shaft of the motor 417 is connected to the second sprocket 415. After the motor 417 starts, the motor 417 drives the second sprocket 415 to rotate, the second sprocket 415 drives the chain 416 to rotate, and the chain 416 drives the first sprocket 414 to rotate, so that the entire rotary assembly 41 rotates around the axis of the second sprocket 415, and the rotary assembly 41 drives the transmission assembly 42 and the take-out assembly 43 to rotate in a plane perpendicular to a lifting direction of the support beam 3.

Based on the foregoing embodiment, the rotary assembly 41 is configured to drive the transmission assembly 42 and the take-out assembly 43 to rotate in a plane perpendicular to a lifting direction of the support beam 3, and the take-out assembly 43 is connected to the front surface of the to-be-transferred goods box 10 to move the to-be-transferred goods box 10.

Figure 36:
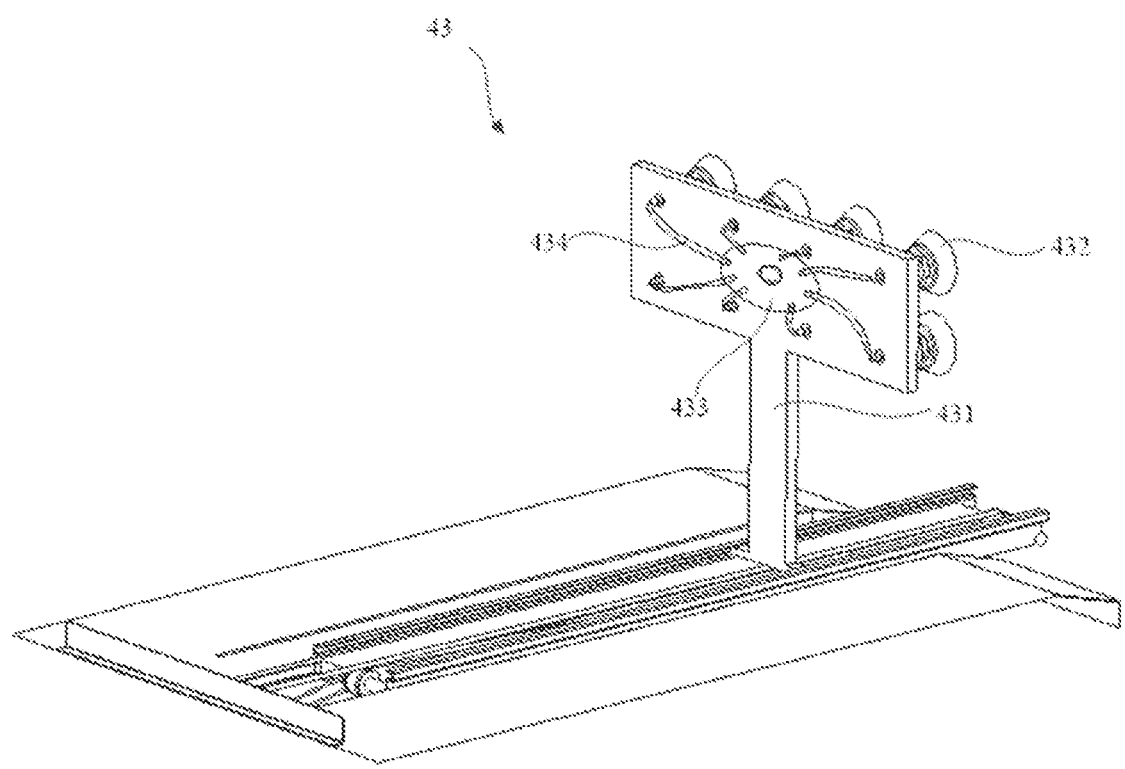
FIG. 36 is a schematic diagram of a first structure of a take-out assembly in a goods box take-out mechanism according to Embodiment III of this application.

FIG. 36 is a schematic diagram of a first structure of a take-out assembly in a goods box take-out mechanism according to Embodiment III of this application. In an optional embodiment, as shown in FIG. 36, the take-out assembly 43 includes a fixed bracket 431 disposed on the transmission assembly 42 and a plurality of suction cups 432 mounted on a front surface of the fixed bracket 431.

It should be noted that, the front surface of the fixed bracket 431 refers to a surface of the fixed bracket 431 that is opposite to the to-be-transferred goods box 10 when the take-out assembly 43 is connected to the front surface of the to-be-transferred goods box 10.

Further, a plurality of suction cups 432 may be disposed on the front surface of the fixed bracket 431, and the plurality of suction cups 432 may be arranged in a matrix on the front surface of the fixed bracket 431. The plurality of suction cups 432 are simultaneously connected to the front surface of the to-be-transferred goods box 10, so that negative pressure is generated between the suction cups 432 and the front surface of the to-be-transferred goods box 10. The suction cups 432 form an adsorption force through the negative pressure with the front surface of the to-be-transferred goods box 10, and use the adsorption force to adsorb the to-be-transferred goods box 10 to achieve the purpose of moving the to-be-transferred goods box 10. The adsorption force formed by the plurality of suction cups 432 arranged in a matrix on the front surface of the to-be-transferred goods box 10 is relatively even, which improves the operating reliability of the suction cups 432, and prevents the to-be-transferred goods box 10 from dropping from the suction cups 432 due to uneven adsorption force.

To make the suction cups 432 have a larger adsorption force, still referring to FIG. 36, a vacuum device 433 may be mounted on the back surface of the fixed bracket 431, so that the vacuum device 433 is respectively in communication with each suction cup 432 through an air pipe 434. A vacuum operation is performed between the suction cups 432 and the front surface of the to-be-transferred goods box 10 by using the vacuum device 433, so that larger negative pressure is generated between the suction cups 432 and the front surface of the to-be-transferred goods box 10. The suction cups 432 generate a larger adsorption force through the larger negative pressure, to achieve the purpose of moving the to-be-transferred goods box 10, thereby further improving the operating reliability of the suction cups 432.

To improve the operating reliability of the suction cups 432, further, the transport robot further includes a fault diagnosis system. The fault diagnosis system includes a gas pressure sensor and a processor. The gas pressure sensor is signally connected to the processor. The gas pressure sensor is disposed in the air pipe 434. According to actual pressure of gas in the air pipe 434 detected by the gas pressure sensor, the processor may determine whether the suction cups are leaking according to a detection result, and determines that the suction cups 432 are leaking when the actual pressure is equal to the atmospheric pressure. The fault diagnosis system is not limited to this configuration, and may be any related, same, or similar structure that can sense whether the suction cups are leaking.

Figure 37:
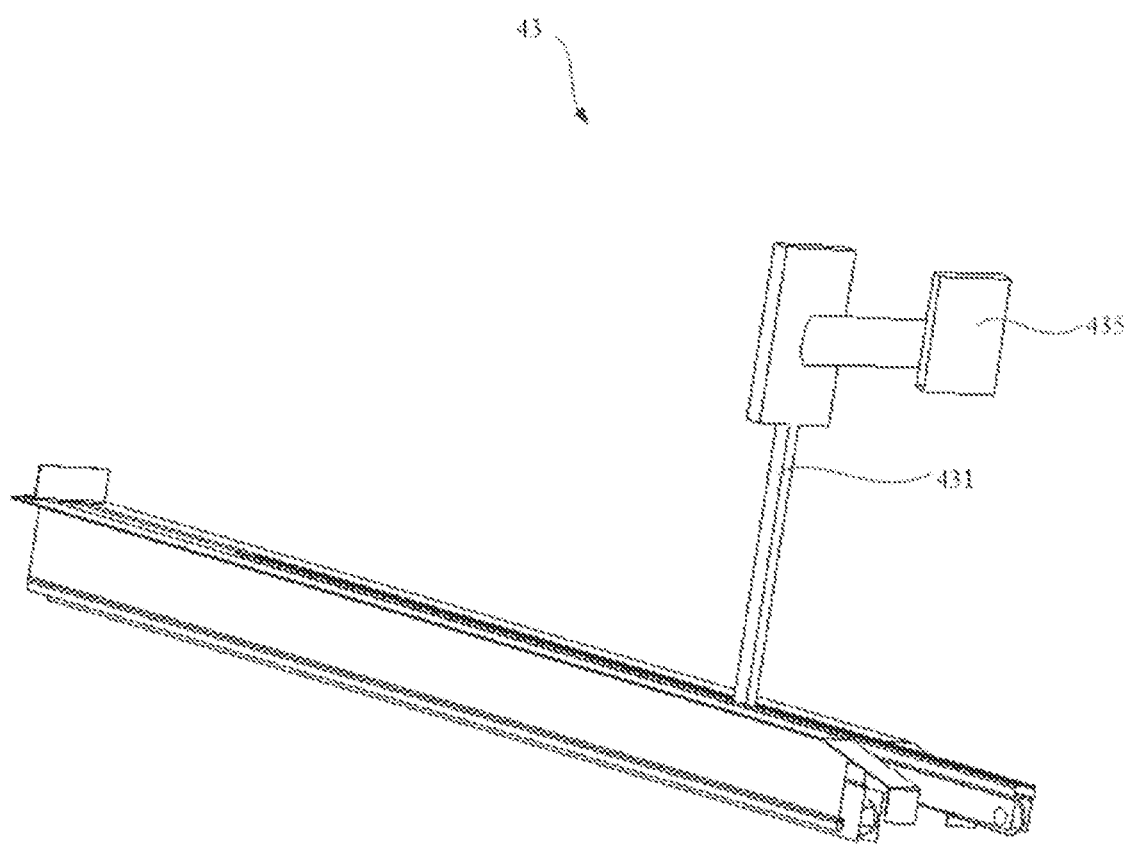
FIG. 37 is a schematic diagram of a second structure of a take-out assembly in a goods box take-out mechanism according to Embodiment III of this application.

FIG. 37 is a schematic diagram of a second structure of a take-out assembly in a goods box take-out mechanism according to Embodiment III of this application. In another optional embodiment, as shown in FIG. 37, the take-out assembly 43 includes a fixed bracket 431 disposed on the transmission assembly 42 and a magnet 435 mounted on the fixed bracket 431. The to-be-transferred goods box 10 is a metal goods box or a magnetic goods box, and the to-be-transferred goods box 10 is adsorbed by the magnetic adsorption force of the magnet 435. A partial structure of the to-be-transferred goods box 10 may be made of a metal material or magnetic material; or an outer packaging box or a packing box of the to-be-transferred goods box 10 is made of a metal material or magnetic material; or a partial structure such as a frame of the outer packaging box or the packing box of the to-be-transferred goods box 10 is made of a metal material or magnetic material, as long as the to-be-transferred goods box 10 can be adsorbed on the magnet 435 by the magnetic adsorption force with the magnet 435. The magnet 435 may be an electromagnet 435, which has magnetism when energized, and adsorbs the to-be-transferred goods box 10 by magnetism. When the power is off, the magnetism disappears, and the magnet 435 is detached from the to-be-transferred goods box 10.

Figure 38:
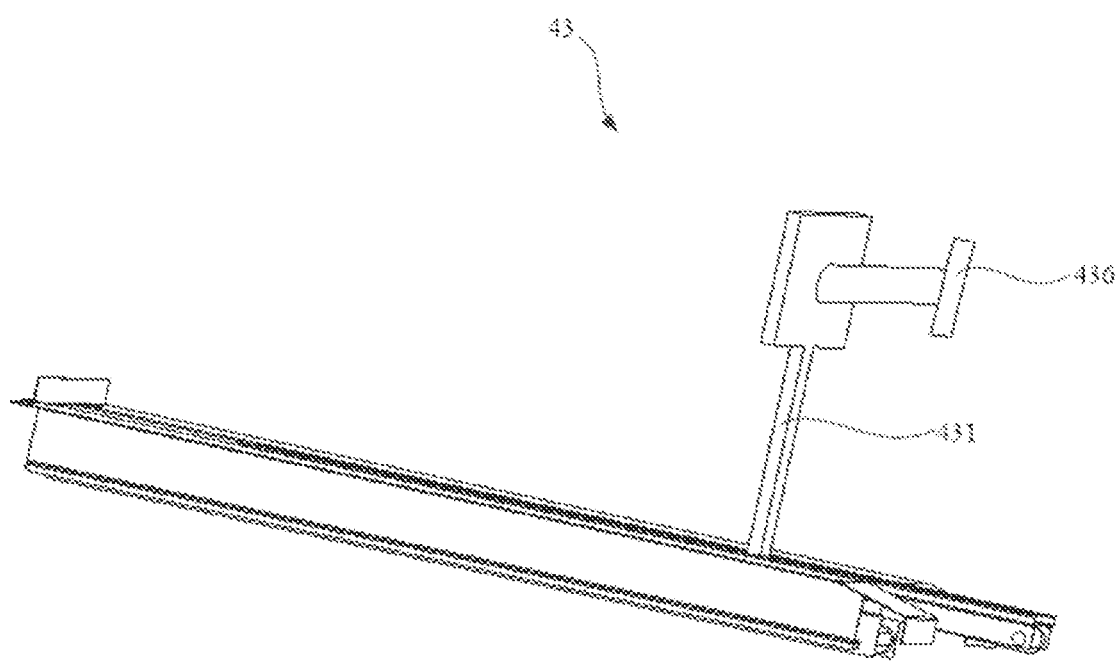
FIG. 38 is a schematic diagram of a third structure of a take-out assembly in a goods box take-out mechanism according to Embodiment III of this application.

FIG. 38 is a schematic diagram of a third structure of a take-out assembly in a goods box take-out mechanism according to Embodiment III of this application. In still another optional embodiment, as shown in FIG. 38, the take-out assembly 43 includes a fixed bracket 431 disposed on the transmission assembly 42 and a buckle 436 mounted on the fixed bracket 431. The front surface of the to-be-transferred goods box 10 has a slot matched with the buckle 436, and the take-out assembly 43 moves the to-be-transferred goods box 10 through the buckle 436 engaged with the slot on the to-be-transferred goods box 10. In this embodiment, the to-be-transferred goods box 10 refers to a goods box having an outer packaging box or an outer packing box, and the outer packaging box or the outer packing box has a slot matched with the buckle 436.

For example, the buckle 436 may be an elastic buckle 436. When the elastic buckle 436 moves to the position of the slot, the elastic buckle 436 is engaged with the slot. When the to-be-transferred goods box 10 moves to a designated position, to facilitate the release of the elastic buckle 436 from the slot, a limiting switch connected to the elastic buckle 436 through a driving member may be disposed at a position convenient for personnel to operate. In this way, the limiting switch is operated to drive the driving member to drive the engagement and disengagement between the buckle 436 and the slot.

The driving member may be a self-limiting rotating member, and the self-limiting rotating member may be used to drive the buckle 436 to rotate, where the rotation angle may be customized. When the buckle 436 moves to the slot, the self-limiting rotating member drives the buckle 436 to rotate and be engaged with the slot. When the to-be-transferred goods box 10 moves to the designated position, the self-limiting rotating member drives the buckle 436 to rotate in the opposite direction, so that the buckle 436 and the slot are disengaged. The buckle 436 may be a claw, for example, a straight-line claw or the like.

Figure 39:
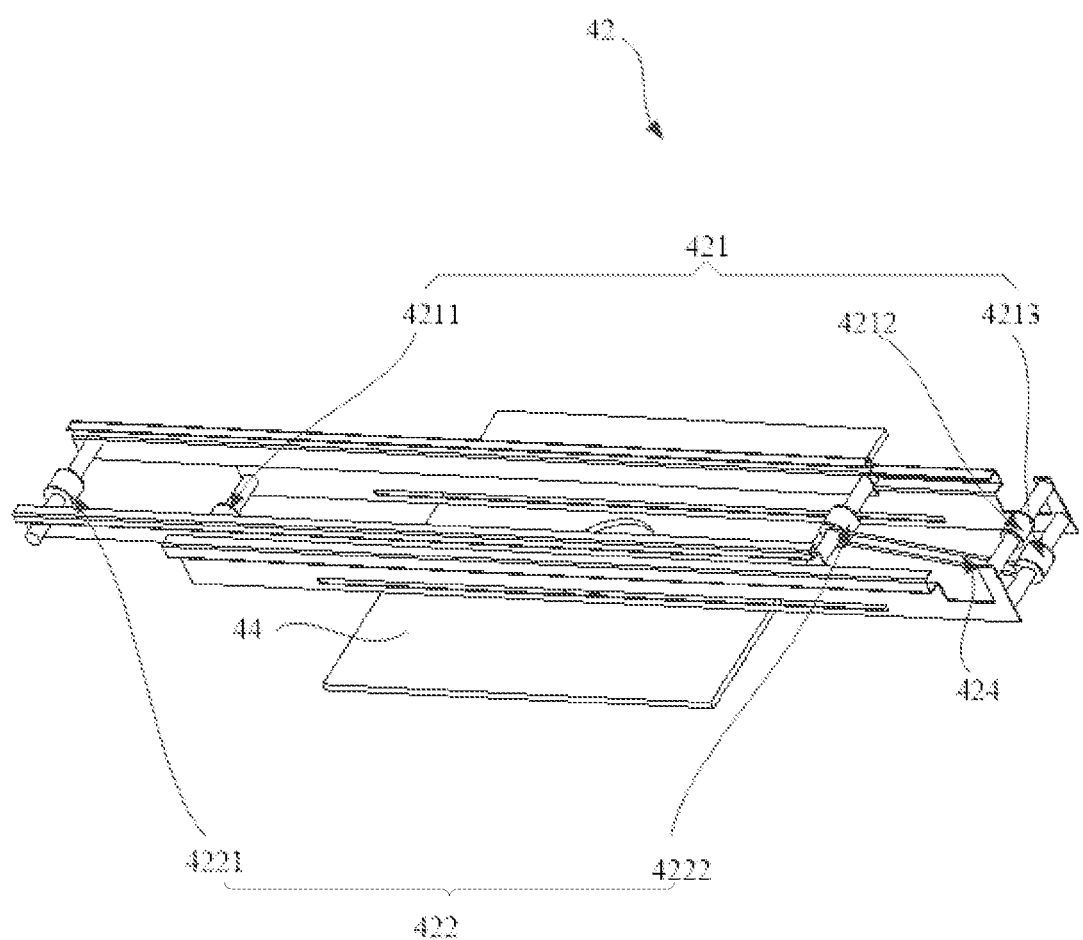
FIG. 39 is a schematic structural diagram of a transmission assembly in a goods box take-out mechanism according to Embodiment III of this application.
Figure 40:
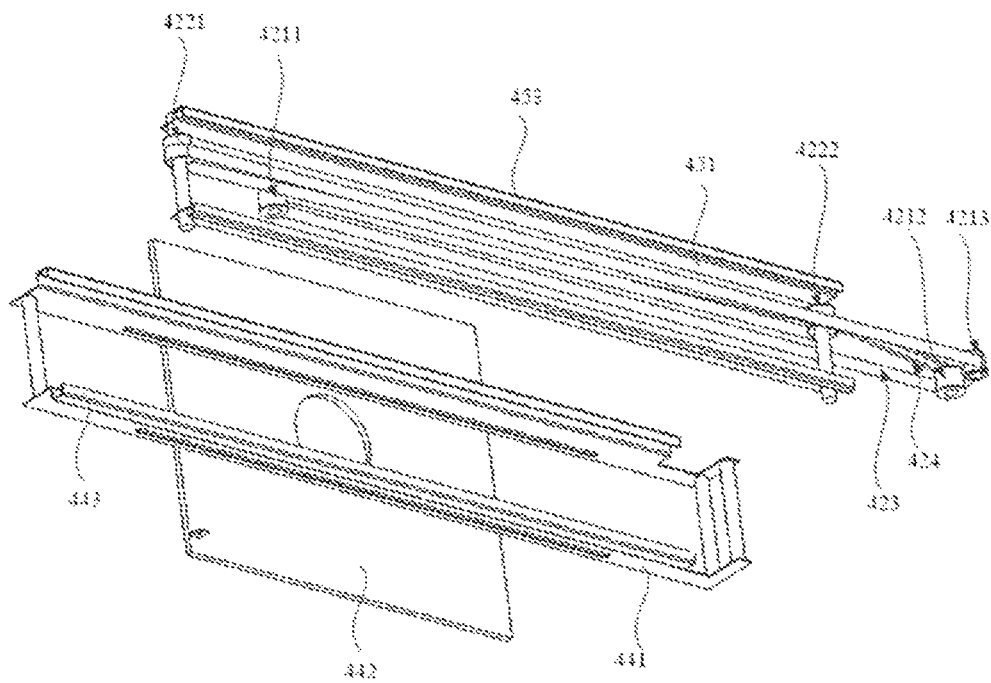
FIG. 40 is a schematic structural exploded view of FIG. 39.
Figure 41:
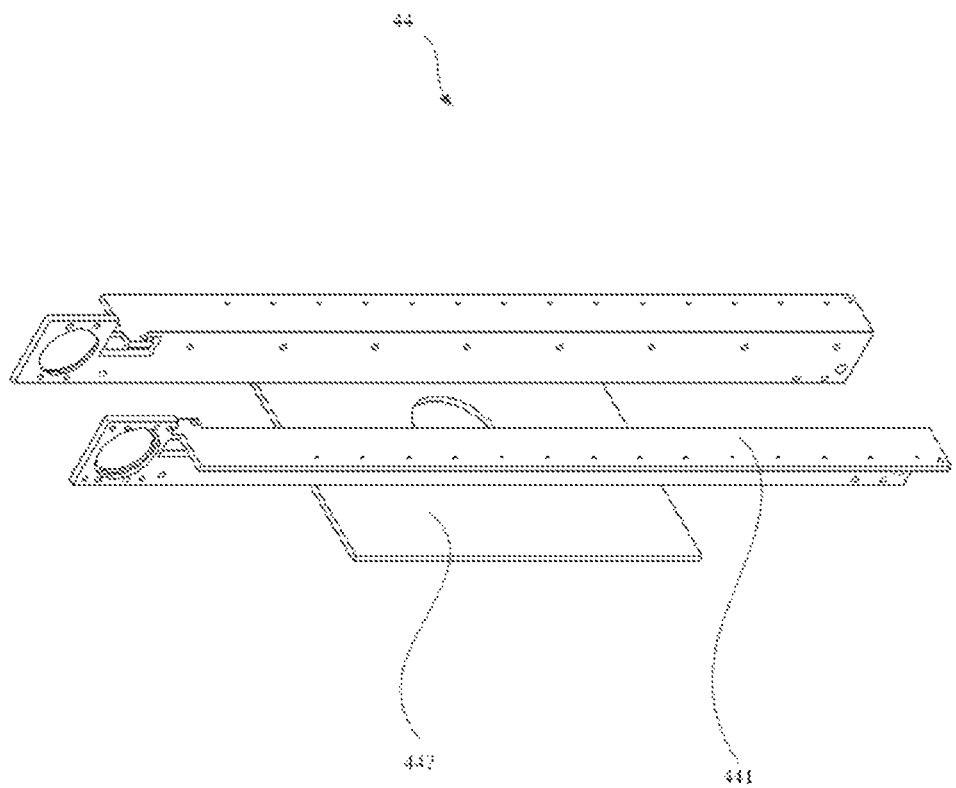
FIG. 41 is a schematic structural diagram of a pedestal in a transmission assembly according to Embodiment III of this application.
Figure 42:
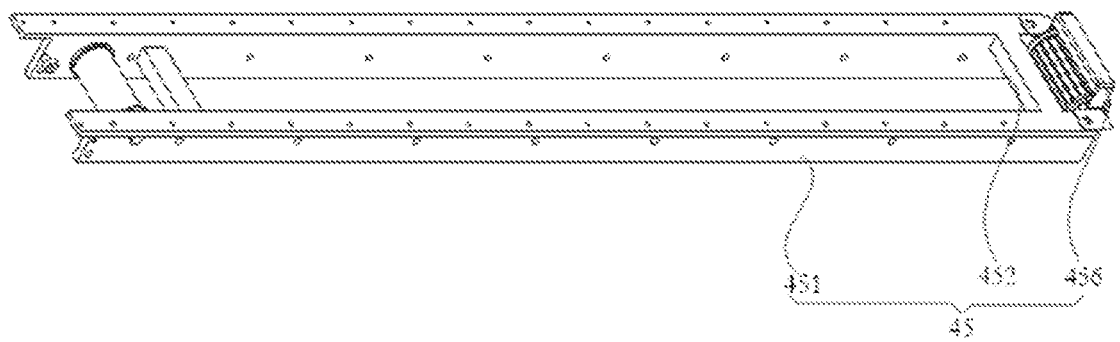
FIG. 42 is a schematic diagram of a first structure of a sliding seat in a transmission assembly according to Embodiment III of this application.
Figure 43:
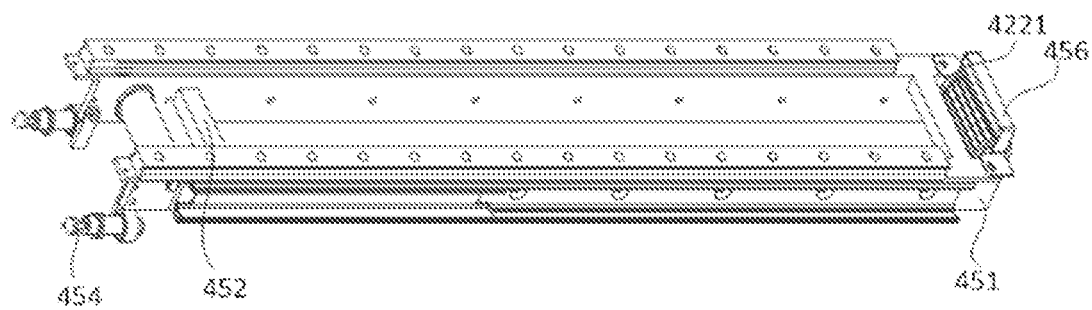
FIG. 43 is a schematic diagram of a second structure of a sliding seat in a transmission assembly according to Embodiment III of this application.
Figure 44:
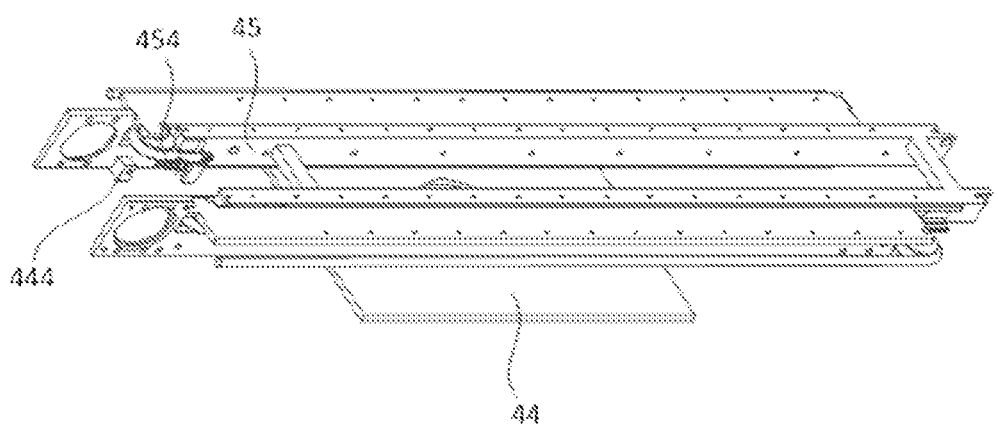
FIG. 44 is a schematic diagram of an assembly structure of a sliding seat mounted on a pedestal according to Embodiment III of this application.

FIG. 39 is a schematic structural diagram of a transmission assembly in a goods box take-out mechanism according to Embodiment III of this application. FIG. 40 is a schematic structural exploded view of FIG. 39. FIG. 41 is a schematic structural diagram of a pedestal in a transmission assembly according to Embodiment III of this application. FIG. 42 is a schematic structural diagram of a sliding seat in a transmission assembly according to Embodiment III of this application. FIG. 43 is a schematic structural diagram of another sliding seat in a transmission assembly according to Embodiment III of this application. FIG. 44 is a schematic diagram of an assembly structure of a sliding seat mounted on a pedestal according to Embodiment III of this application.

Based on the foregoing embodiment, to implement that the transmission assembly 42 drives the take-out assembly 43 to move toward or away from the front surface of the to-be-transferred goods box: Referring to FIG. 39 to FIG. 44, the transmission assembly 42 includes a pedestal 44 mounted on the rotary assembly 41, a fixed wheel assembly 421, a movable wheel assembly 422, and a transmission belt 423.

It should be noted that, the first direction is perpendicular to the second direction, and the second direction is a moving direction in which the take-out assembly 43 moves toward or away from the to-be-transferred goods box 10. The front end of the pedestal 44 refers to the end that is consistent with the second direction and is close to the to-be-transferred goods box 10, and the end far from the to-be-transferred goods box 10 is the rear end of the pedestal 44. The front end of the sliding seat is consistent with the front end of the pedestal, and the rear end of the sliding seat is consistent with the rear end of the pedestal.

The fixed wheel assembly 421 includes a first fixed wheel 4211, a second fixed wheel 4212, and a third fixed wheel 4213. The first fixed wheel 4211 is mounted at the front end of the pedestal 44, and the second fixed wheel 4212 and the third fixed wheel 4213 are mounted at the rear end of the pedestal 44 at an interval along the first direction. That is, the first fixed wheel 4211, the second fixed wheel 4212, and the third fixed wheel 4213 form a shape of a triangle, so that mounting space for the movable wheel assembly 422 is formed among the second fixed wheel 4212, the third fixed wheel 4213, and the first fixed wheel 4211.

The front end of the pedestal 44 may be provided with a wheel shaft, the first fixed wheel 4211 is mounted on the wheel shaft, and the first fixed wheel 4211 can rotate on the wheel shaft. Two wheel shafts are mounted at the rear end of the pedestal 44 at an interval along the first direction. The second fixed wheel 4212 and the third fixed wheel 4213 are respectively mounted on the upper and lower wheel shafts, and the second fixed wheel 4212 and the third fixed wheel 4213 can rotate relative to the respective wheel shafts.

The movable wheel assembly 422 includes a sliding seat 45 mounted on the pedestal 44, a first movable wheel 4221, and a second movable wheel 4222, the first movable wheel 4221 is mounted at a front end of the sliding seat 45, and the second movable wheel 4222 is mounted at a rear end of the sliding seat 45. The front end of the sliding seat 45 refers to the end facing the to-be-transferred goods box 10, and the rear end of the sliding seat 45 refers to the end opposite to the front end of the sliding seat 45.

Referring to FIG. 40 and FIG. 42, the front end of the sliding seat 45 is provided with a limiting structure 456, the rear end of the sliding seat 45 is connected to a reset mechanism 424, and the transmission belt 423 is sequentially wound around the second fixed wheel 4212, the first movable wheel 4221, the second movable wheel 4222, the first fixed wheel 4211, and the third fixed wheel 4213. When the take-out assembly 43 is driven by the transmission belt 423 to move to the limiting structure 456 in the second direction, the take-out assembly 43 abuts against the limiting structure 456. The transmission belt 423 drives the take-out assembly 43 to continue to move forward. The take-out assembly 43 pushes the limiting structure 456 on the sliding seat 45, so that the limiting structure 456 drives the movable wheel assembly 422 to move together with the take-out assembly 43 in the second direction. In this way, the path along which the take-out assembly 43 can move in the second direction is longer, avoiding the problem that the to-be-transferred goods box 10 cannot be taken out due to the short moving path. When the transmission belt 423 is driven in an opposite direction, the reset mechanism 424 is configured to reset the movable wheel assembly 422, and after the movable wheel assembly 422 is reset, the transmission belt 423 drives the take-out assembly 43 to reset.

For example, the limiting structure 456 may be a limiting plate, where two ends of the limiting plate are respectively fixed at the rear end of the pedestal 44. The reset mechanism 424 may be a spring, where one end of the spring is connected to wheel shaft of the second movable wheel 4222 at the rear end of the sliding seat 45, and the other end of the spring is connected to the wheel shaft of the second fixed wheel 4212 at the rear end of the pedestal 44.

It should be noted that, the second fixed wheel 4212 may be used as a driving wheel of the transmission assembly 42. The transmission assembly 42 further includes a motor, where an output shaft of the motor is connected to the second fixed wheel 4212, and the second fixed wheel 4212 rotates to drive the transmission belt 423 wound around the second fixed wheel 4212 to move. The transmission belt 423 drives the first movable wheel 4221, the second movable wheel 4222, the first fixed wheel 4211, and the third fixed wheel 4213 to rotate.

In a specific implementation, the take-out assembly 43 is mounted on the transmission belt 423, and the take-out assembly 43 is driven by the transmission belt 423 to move toward the front surface of the to-be-transferred goods box 10 in the second direction. When the take-out assembly 43 moves to the limiting structure 456 at the front end of the sliding seat 45, the take-out assembly 43 abuts against the limiting structure 456. The transmission belt 423 drives the take-out assembly 43 to continue to move toward the front surface of the to-be-transferred goods box 10. The take-out assembly 43 pushes the limiting structure 456 to drive the movable wheel assembly 422 to move forward together, In this case, the spring connected to the second movable wheel 4222 and the second fixed wheel 4212 starts to be stretched. When the take-out assembly 43 moves to the front surface of the to-be-transferred goods box 10 and is connected to the front surface of the to-be-transferred goods box 10, the motor 417 starts to reverse, the transmission belt 423 rotates in the opposite direction, the take-out assembly 43 drives the to-be-transferred goods box 10 to rotate in the opposite direction along with the transmission belt 423, and a power assembly also moves in the opposite direction under the tension of the spring until the spring is in the free stretched state. The movable wheel assembly 422 resets and then stops moving, and the transmission belt 423 drives the take-out assembly 43 to continue to move in the opposite direction until the take-out assembly 43 is reset.

Referring to FIG. 41, specifically, the pedestal 44 includes two support plates 441 disposed oppositely and a bottom connecting plate 442 disposed between the two support plates 441 and connected to the two support plates 441 respectively, where the first fixed wheel 4211 is mounted at a front end of the bottom connecting plate 442, and the second fixed wheel 4212 and the third fixed wheel 4213 are mounted at a rear end of the bottom connecting plate 442 at an interval along the first direction.

Referring to FIG. 42, the sliding seat 45 includes two sliding plates 451 disposed oppositely and a fixed connecting plate 452 connecting the two sliding plates 451. The first movable wheel 4221 is mounted at a front end of the fixed connecting plate 452, and the second movable wheel 4222 is mounted at a rear end of the fixed connecting plate 452.

Referring to FIG. 40, sliding rails 453 are disposed on the sides of the two sliding plates 451 facing the two support plates 441, and guide blocks 443 matching the sliding rails 453 are disposed on the two support plates 441, where sliding grooves are provided on the guide blocks 443, so that the sliding seat 45 can move in the sliding grooves through the sliding rails 453 on the two sliding plates 451.

When the sliding seat 45 moves in the second direction, the movable wheel assembly 422 can move along with the sliding seat 45 on the pedestal 44 in the second direction, so that the take-out assembly 43 moves along with the movable wheel assembly 422 to obtain a longer moving path of the take-out assembly 43.

Referring to FIG. 43 and FIG. 44, further, to reduce the impact force between the sliding seat 45 and the pedestal 44 during reset, in this embodiment, Buffers 454 may be disposed at the rear ends of the two sliding plates 451 of the sliding seat 45, and collision blocks 444 facing the buffers 454 may be disposed at the rear ends of the two support plates 441 of the pedestal 44. When the sliding seat 45 retreats to the rear end of the pedestal 44, the collision blocks 454 on the sliding plates 451 first collide with the collision blocks 444 on the support plates 441. Since the buffers 454 have a buffering capability, the buffers 454 can reduce the impact force between the sliding seat 45 and the pedestal 44, thereby reducing the shock to the goods box take-out mechanism 4. In addition, the collision blocks 444 are disposed on the pedestal 44, which can further limit the sliding seat 45 to prevent the sliding seat 45 from moving to the rear end of the pedestal 44 and continuing to move backward with the transmission belt 423, causing the sliding seat 45 to slip off from the pedestal 44.

Figure 45:
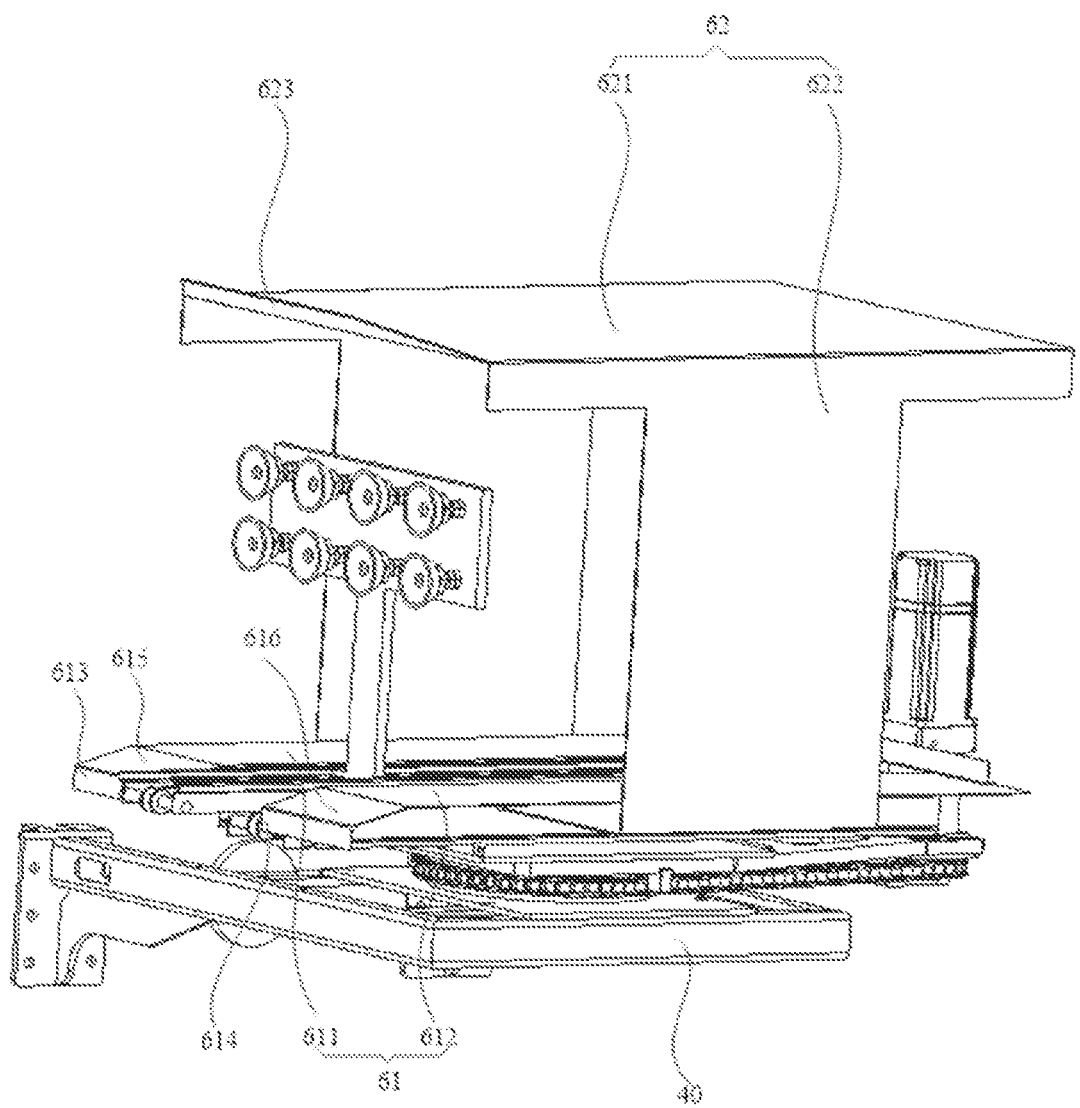
FIG. 45 is a schematic diagram of a second structure of a goods box take-out mechanism according to Embodiment III of this application.

FIG. 45 is a schematic diagram of a second structure of a goods box take-out mechanism according to Embodiment III of this application. Referring to FIG. 45, the goods box take-out mechanism 4 further includes a first tray 61 and a second tray 62 disposed oppositely and located on two sides of the take-out assembly 43, and the first tray 61 and the second tray 62 are configured to carry the to-be-transferred goods box 10 taken out by the take-out assembly 43.

For example, when the robot rack 2 is located on a level ground, the first tray 61 and the second tray 62 are disposed oppositely up and down, and in the vertical direction, the take-out assembly 43 is located between the first tray 61 and the second tray 62. For example, the first tray 61 is located below the take-out assembly 43, and the second tray 62 is located above the take-out assembly 43. When the goods box take-out mechanism 4 rotates to be above the support beam 3, the first tray 61, the take-out assembly 43, and the second tray 62 are all located above the support beam 3. In this case, the to-be-transferred goods box 10 taken out by the take-out assembly 43 is moved to the first tray 61. When the goods box take-out mechanism 4 rotates to be below the support beam 3, the first tray 61, the take-out assembly 43, and the second tray 62 are located below the support beam 3. In this case, the to-be-transferred goods box 10 taken out by the take-out assembly 43 is moved to the second tray 62. In this way, when the take-out assembly 43 takes out the to-be-transferred goods box 10 at different heights, the first tray 61 or the second tray 62 in the tray 6 can be used to carry the to-be-transferred goods box 10 taken out by the take-out assembly 43.

Further, the first tray 61 includes a first supporting plate 611 and a second supporting plate 612. The first supporting plate 611 and the second supporting plate 612 are respectively mounted on the respective support plates 441. A passage for movement of the fixed bracket 431 is formed between the first supporting plate 611 and the second supporting plate 612. One end of the fixed bracket 431 away from the transmission belt 423 is located above the tray 6.

Specifically, the passage is formed between the first supporting plate 611 and the second supporting plate 612. The transmission belt 423 is driven in the passage. The fixed bracket 431 is mounted on the transmission belt 423. One end of the fixed bracket 431 away from the transmission belt 423 is located above the first supporting plate 611 and the second supporting plate 612. The suction cups 432, the magnet 435, or the buckle 436 are mounted on the front surface of the end of the fixed bracket 431 away from the transmission belt 423. When the fixed bracket 431 moves with the transmission belt 423 to the front surface of the to-be-transferred goods box 10, the suction cups 432, the magnet 435, or the buckle 436 on the fixed bracket 431 are connected to the front surface of the to-be-transferred goods box 10. When the transmission belt 423 moves in the opposite direction, the suction cups 432, the magnet 435, or the buckle 436 on the fixed bracket 431 drag the to-be-transferred goods box 10 to the first supporting plate 611 and the second supporting plate 612, to prevent the goods box from falling off the take-out assembly 43 during movement.

Further, the first tray 61 can move in the second direction on the pedestal 44. When the take-out assembly 43 is connected to the front surface of the to-be-transferred goods box, the first tray can abut against the warehousing shelving unit 9, and the take-out assembly 43 removes the to-be-transferred goods box 10 to the first tray 61, which can prevent the to-be-transferred goods box 10 from falling from the warehousing shelving unit 9 when the take-out assembly 43 takes out the to-be-transferred goods box. To implement the movement of the first tray 61 on the pedestal 44, in this embodiment, the rear end of the first tray 61 is provided with a reset plate extending upward, and the rear end of the first tray 61 is connected to the front end of the pedestal 44 through a spring. When the fixed bracket 431 is located at the rear end of the pedestal 44 and abuts against the reset plate, the spring is in a stretched state. When the fixed bracket 431 moves forward, the first tray 61 also moves forward under the tension of the spring, until the front end of the first tray 61 abuts against the warehousing shelving unit 9. After the take-out assembly 43 moves the to-be-transferred goods box 10 on the warehousing shelving unit 9 to the first tray 61, the take-out assembly 43 moves backward. After the fixed bracket 431 moves to the rear end of the first tray 61 and abuts against reset plate with the rear end of the first tray 61, the fixed bracket 431 continues to push the reset plate to move in the direction away from the warehousing shelving unit 9 along the second direction, so that the reset plate drives the first tray 61 to reset.

To improve the moving reliability of the first tray 61 on the pedestal 44, a guide rail may be disposed on the side of the first tray 61 facing the pedestal 44, and a structure such as a guide block 443 with a sliding groove matching the guide rail may be disposed on the pedestal 44. The guide rail slides in the sliding groove to guide the first tray 61, improving the moving reliability of the first tray 61, and avoid stagnation of the first tray 61 due to direction deviation during movement.

Based on the foregoing embodiment, since the first tray can move along the second direction on the pedestal, to reduce the impact force between the first tray and the warehousing shelving unit 9 when the first tray 61 moves to the warehousing shelving unit 9, the front end of the first tray 61 may be provided with a buffer pad. For example, a first buffer pad 613 is disposed at the front end of the first supporting plate 611, and the first buffer pad 613 is located on the end surface of the first supporting plate 611 facing the to-be-transferred goods box 10. The front end of the second supporting plate 612 is provided with a second buffer pad 614, and the second buffer pad 614 is located on the end surface of the second supporting plate 612 facing the to-be-transferred goods box 10. The buffer pad may be a rubber pad or another structure capable of shock absorption. By using the buffer pad, the impact force with the warehousing shelving unit 9 is reduced, the shock to the transport robot caused by the impact is avoided, and the stability of the transport robot is improved.

Further, since there may be errors in the first direction between the first tray 61 and the warehousing shelving unit 9, the to-be-transferred goods box 10 may be stuck when moving to the first tray 61. Therefore, to avoid the foregoing problem, a first guide surface 615 may be disposed at the front end of the first supporting plate 611 and away from the surface of the pedestal 44. The first guide surface 615 extends obliquely downward toward the ground. A second guide surface 616 is disposed at the front end of the second supporting plate 612 and away from the surface of the pedestal 44. The second guide surface 616 extends obliquely downward toward the ground, so that when the take-out assembly 43 takes out the to-be-transferred goods box 10, the to-be-transferred goods box 10 can be smoothly moved to the first tray 61 through the first guide surface 615 and the second guide surface 616, to avoid that the to-be-transferred goods box 10 is stuck when moving to the first tray 61.

Still referring to FIG. 45, further, the second tray 62 includes a tray body 621, two sides of the tray body 621 are provided with extension portions 622 respectively connected to the pedestal 44.

Specifically, the second tray 62 is connected to the pedestal 44 respectively through the extension portions 622 disposed on the two sides of the tray body 621, so that the second tray 62 is mounted on the pedestal 44 and uses the tray body 621 disposed between the two extension portions 622 to carry the to-be-transferred goods box 10.

In an optional embodiment, a third guide surface 623 is disposed on the surface of the front end of the tray body 621 and away from the pedestal 44. The third guide surface 623 extends obliquely downward toward the ground.

Specifically, since there may be errors in the first direction between the tray body 621 and the warehousing shelving unit 9, the to-be-transferred goods box 10 may be stuck when moving to the second tray 62. Therefore, a third guide surface 623 may be disposed at the front end of the tray body 621 of the second tray 62 and away from the surface of the pedestal 44. The third guide surface 623 may extend obliquely downward toward the ground. In this way, when the take-out assembly 43 takes out the to-be-transferred goods box 10, the to-be-transferred goods box 10 can be smoothly moved to the tray body 621 through the third guide surface 623, to avoid that the to-be-transferred goods box 10 is stuck when moving to the tray body 621.

Figure 46:
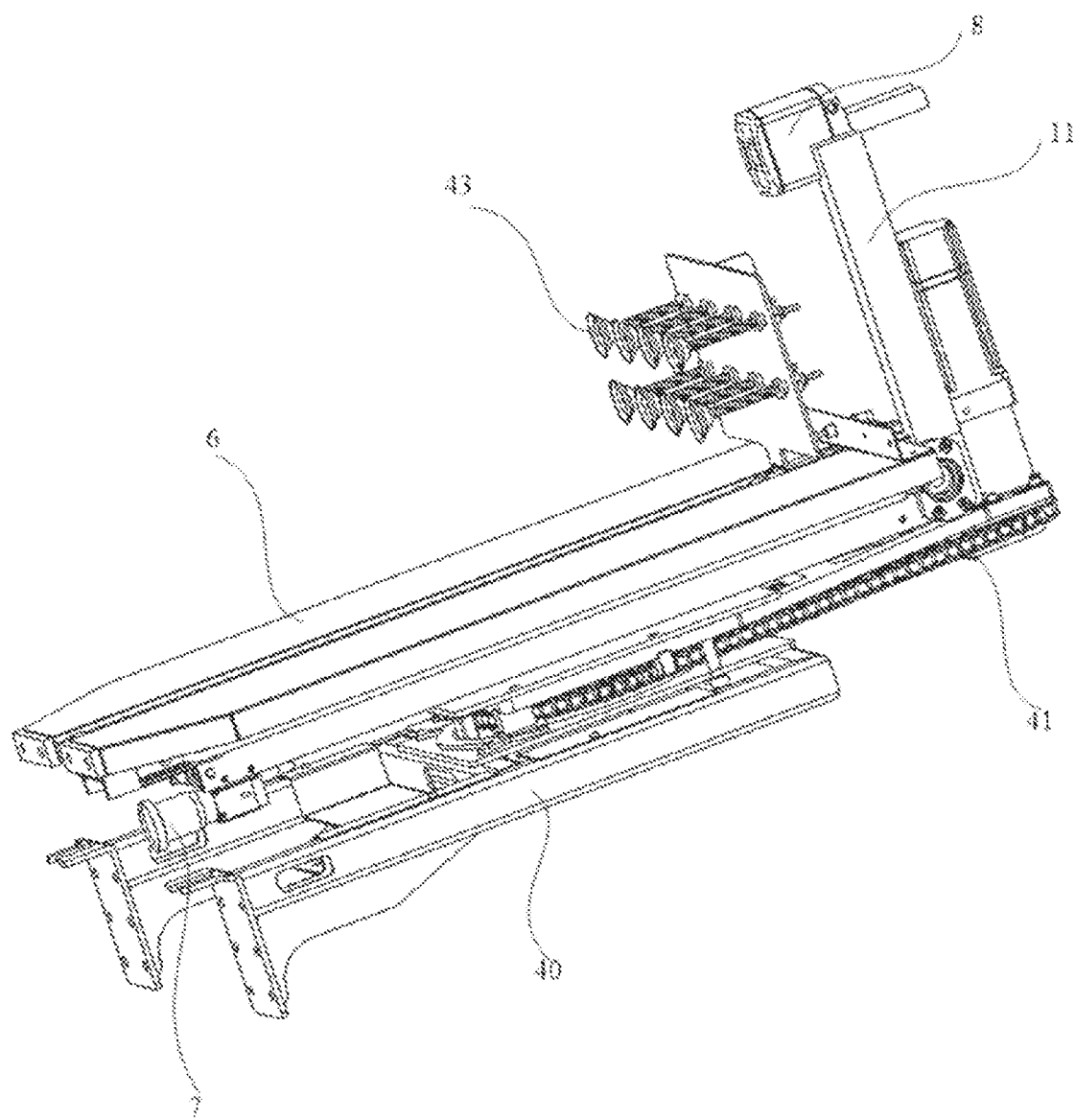
FIG. 46 is a schematic diagram of a third structure of a goods box take-out mechanism according to Embodiment III of this application.

FIG. 46 is a schematic diagram of a third structure of a goods box take-out mechanism according to Embodiment III of this application. As shown in FIG. 46, based on the foregoing embodiment, to realize full automation and multi-functionality of the transport robot, the transport robot further includes a first camera, where the first camera 7 is mounted on a side of the goods box take-out mechanism 4 facing the to-be-transferred goods box 10, and the first camera 7 is configured to obtain an identification code on the to-be-transferred goods box 10.

Specifically, to enable the first camera 7 to easily obtain the identification code on the to-be-transferred goods box 10, the first camera 7 may be disposed at the front end of the pedestal. In this way, when the goods box take-out mechanism 4 is close to the to-be-transferred goods box 10, the first camera 7 can scan the identification code, such as a barcode or a two-dimensional code, on the to-be-transferred goods box 10 to obtain relevant information of the to-be-transferred goods box 10, thereby improving the carrying efficiency.

Further, to enable the transport robot to quickly carry and pick goods boxes, a second camera 8 may be further disposed on the transport robot, and the second camera is mounted on the pedestal 44 through a column 11. In this way, the second camera 8 may be located at a higher position, so that physical information such as the size, the appearance, and the shape of the to-be-transferred goods box 10 can be acquired in an all-round way, and position information of the to-be-transferred goods box 10 on the warehousing shelving unit 9 can be acquired, implementing rapid picking and grabbing positioning, and further improving the carrying efficiency.

A goods box take-out method provided in Embodiment II of this application includes the following steps: driving a transport robot to move to be in front of a warehousing shelving unit where a to-be-transferred goods box is located;

selectively moving a goods box take-out mechanism up and down according to a height of the to-be-transferred goods box, and driving the goods box take-out mechanism to rotate, so that the goods box take-out mechanism is located above or below a support beam, and a height of the goods box take-out mechanism is consistent with a position of the to-be-transferred goods box; and connecting the goods box take-out mechanism to a front surface of the to-be-transferred goods box to transfer the to-be-transferred goods box.

Specifically, when the transport robot moves to the warehousing shelving unit of the to-be-transferred goods box, the goods box take-out mechanism moves up and down on the robot rack according to the height of the to-be-transferred goods box; or the driving device drives the goods box take-out mechanism to rotate; or the goods box take-out mechanism moves up and down on the robot rack while rotating, so that the height of the goods box take-out mechanism is consistent with the height of the to-be-transferred goods box. The goods box take-out mechanism moves toward the front surface of the to-be-transferred goods box, and is in contact with the front surface of the to-be-transferred goods box, so that the goods box take-out mechanism transfers the to-be-transferred goods box.

The process of the goods box take-out method provided in this embodiment is described in detail when the working principle and the structure of the transport robot are described in Embodiment III, and the details are not repeated in this embodiment.

A goods box take-out device provided in the embodiments of this application is mounted on a support beam of a rack and includes a goods box take-out mechanism and a driving device, where the goods box take-out mechanism is pivotally mounted on the support beam, and the goods box take-out mechanism is configured to be connected to a front surface of a to-be-transferred goods box to transfer the to-be-transferred goods box; the driving device is mounted on the support beam and connected to the goods box take-out mechanism, and the driving device is configured to drive the goods box take-out mechanism to rotate, so that the goods box take-out mechanism is located above or below the support beam; and the goods box take-out mechanism includes a take-out assembly, and a first tray and a second tray disposed oppositely and located on two sides of the take-out assembly, and the first tray and the second tray are configured to carry the to-be-transferred goods box taken out by the take-out assembly.

Further, the goods box take-out mechanism further includes a mounting frame, a rotary assembly, and a transmission assembly, where the take-out assembly is mounted on the transmission assembly; the transmission assembly is mounted on the rotary assembly; the rotary assembly is mounted on the mounting frame; the mounting frame is rotatably connected to an output end of the driving device; the rotary assembly is configured to drive the transmission assembly and the take-out assembly to rotate in a plane perpendicular to a lifting direction of the support beam; and the transmission assembly is configured to drive the take-out assembly to move toward or away from the front surface of the to-be-transferred goods box.

The goods box take-out device provided in the embodiments of this application includes a goods box take-out mechanism and a driving device. The working principles and the structures of the goods box take-out mechanism and the driving device are described in detail in Embodiment III, and the details are not repeated in this embodiment.

It should be noted that, the goods box take-out device provided in the embodiments can be used independently.

The goods box take-out device provided in this application is mounted on the support beam of the robot rack. The goods box take-out device includes a goods box take-out mechanism and a driving device. The driving device drives the goods box take-out mechanism to rotate, so that the goods box take-out mechanism can rotate to be above or below the support beam. The goods box take-out mechanism is connected to the front surface of the to-be-transferred goods box to transfer the to-be-transferred goods box. The transport robot provided in the embodiments of this application can improve the utilization of the warehousing space and the versatility of the transport robot.

Embodiment IV

A transport robot generally includes a movable base, a robot rack on the movable base, and a grabbing mechanism mounted on the robot rack. The movable base can move on the ground in the warehousing area. A beam is mounted on the robot rack and can move up and down on the robot rack. The grabbing mechanism is mounted on the beam. The grabbing mechanism includes gripping arms and gripping portions located at front ends of the gripping arms for grabbing a goods box. The gripping arms may be retracted forward and backward. The gripping arms drive the gripping portions to grip left and right sides or upper and lower sides of the goods box to move the goods box. Moreover, to avoid interference between the robot rack and the top surface of the warehousing area, a specific safety distance is reserved between the robot rack and the top surface of the warehousing area. However, the grabbing manner of the existing transport robot leads to low utilization of storage space in the warehousing area, and the grabbing mechanism cannot grab a goods box placed above the robot rack, leading to poor versatility.

Therefore, the embodiments of this application provide a transport robot, to transfer the to-be-transferred goods box by connecting the take-out assembly to the front surface of the to-be-transferred goods box. In this way, the utilization of the storage space can be improved. In addition, the take-out assembly is disposed above the mounting frame, so that the goods box take-out assembly can take out a goods box placed higher than the robot rack, thereby improving the versatility of the transport robot.

Figure 47:
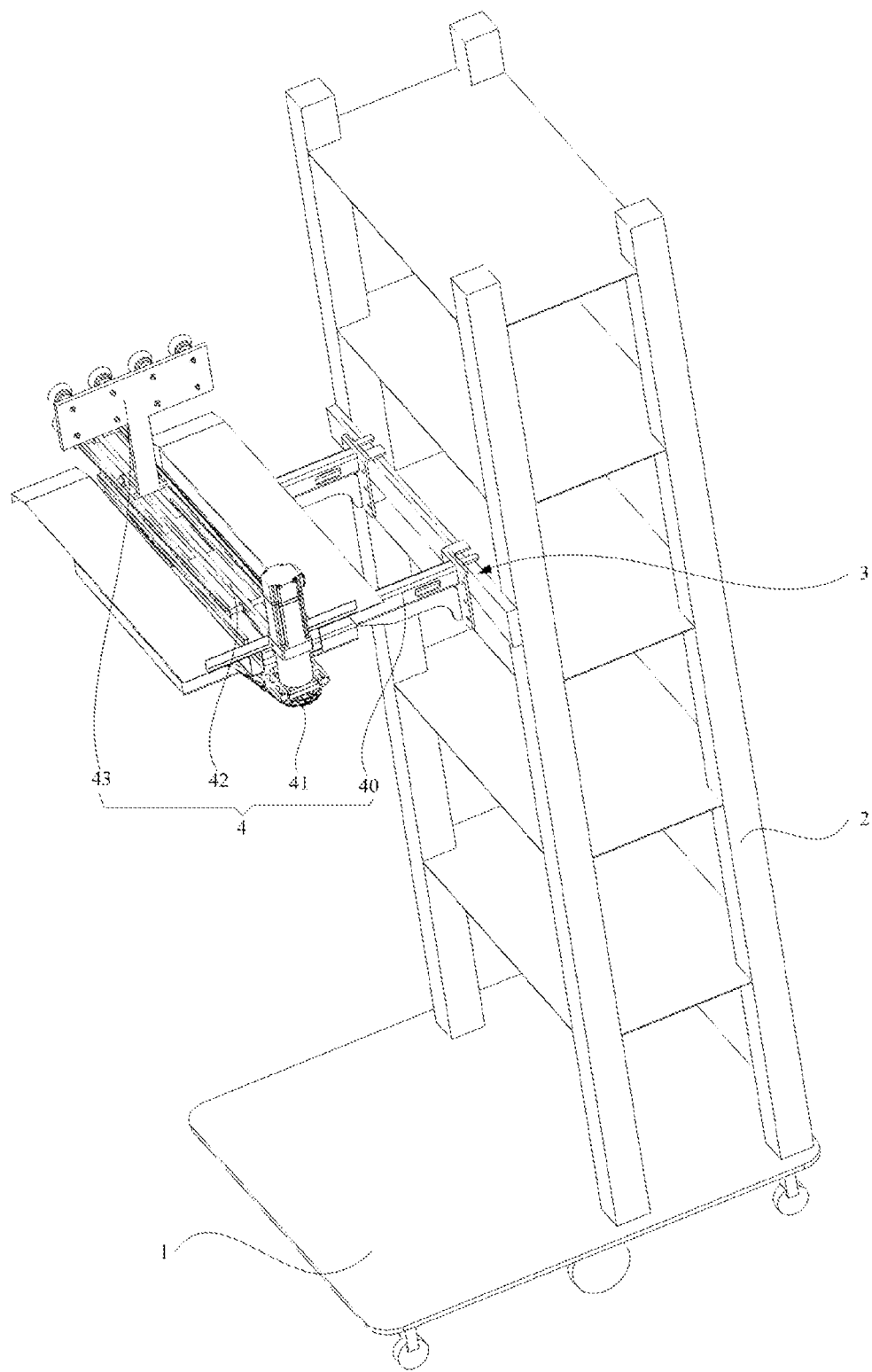
FIG. 47 is a schematic structural diagram of a transport robot according to Embodiment IV of this application.
Figure 48:
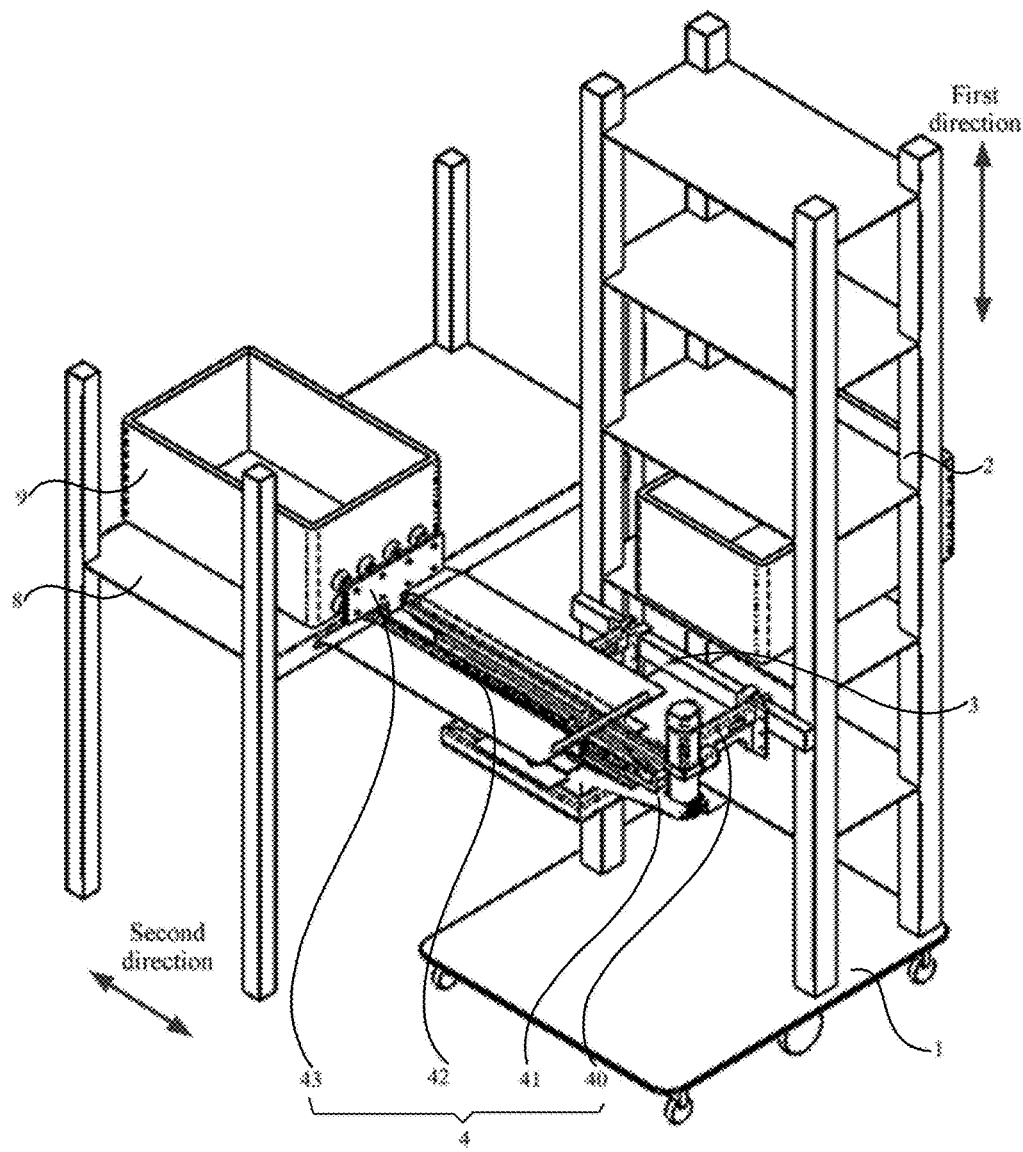
FIG. 48 is a diagram of an operating status of a transport robot according to Embodiment IV of this application.
Figure 49:
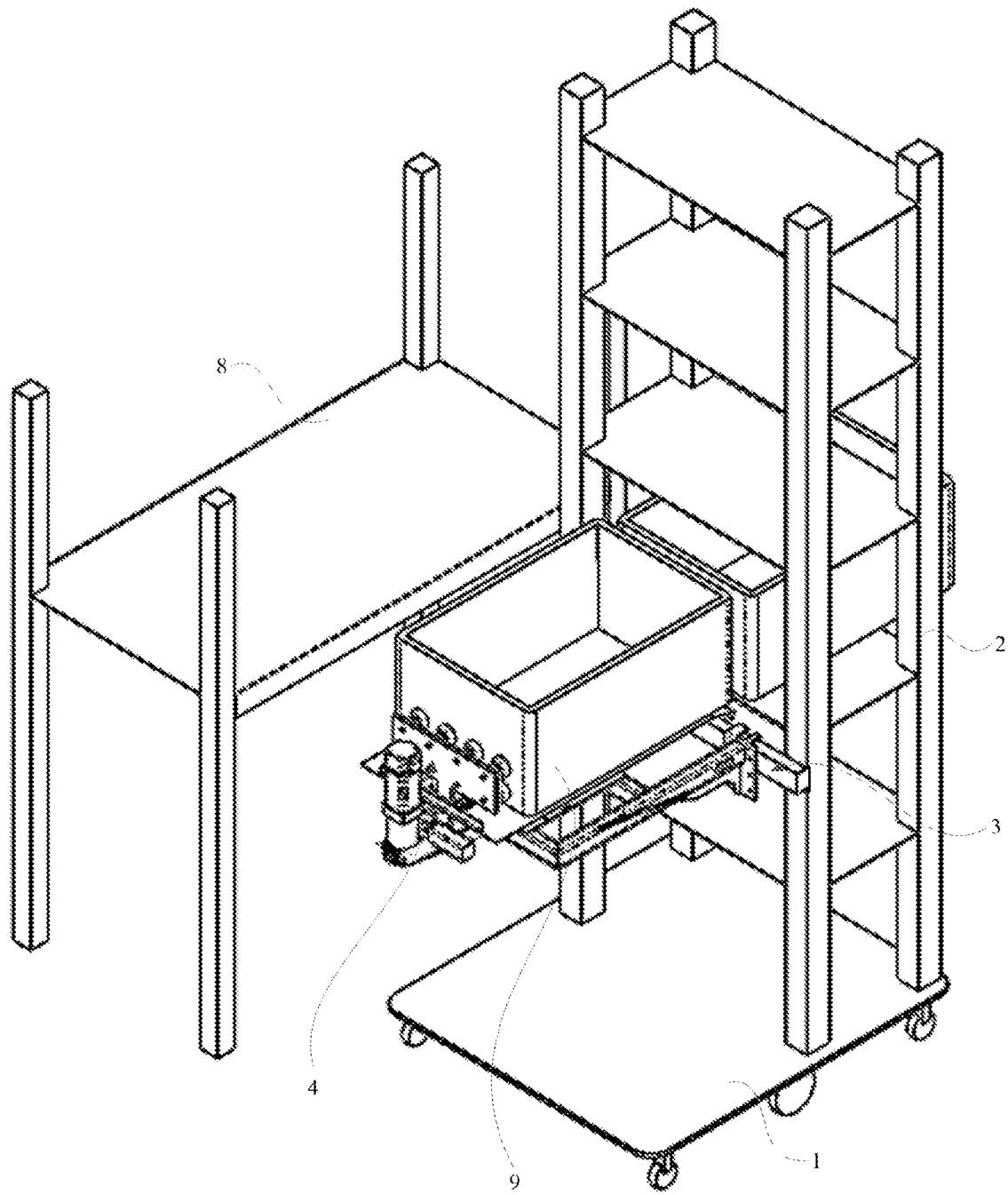
FIG. 49 is a diagram of another operating status of a transport robot according to Embodiment IV of this application.
Figure 50:
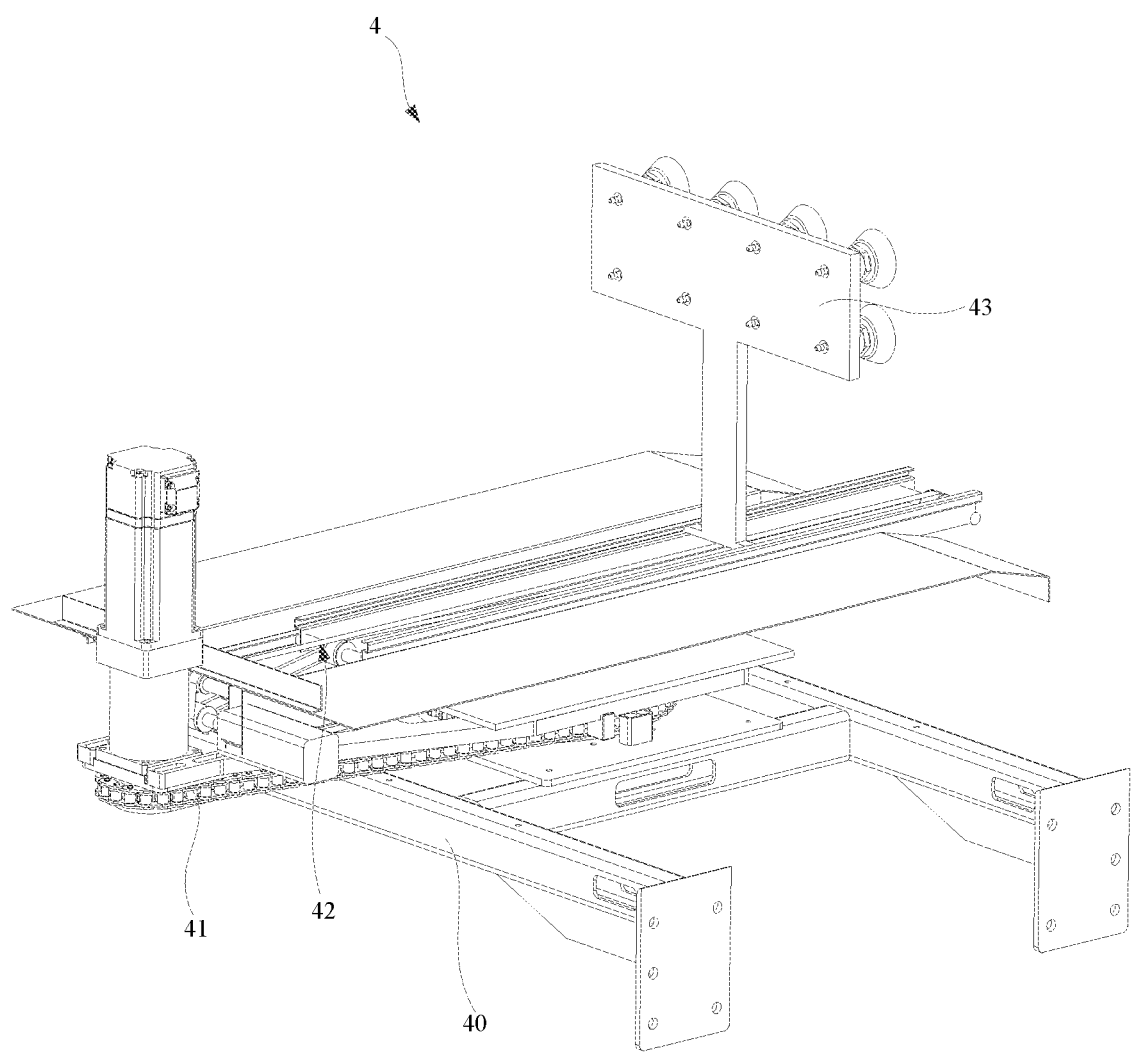
FIG. 50 is a schematic diagram of a first structure of a goods box take-out mechanism in a transport robot according to Embodiment IV of this application.
Figure 51:
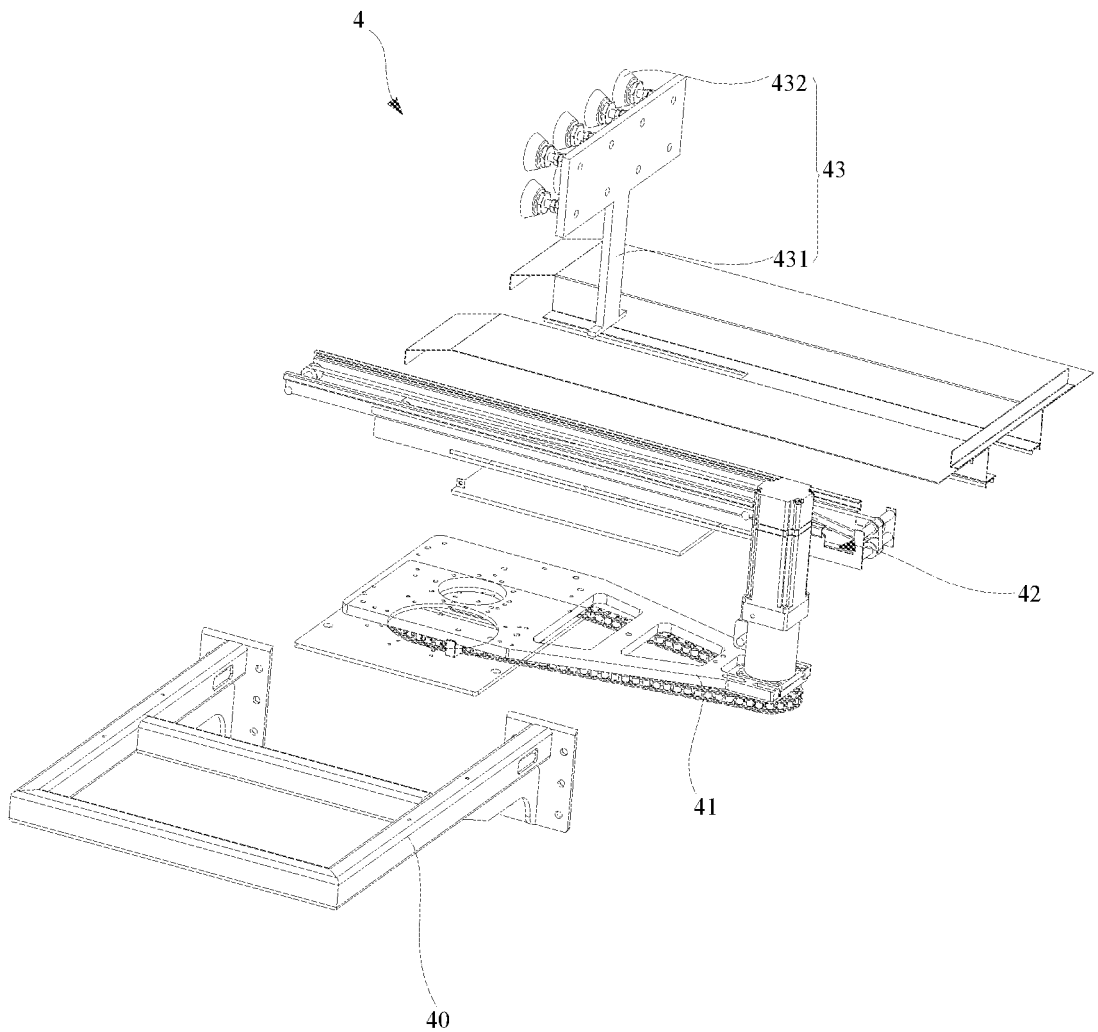
FIG. 51 is a schematic structural exploded view of FIG. 50.

FIG. 47 is a schematic structural diagram of a transport robot according to an embodiment of this application; FIG. 48 is a diagram of an operating status of a transport robot according to an embodiment of this application. FIG. 49 is a diagram of another operating status of a transport robot according to an embodiment of this application. FIG. 50 is a schematic diagram of a first structure of a goods box take-out mechanism in a transport robot according to an embodiment of this application. FIG. 51 is a schematic structural exploded view of FIG. 50. As shown in FIG. 47 to FIG. 51, a transport robot provided in the embodiments of this application includes: a movable base 1, a robot rack 2, a support beam 3, and a goods box take-out mechanism 4. The movable base 1 is the support structure of the transport robot, and is configured to support and carry other components and/or devices of the transport robot for walking. The robot rack 2 is mounted on the movable base 1, so that the movable base 1 can carry the robot rack 2 and devices mounted on the robot rack 2 to move, or the movable base 1 can carry a goods box placed on the robot rack 2 to move in the warehousing area.

The support beam 3 is mounted on the robot rack 2. The support beam 3 is a beam, a horizontal plate, or the like slidably mounted on the robot rack 2, and the support beam 3 can move up and down on the robot rack 2. The goods box take-out mechanism 4 is mounted on the support beam 3. Therefore, the goods box take-out mechanism 4 can move up and down on the robot rack 2 along with the support beam 3.

The goods box take-out mechanism 4 includes a mounting frame 40, a rotary assembly 41, a transmission assembly 42, and a take-out assembly 43, where the take-out assembly 43 is mounted above the transmission assembly 42; the transmission assembly 42 is mounted on the rotary assembly 41; the rotary assembly 41 is mounted on the mounting frame 40; the mounting frame 40 is fixedly mounted on the support beam 3; and the rotary assembly 41 may drive the transmission assembly 42 and the take-out assembly 43 to rotate in a plane perpendicular to a lifting direction of the support beam 3. The transmission assembly 42 is configured to drive the take-out assembly 43 to move toward or away from a front surface of a to-be-transferred goods box 9; and the take-out assembly 43 is connected to the front surface of the to-be-transferred goods box 9 to transfer the to-be-transferred goods box 9. "Transfer" refers to moving the to-be-transferred goods box 9 from the warehousing shelving unit 8 to the robot rack 2, or moving the to-be-transferred goods box 9 on the robot rack 2 to the warehousing shelving unit 8.

It should be noted that, the to-be-transferred goods box 9 may be a goods box with a packaging box or a packing box, or a goods box without a packaging box or a packing box. The front surface of the to-be-transferred goods box 9 refers to a surface facing the outside of the warehousing shelving unit 8 when the to-be-transferred goods box 9 is placed on the warehousing shelving unit 8, or, in other words, a surface exposed to the warehousing shelving unit 8. The front surface described in the whole text is only for the convenience of description, and is not limited to the front surface of the goods box. The take-out assembly 43 is connected to the front surface of the to-be-transferred goods box 9. Therefore, there is no need to reserve operation space on the left and right sides and/or the upper and lower sides of the to-be-transferred goods box 9, thereby improving the utilization of the warehousing space.

In addition, since the take-out assembly 43 is located above the mounting frame 40, when the goods box take-out mechanism 4 moves along with the support beam 3 to the highest position of the robot rack 2, the height of the take-out assembly 43 is higher than that of the robot rack 2. In this way, the take-out assembly 43 can take out the to-be-transferred goods box 9 placed higher than the robot rack 2, thereby improving the versatility of the transport robot.

Figure 52:
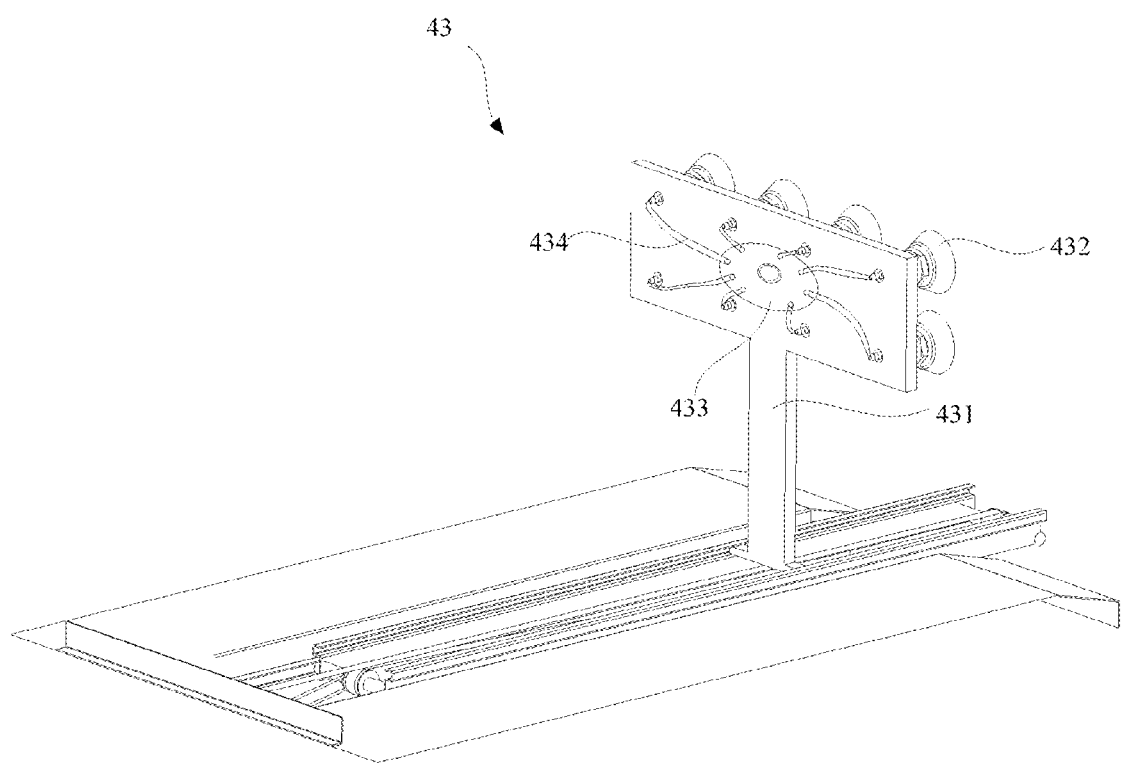
FIG. 52 is a schematic diagram of a first structure of a take-out assembly in a goods box take-out mechanism according to Embodiment IV of this application.

FIG. 52 is a schematic diagram of a first structure of a take-out assembly 43 in a goods box take-out mechanism according to an embodiment of this application. In an optional implementation, as shown in FIG. 52, the take-out assembly 43 includes a fixed bracket 431 disposed on the transmission assembly 42 and a plurality of suction cups 432 mounted on a front surface of the fixed bracket 431.

It should be noted that, the front surface of the fixed bracket 431 refers to a surface of the fixed bracket 431 facing the to-be-transferred goods box 9 when the take-out assembly 43 is connected to the front surface of the to-be-transferred goods box 9.

Specifically, a plurality of suction cups 432 may be disposed on the front surface of the fixed bracket 431. The plurality of suction cups 432 are connected to the front surface of the to-be-transferred goods box 9, so that negative pressure is generated between the suction cups 432 and the front surface of the to-be-transferred goods box 9. The suction cups 432 form an adsorption force through the negative pressure with the front surface of the to-be-transferred goods box 9, and use the adsorption force to adsorb the to-be-transferred goods box 9 to achieve the purpose of moving the to-be-transferred goods box 9. The plurality of suction cups 432 may be arranged in a matrix on the front surface of the fixed bracket 431. In this way, the adsorption force formed by the plurality of suction cups 432 on the front surface of the to-be-transferred goods box 9 is relatively even, which improves the operating reliability of the suction cups 432, and prevents the to-be-transferred goods box 9 from dropping from the suction cups 432 due to uneven adsorption force.

To make the suction cups 432 have a larger adsorption force, a vacuum device 433 may be mounted on the back surface of the fixed bracket 431, so that the vacuum device 433 is respectively in communication with each suction cup 432 through an air pipe 434. A vacuum operation is performed between the suction cups 432 and the front surface of the to-be-transferred goods box 9 by using the vacuum device 433. The vacuum device 433 sucks the air in the suction cups 432, so that the pressure in the suction cups 432 is lower than the atmospheric pressure to generate negative pressure. Under the action of the negative pressure, the to-be-transferred goods box 9 can be firmly adsorbed on the front surface of the to-be-transferred goods box 9, to realize the fixation of the to-be-transferred goods box 9, and achieve the purpose of transferring the to-be-transferred goods box 9, thereby improving the operating reliability of the suction cups 432.

Further, the transport robot further includes a fault diagnosis system. The fault diagnosis system includes a gas pressure sensor and a processor. The gas pressure sensor is signally connected to the processor. The gas pressure sensor is disposed in the air pipe 434. According to actual pressure of gas in the air pipe 434 detected by the gas pressure sensor, the processor may determine whether the suction cups 432 are leaking according to a detection result, and determines that the suction cups 432 are leaking when the detection result is that the actual pressure is equal to the atmospheric pressure. The fault diagnosis system is not limited to this configuration, and may be any related, same, or similar structure that can sense whether the suction cups are leaking.

Figure 53:
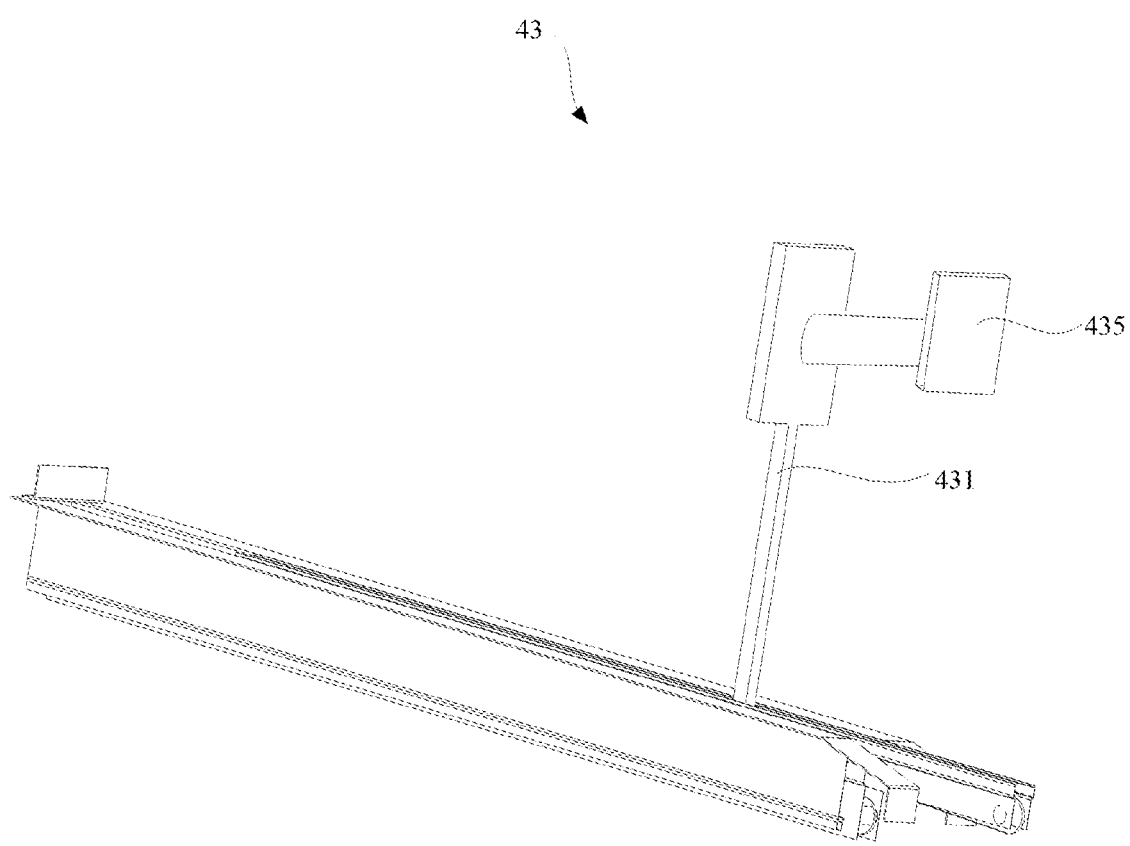
FIG. 53 is a schematic diagram of a second structure of a take-out assembly in a goods box take-out mechanism according to Embodiment IV of this application.

FIG. 53 is a schematic diagram of a second structure of a take-out assembly in a goods box take-out mechanism according to an embodiment of this application. In another optional embodiment, as shown in FIG. 53, the take-out assembly 43 includes a fixed bracket 431 disposed on the transmission assembly 42 and a magnet 435 mounted on the fixed bracket 431. The to-be-transferred goods box 9 is a metal goods box or a magnetic goods box, and the to-be-transferred goods box 9 is adsorbed by the magnetic adsorption force of the magnet 435. Alternatively, a partial structure of the to-be-transferred goods box 9 is made of a metal material or magnetic material; or an outer packaging box or a packing box of the to-be-transferred goods box 9 is made of a metal material or magnetic material; or a partial structure such as a frame of the outer packaging box or the packing box of the to-be-transferred goods box 9 is made of a metal material or magnetic material, as long as the to-be-transferred goods box 9 can be adsorbed on the magnet 435 by the magnetic adsorption force with the magnet 435. The magnet 435 may be an electromagnet 435, which has magnetism when energized, and adsorbs the to-be-transferred goods box 9 by magnetism. When the power is off, the magnetism disappears, and the magnet 435 is detached from the to-be-transferred goods box 9.

Figure 54:
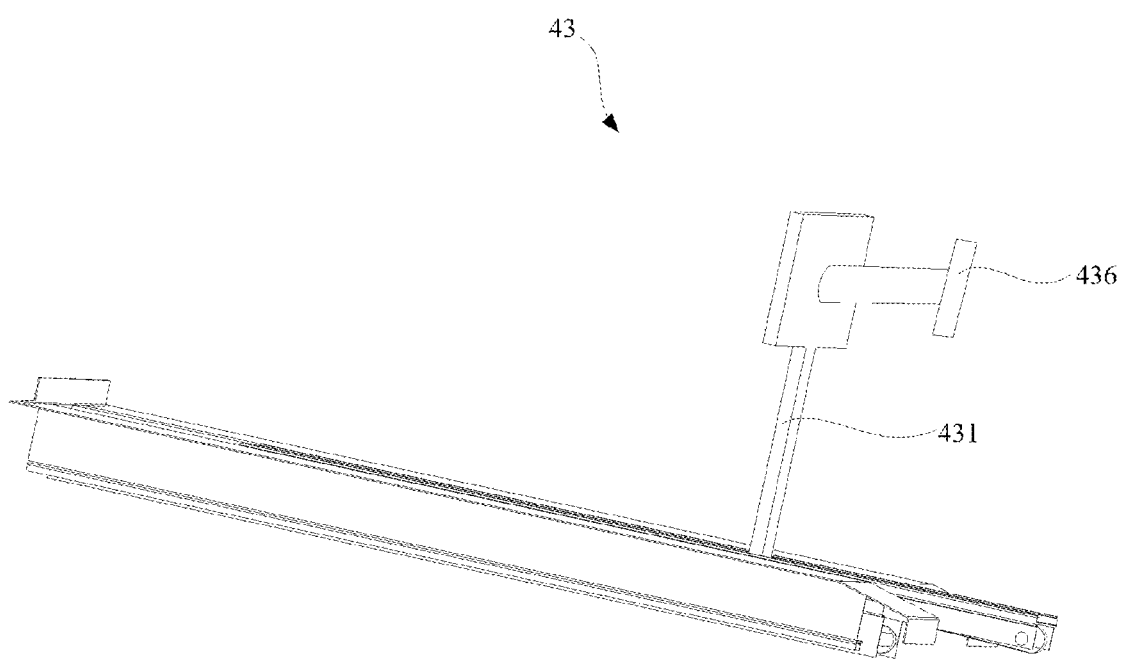
FIG. 54 is a schematic diagram of a third structure of a take-out assembly in a goods box take-out mechanism according to Embodiment IV of this application.

FIG. 54 is a schematic diagram of a third structure of a take-out assembly in a goods box take-out mechanism according to an embodiment of this application. In still another optional embodiment, as shown in FIG. 54, the take-out assembly 43 includes a fixed bracket 431 disposed on the transmission assembly 42 and a buckle 436 mounted on the fixed bracket 431. The front surface of the to-be-transferred goods box 9 has a slot matched with the buckle 436, and the take-out assembly 43 fixes the to-be-transferred goods box 9 and moves the to-be-transferred goods box 9 through the buckle 436 engaged with the slot on the to-be-transferred goods box 9. In this embodiment, the to-be-transferred goods box 9 refers to a goods box having an outer packaging box or an outer packing box, and a front surface of the outer packaging box or the outer packing box has a slot matched with the buckle 436.

Figure 55:
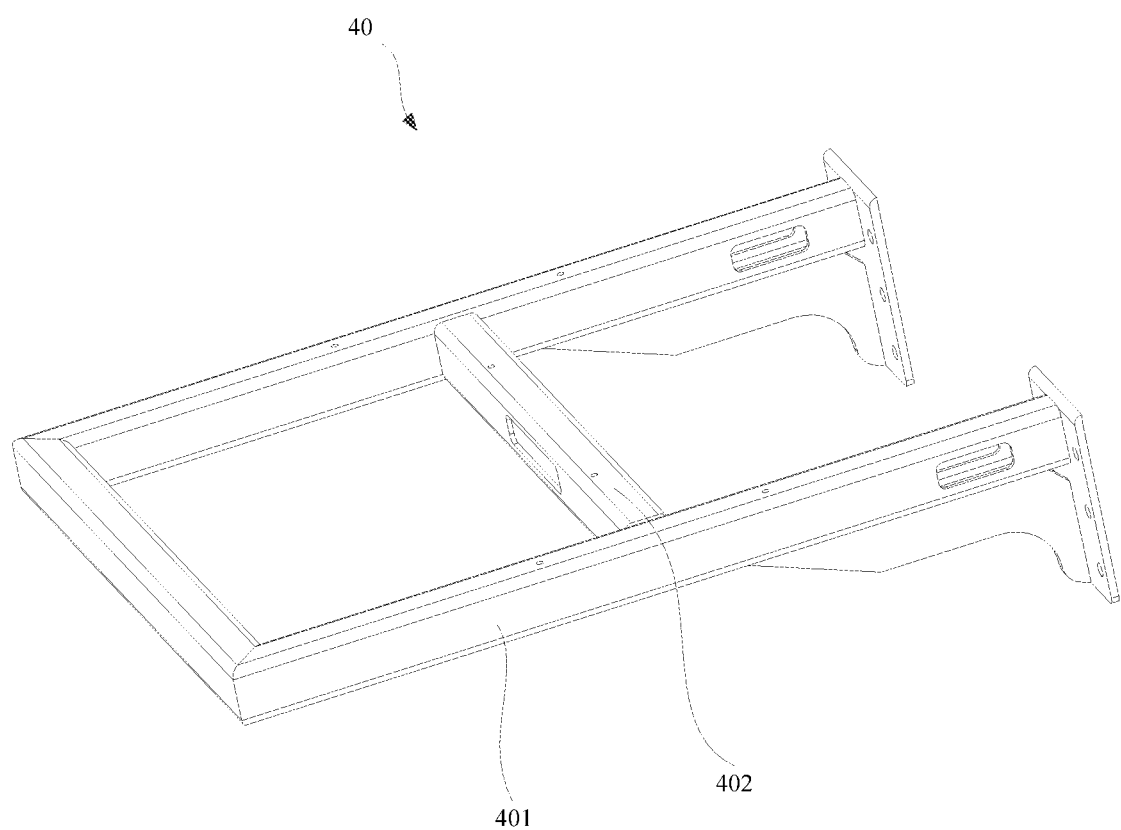
FIG. 55 is a schematic structural diagram of a mounting frame in a goods box take-out mechanism according to Embodiment IV of this application.

FIG. 55 is a schematic structural diagram of a mounting frame in a goods box take-out mechanism according to an embodiment of this application. As shown in FIG. 55, based on the foregoing embodiment, the mounting frame 40 includes two mounting plates 401 disposed oppositely, and the mounting frame 40 is mounted on the support beam 3 through the two mounting plates 401. In this way, the goods box take-out mechanism 4 can move up and down on the robot rack 2 along with the support beam 3, so that the goods box take-out mechanism 4 can take out the to-be-transferred goods box 9 placed on the warehousing shelving unit 8 at different heights.

The mounting frame 40 further includes a bearing beam 402 connecting the two mounting plates 401, and the rotary assembly 41 is mounted on the bearing beam 402.

Figure 56:
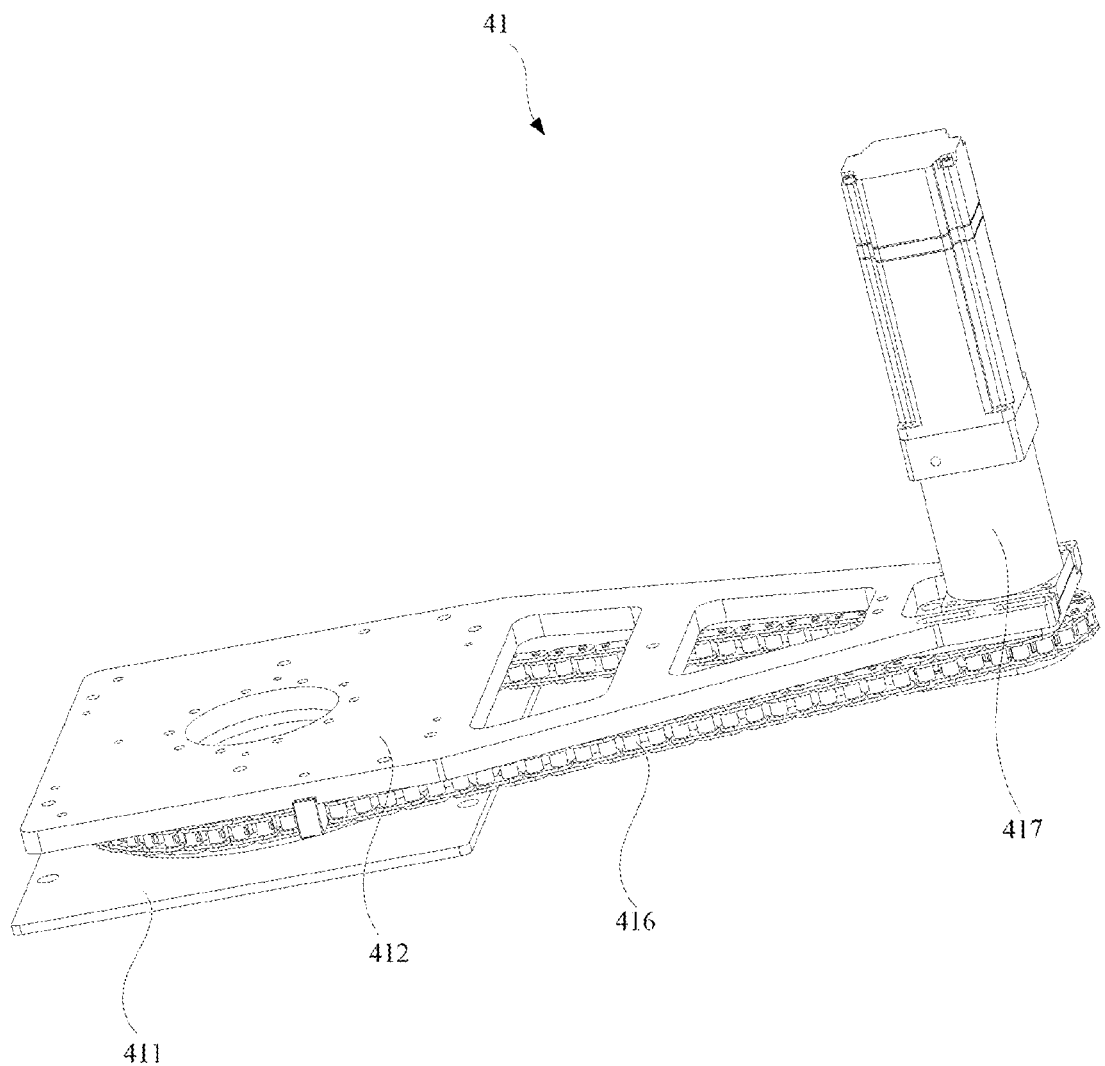
FIG. 56 is a schematic structural diagram of a rotary assembly in a goods box take-out mechanism according to Embodiment IV of this application.
Figure 57:
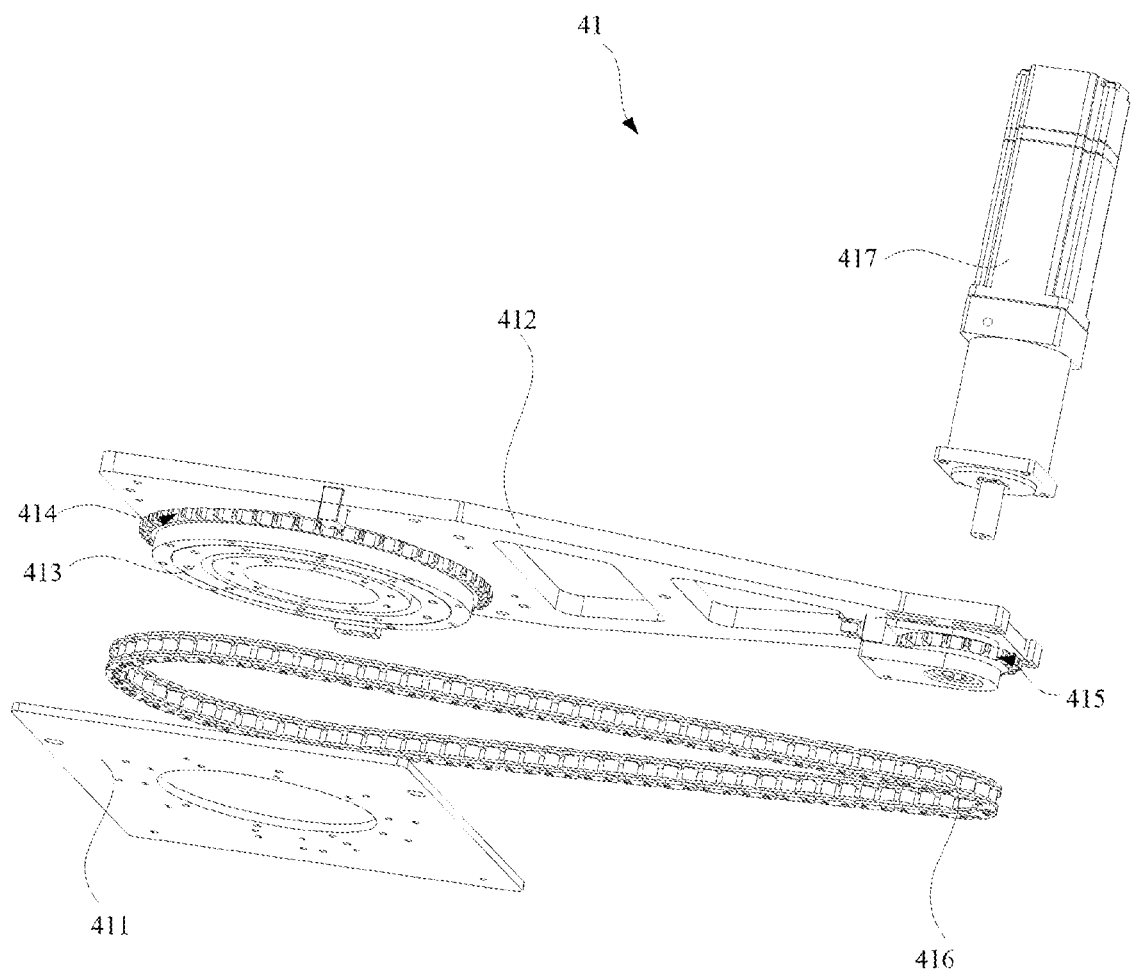
FIG. 57 is a schematic structural exploded view of FIG. 56.

FIG. 56 is a schematic structural diagram of a rotary assembly in a goods box take-out mechanism according to an embodiment of this application. FIG. 57 is a schematic structural exploded view of FIG. 56. As shown in FIG. 56 and FIG. 57, the rotary assembly 41 includes a bearing plate 411 mounted on the bearing beam 402, a rotatory plate 412 spaced apart from the bearing plate 411, and a cross bearing 413 for connecting the bearing plate 411 and the rotatory plate 412; the cross bearing 413 is connected to a first sprocket 414; a second sprocket 415, a motor 417 that drives the second sprocket 415 to rotate, and the transmission assembly 42 are disposed on the rotatory plate 412; the first sprocket 414 and the second sprocket 415 are connected by a chain 416; when the motor 417 drives the second sprocket 415 to rotate, the second sprocket 415 drives the first sprocket 414 to rotate through the chain 416; and when the first sprocket 414 rotates, the transmission assembly 42 on the rotatory plate 412 is driven to rotate about an axis of the first sprocket 414.

For example, the bearing plate 411 has a through hole matching the cross bearing 413. One end of the cross bearing 413 is located in the through hole of the bearing plate 411 to position the rotary assembly 41, and the other end of the cross bearing 413 is provided with the first sprocket 414. The output shaft of the motor 417 is connected to the second sprocket 415. After the motor 417 starts, the motor 417 drives the second sprocket 415 to rotate, the second sprocket 415 drives the chain 416 to rotate, and the chain 416 drives the first sprocket 414 to rotate, so that the entire rotary assembly 41 rotates around the axis of the second sprocket 415, and the rotary assembly 41 drives the transmission assembly 42 and the take-out assembly 43 to rotate in a plane perpendicular to a lifting direction of the support beam 3.

Figure 58:
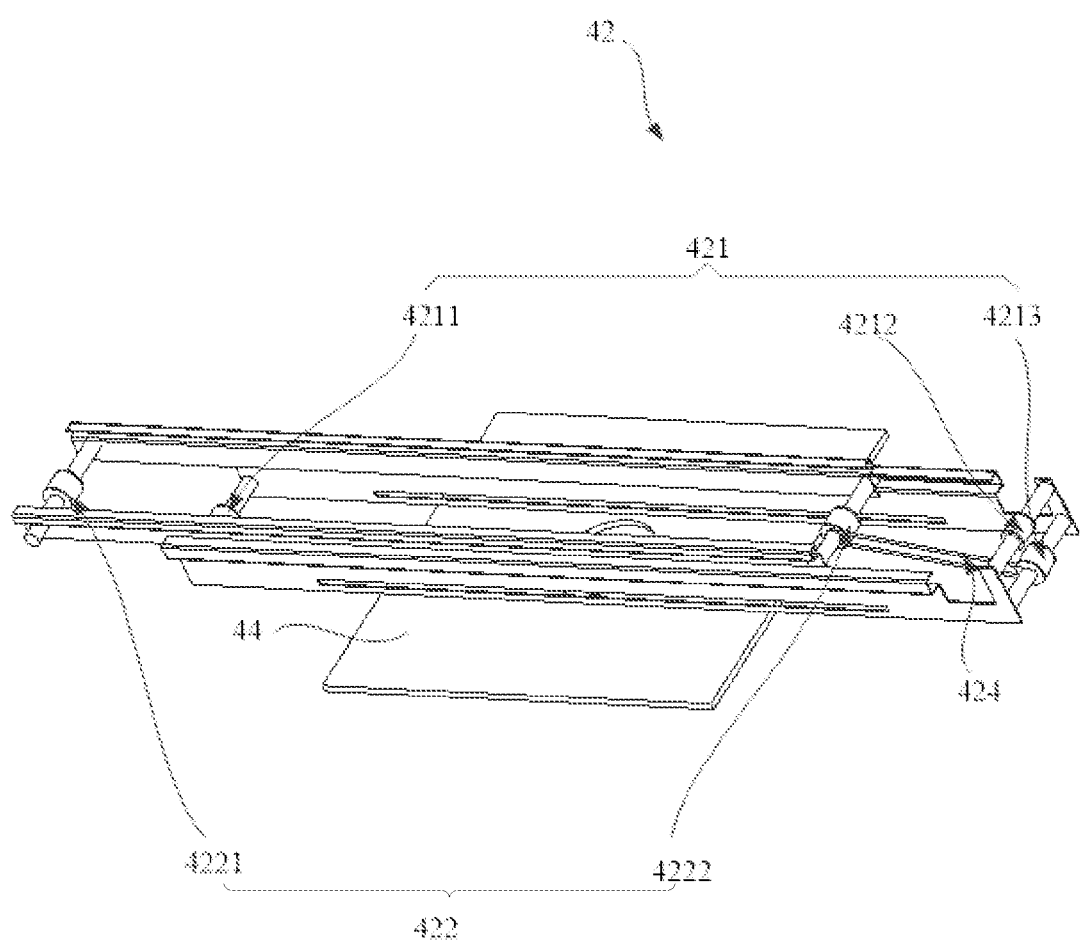
FIG. 58 is a schematic structural diagram of a transmission assembly in a goods box take-out mechanism according to Embodiment IV of this application.
Figure 59:
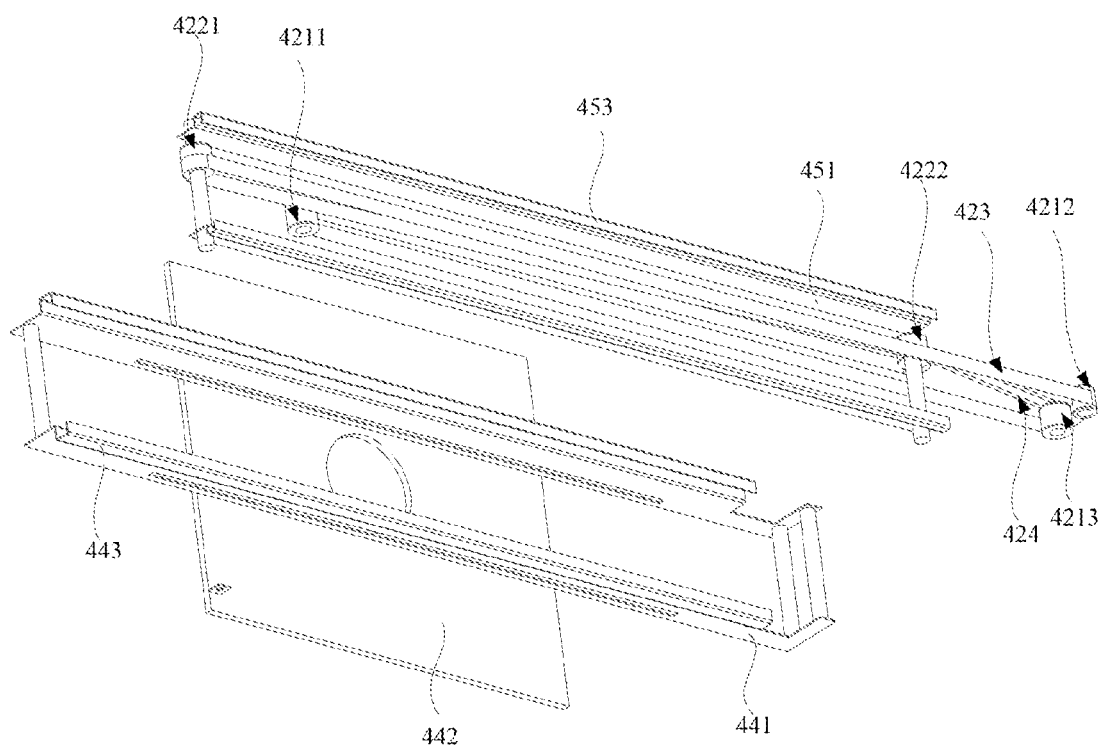
FIG. 59 is a schematic structural exploded view of FIG. 58.

FIG. 58 is a schematic structural diagram of a transmission assembly in a goods box take-out mechanism according to an embodiment of this application. FIG. 59 is a schematic structural exploded view of FIG. 58. As shown in FIG. 58 and FIG. 59, based on the foregoing embodiment, to implement that the transmission assembly 42 drives the take-out assembly 43 to move toward or away from the front surface of the to-be-transferred goods box 9: The transmission assembly 42 includes a pedestal 44 mounted on the rotary assembly 41, a fixed wheel assembly 421, a movable wheel assembly 422, and a transmission belt 423.

It should be noted that, the first direction is perpendicular to the second direction, and the second direction is a moving direction in which the take-out assembly 43 moves toward or away from the to-be-transferred goods box 9. The front end of the pedestal 44 refers to the end that is consistent with the first direction and is close to the to-be-transferred goods box 9, and the end far from the to-be-transferred goods box 9 is the rear end of the pedestal 44. The front end of the sliding seat 45 is consistent with the front end of the pedestal 44, and the rear end of the sliding seat 45 is consistent with the rear end of the pedestal 44.

The fixed wheel assembly 421 includes a first fixed wheel 4211, a second fixed wheel 4212, and a third fixed wheel 4213. The first fixed wheel 4211 is mounted at the front end of the pedestal 44, and the second fixed wheel 4212 and the third fixed wheel 4213 are mounted at the rear end of the pedestal 44 at an interval along the first direction. That is, the first fixed wheel 4211, the second fixed wheel 4212, and the third fixed wheel 4213 form a shape of a triangle, so that mounting space for the movable wheel assembly 422 is formed among the second fixed wheel 4212, the third fixed wheel 4213, and the first fixed wheel 4211.

The front end of the pedestal 44 may be provided with a wheel shaft, the first fixed wheel 4211 is mounted on the wheel shaft, and the first fixed wheel 4211 can rotate on the wheel shaft. Two wheel shafts are mounted at the rear end of the pedestal 44 at an interval along the first direction. The second fixed wheel 4212 and the third fixed wheel 4213 are respectively mounted on the upper and lower wheel shafts, and the second fixed wheel 4212 and the third fixed wheel 4213 can rotate relative to the respective wheel shafts.

The movable wheel assembly 422 includes a sliding seat 45 mounted on the pedestal 44, a first movable wheel 4221, and a second movable wheel 4222, the first movable wheel 4221 is mounted at a front end of the sliding seat 45, and the second movable wheel 4222 is mounted at a rear end of the sliding seat 45. The front end of the sliding seat 45 refers to the end facing the to-be-transferred goods box 9, and the rear end of the sliding seat 45 refers to the end opposite to the front end of the sliding seat 45.

The front end of the sliding seat 45 is provided with a limiting structure 456, the rear end of the sliding seat 45 is connected to a reset mechanism 424, and the transmission belt 423 is sequentially wound around the second fixed wheel 4212, the first movable wheel 4221, the second movable wheel 4222, the first fixed wheel 4211, and the third fixed wheel 4213. When the take-out assembly 43 is driven by the transmission belt 423 to move to the limiting structure 456 in the second direction, the take-out assembly 43 abuts against the limiting structure 456. The transmission belt 423 drives the take-out assembly 43 to continue to move forward. The take-out assembly 43 pushes the limiting structure 456 on the sliding seat 45, so that the limiting structure 456 drives the movable wheel assembly 422 to move together with the take-out assembly 43 in the second direction. In this way, the path along which the take-out assembly 43 can move in the second direction is longer, avoiding the problem that the to-be-transferred goods box 9 cannot be taken out due to the short moving path. When the transmission belt 423 is driven in an opposite direction, the reset mechanism 424 is configured to reset the movable wheel assembly 422, and after the movable wheel assembly 422 is reset, the transmission belt 423 drives the take-out assembly 43 to reset.

For example, the limiting structure 456 may be a limiting plate, where two ends of the limiting plate are respectively fixed at the rear end of the pedestal 44. The reset mechanism 424 may be a spring, where one end of the spring is connected to wheel shaft of the second movable wheel 4222 at the rear end of the sliding seat 45, and the other end of the spring is connected to the wheel shaft of the second fixed wheel 4212 at the rear end of the pedestal 44.

It should be noted that, the second fixed wheel 4212 may be used as a driving wheel of the transmission assembly 42. The transmission assembly 42 further includes a motor, where an output shaft of the motor is connected to the second fixed wheel 4212, and the second fixed wheel 4212 rotates to drive the transmission belt 423 wound around the second fixed wheel 4212 to move. The transmission belt 423 drives the first movable wheel 4221, the second movable wheel 4222, the first fixed wheel 4211, and the third fixed wheel 4213 to rotate.

In a specific implementation, the take-out assembly 43 is mounted on the transmission belt 423, and the take-out assembly 43 is driven by the transmission belt 423 to move toward the front surface of the to-be-transferred goods box 9 in the second direction. When the take-out assembly 43 moves to the limiting structure 456 at the front end of the sliding seat 45, the take-out assembly 43 abuts against the limiting structure 456. The transmission belt 423 drives the take-out assembly 43 to continue to move toward the front surface of the to-be-transferred goods box 9. The take-out assembly 43 pushes the limiting structure 456 to drive the movable wheel assembly 422 to move forward together, In this case, the spring connected to the second movable wheel 4222 and the second fixed wheel 4212 starts to be stretched. When the take-out assembly 43 moves to the front surface of the to-be-transferred goods box 9 and is connected to the front surface of the to-be-transferred goods box 9, the motor starts to reverse, the transmission belt 423 rotates in the opposite direction, the take-out assembly 43 drives the to-be-transferred goods box 9 to rotate in the opposite direction along with the transmission belt 423, and a power assembly also moves in the opposite direction under the tension of the spring until the spring is in the free stretching state. The movable wheel assembly 422 resets and then stops moving, and the transmission belt 423 drives the take-out assembly 43 to continue to move in the opposite direction until the take-out assembly 43 is reset.

Figure 60:
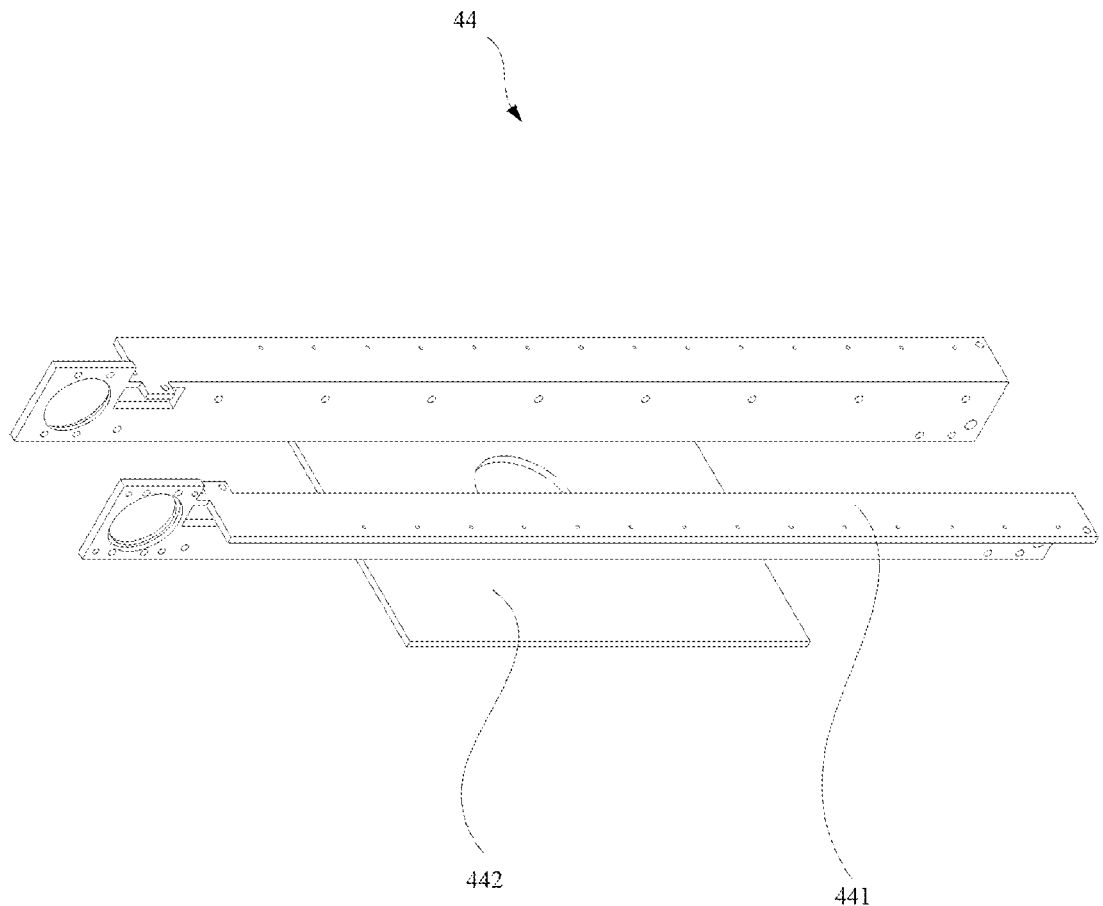
FIG. 60 is a schematic structural diagram of a pedestal in a transmission assembly according to Embodiment IV of this application.
Figure 61:
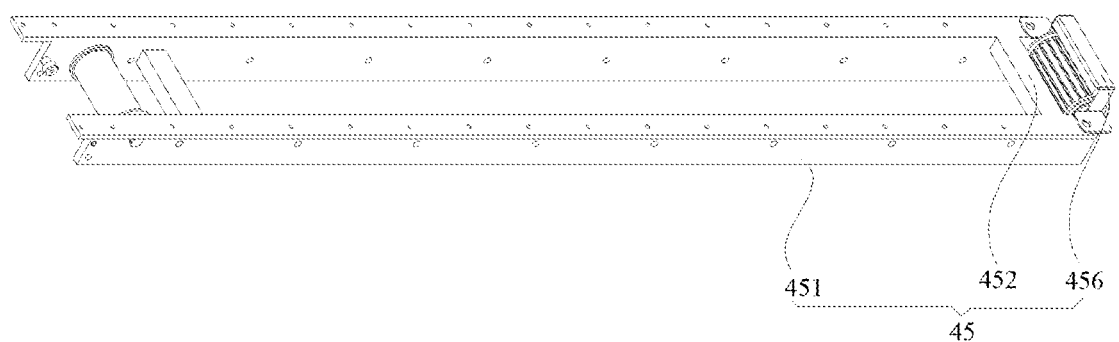
FIG. 61 is a schematic structural diagram of a sliding seat in a transmission assembly according to Embodiment IV of this application.

FIG. 60 is a schematic structural diagram of a pedestal in a transmission assembly according to an embodiment of this application. FIG. 61 is a schematic structural diagram of a sliding seat in a transmission assembly according to an embodiment of this application. As shown in FIG. 60 and FIG. 61, the pedestal 44 includes two support plates 441 disposed oppositely and a bottom connecting plate 442 disposed between the two support plates 441 and connected to the two support plates 441 respectively, where the first fixed wheel 4211 is mounted at a front end of the bottom connecting plate 442, and the second fixed wheel 4212 and the third fixed wheel 4213 are mounted at a rear end of the bottom connecting plate 442 at an interval along the direction perpendicular to the first direction.

The sliding seat 45 includes two sliding plates 451 disposed oppositely and a fixed connecting plate 452 connecting the two sliding plates 451. The first movable wheel 4221 is mounted at a front end of the fixed connecting plate 452, and the second movable wheel 4222 is mounted at a rear end of the fixed connecting plate 452.

Sliding rails 453 are disposed on the sides of the two sliding plates 451 facing the two support plates 441, and guide blocks 443 matching the sliding rails 453 are disposed on the two support plates 441, where sliding grooves are provided on the guide blocks 443, so that the sliding seat 45 can move in the sliding grooves through the sliding rails 453 on the two sliding plates 451.

When the sliding seat 45 moves in the second direction, the movable wheel assembly 422 can move along with the sliding seat 45 on the pedestal 44 in the second direction, so that the take-out assembly 43 moves along with the movable wheel assembly 422 to obtain a longer moving path of the take-out assembly 43.

Figure 62:
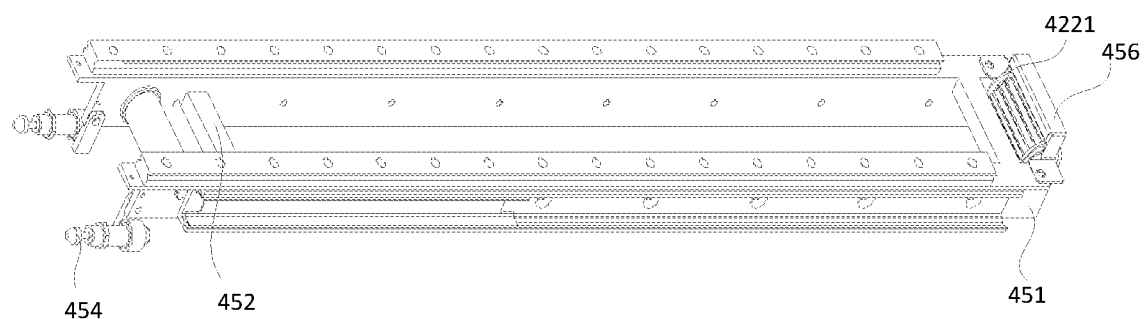
FIG. 62 is a schematic structural diagram of another sliding seat in a transmission assembly according to Embodiment IV of this application.
Figure 63:
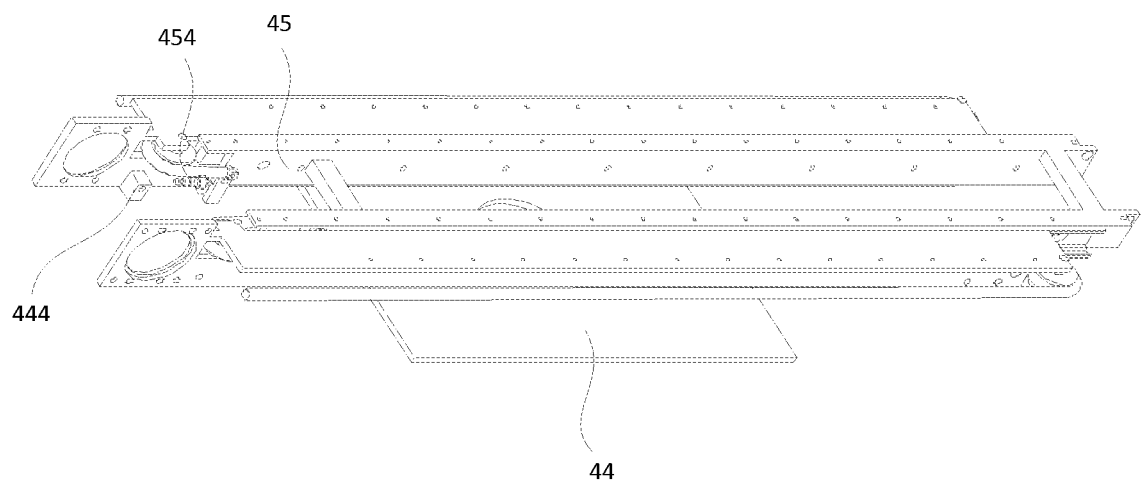
FIG. 63 is a schematic diagram of an assembly structure of a sliding seat mounted on a pedestal according to Embodiment IV of this application.

FIG. 62 is a schematic structural diagram of another sliding seat in a transmission assembly according to an embodiment of this application. FIG. 63 is a schematic diagram of an assembly structure of a sliding seat mounted on a pedestal according to an embodiment of this application. As shown in FIG. 62 and FIG. 63, to reduce the impact force between the sliding seat 45 and the pedestal 44 during reset, in this embodiment, Buffers 454 may be disposed at the rear ends of the two sliding plates 451 of the sliding seat 45, and collision blocks 444 facing the buffers 454 may be disposed at the rear ends of the two support plates 441 of the pedestal 44. When the sliding seat 45 retreats to the rear end of the pedestal 44, the collision blocks 454 on the sliding plates 451 first collide with the collision blocks 444 on the support plates 441. Since the buffers 454 have a buffering capability, the buffers 454 can reduce the impact force between the sliding seat 45 and the pedestal 44, thereby reducing the shock to the goods box take-out mechanism 4. In addition, the collision blocks 444 are disposed on the pedestal 44, which can further limit the sliding seat 45 to prevent the sliding seat 45 from moving to the rear end of the pedestal 44 and continuing to move backward with the transmission belt 423, causing the sliding seat 45 to slip off from the pedestal 44.

Figure 64:
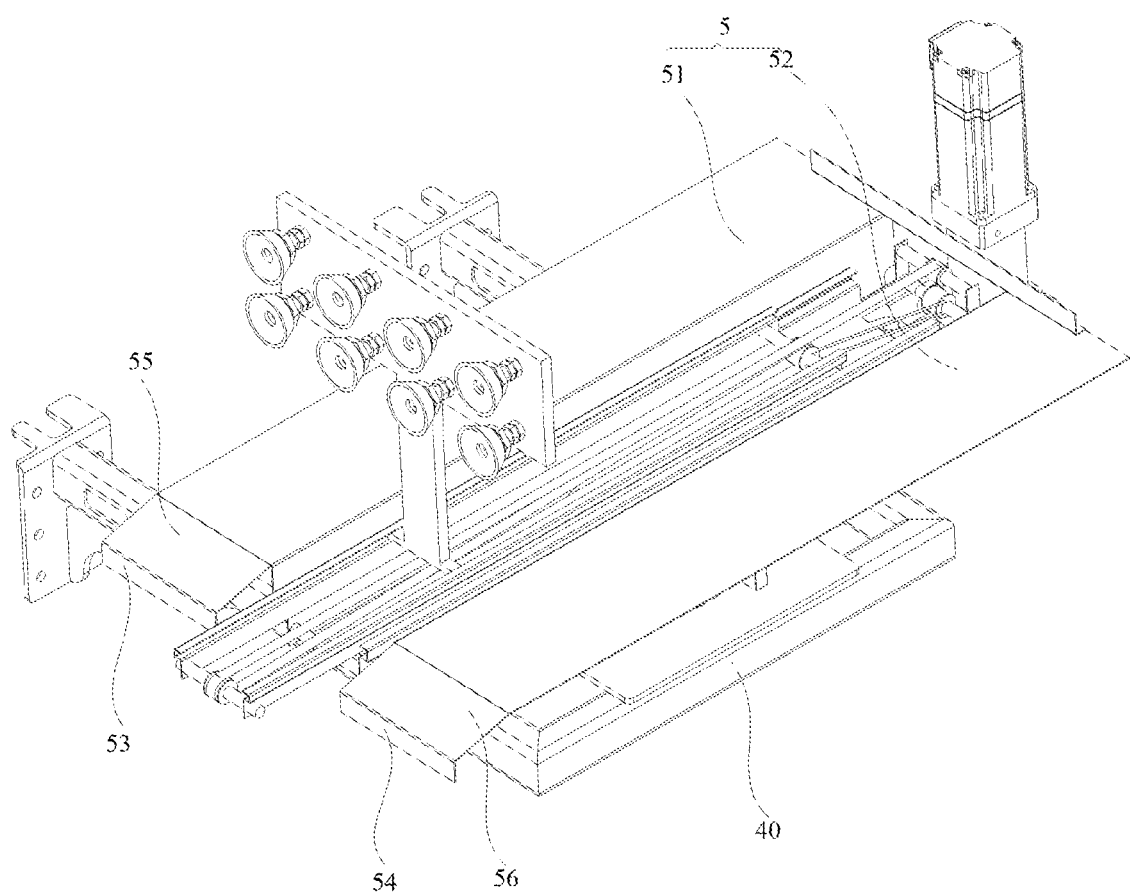
FIG. 64 is a schematic diagram of a second structure of a goods box take-out mechanism according to Embodiment IV of this application.

FIG. 64 is a schematic diagram of a second structure of a goods box take-out mechanism according to an embodiment of this application. As shown in FIG. 64, the goods box take-out mechanism 4 further includes a tray 5 mounted on the pedestal 44 and located below the take-out assembly 43, and the tray 5 is configured to carry the to-be-transferred goods box 9 taken out by the take-out assembly 43.

The tray 5 includes a first supporting plate 51 and a second supporting plate 52. The first supporting plate 51 and the second supporting plate 52 are respectively mounted on the two support plates 441. A passage for movement of the fixed bracket 431 is formed between the first supporting plate 51 and the second supporting plate 52. One end of the fixed bracket 431 away from the transmission belt 423 is located above the tray 5.

Specifically, the passage is formed between the first supporting plate 51 and the second supporting plate 52. The transmission belt 423 moves in the passage. The fixed bracket 431 is mounted on the transmission belt 423. One end of the fixed bracket 431 away from the transmission belt 423 is located above the first supporting plate 51 and the second supporting plate 52. The suction cups 432, the magnet 435, or the buckle 436 are mounted on the front surface of the end of the fixed bracket 431 away from the transmission belt 423. When the fixed bracket 431 moves with the transmission belt 423 to the front surface of the to-be-transferred goods box 9 and is in contact with the front surface of the to-be-transferred goods box 9, the suction cups 432, the magnet 435, or the buckle 436 on the fixed bracket 431 are connected to the front surface of the to-be-transferred goods box 9, to fix the to-be-transferred goods box 9 to the fixed bracket 431. When the transmission belt 423 moves in the opposite direction, the suction cups 432, the magnet 435, or the buckle 436 on the fixed bracket 431 drag the to-be-transferred goods box 9 to the first supporting plate 51 and the second supporting plate 52, so that the to-be-transferred goods box 9 is placed on the first supporting plate 51 and the second supporting plate 52, to prevent the goods box from falling off the take-out assembly 43 during movement.

Further, the tray 5 can move along the second direction on the pedestal 44, where the second direction is the second direction described in the foregoing embodiments. When the take-out assembly 43 is connected to the front surface of the to-be-transferred goods box 9, the tray 5 can abut against the warehousing shelving unit 8, and the take-out assembly 43 removes the to-be-transferred goods box 9 to the tray 5, which can prevent the to-be-transferred goods box 9 from falling from the warehousing shelving unit 8 when the take-out assembly 43 takes out the to-be-transferred goods box 9. To implement the movement of the tray 5 on the pedestal 44, in this embodiment, the rear end of the tray 5 is provided with a reset plate extending upward, and the rear end of the tray 5 is connected to the front end of the pedestal 44 through a spring. When the fixed bracket 431 is located at the rear end of the pedestal 44 and abuts against the reset plate, the spring is in a stretched state. When the fixed bracket 431 moves forward, the tray 5 also moves forward under the tension of the spring, until the front end of the tray 5 abuts against the warehousing shelving unit 8. After the take-out assembly 43 moves the to-be-transferred goods box 9 on the warehousing shelving unit 8 to the tray 5, the take-out assembly 43 moves backward. After the fixed bracket 431 moves to the rear end of the tray 5 and abuts against reset plate, the fixed bracket 431 continues to push the reset plate to move in the direction away from the warehousing shelving unit 9 along the second direction, so that the reset plate drives the tray 5 to move backward to reset.

To improve the moving reliability of the tray 5 on the pedestal 44, a guide rail may be disposed on the side of the tray 5 facing the pedestal 44, and a structure such as a guide block 443 with a sliding groove matching the guide rail may be disposed on the pedestal 44. The guide rail slides in the sliding groove to guide the tray 5, improving the moving reliability of the tray 5, and avoid stagnation of the tray 5 due to direction deviation during movement.

Based on the foregoing embodiment, as shown in FIG. 64, since the tray 5 can move along the second direction on the pedestal 44, to reduce the impact force between the tray 5 and the warehousing shelving unit 8 when the tray moves to the warehousing shelving unit 8, the front end of the tray 5 may be provided with a buffer pad. That is, a first buffer pad 53 is disposed at the front end of the first supporting plate 51, and the first buffer pad 53 is located on the end surface of the first supporting plate 51 facing the to-be-transferred goods box 9. The front end of the second supporting plate 52 is provided with a second buffer pad 54, and the second buffer pad is located on the end surface of the second supporting plate 52 facing the to-be-transferred goods box 9. The buffer pad may be a rubber pad or another structure capable of shock absorption. By using the buffer pad, the impact force with the warehousing shelving unit 8 is reduced, the shock to the transport robot caused by the impact is avoided, and the stability of the transport robot is improved.

As shown in FIG. 64, further, since there may be errors in the first direction between the tray 5 and the warehousing shelving unit 8, the to-be-transferred goods box 9 may be stuck when moving to the tray 5. Therefore, to avoid the foregoing problem, a first guide surface 55 may be disposed at the front end of the first supporting plate 51 and away from the surface of the pedestal 44. The first guide surface 55 extends obliquely downward toward the ground. A second guide surface 56 is disposed at the front end of the second supporting plate 52 and away from the surface of the pedestal 44. The second guide surface 56 extends obliquely downward toward the ground, so that when the take-out assembly 43 takes out the to-be-transferred goods box 9, the to-be-transferred goods box 9 can be smoothly moved to the tray 5 through the first guide surface 55 and the second guide surface 56, to avoid that the to-be-transferred goods box 9 is stuck when moving to the tray 5.

Figure 65:
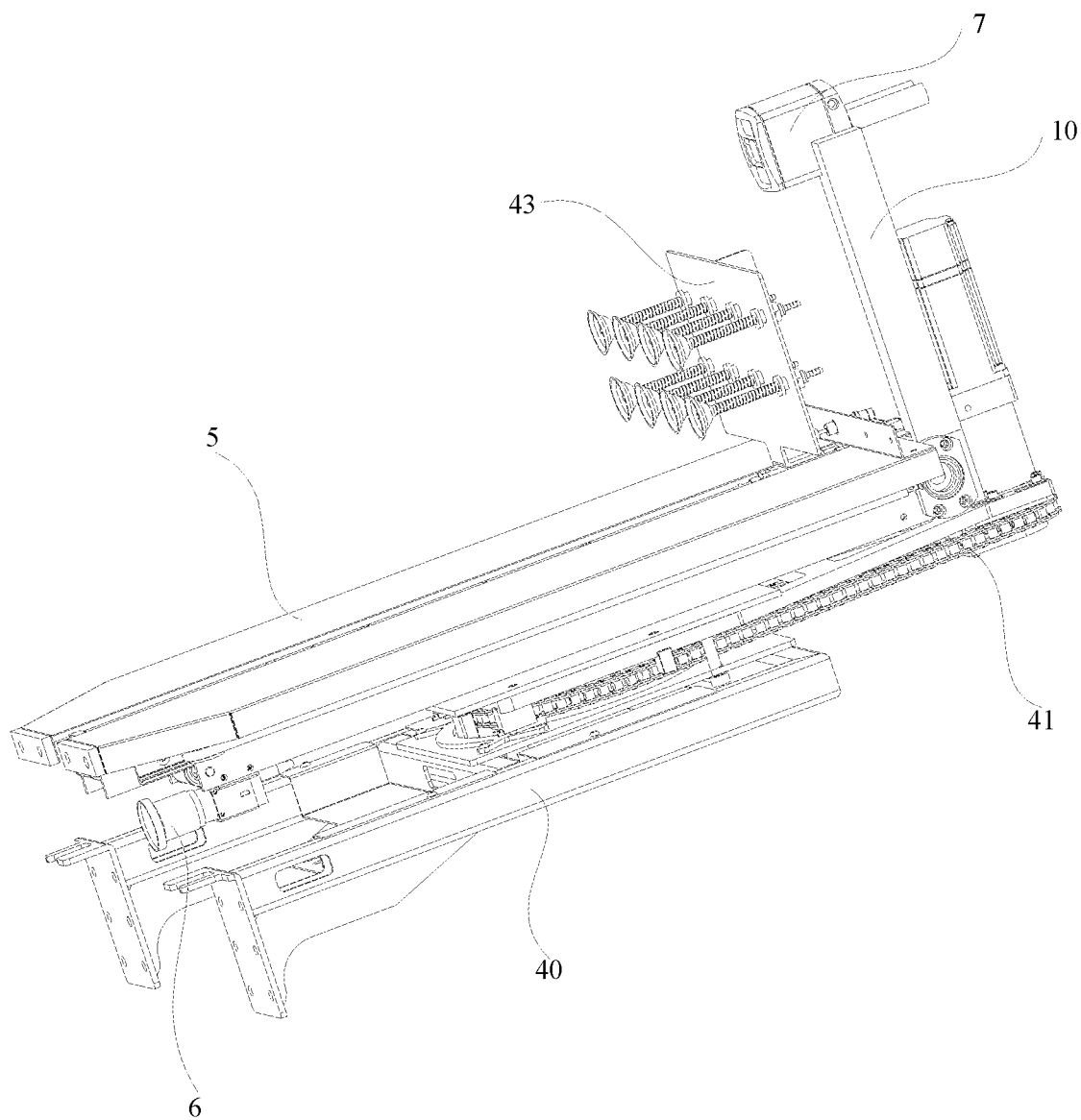
FIG. 65 is a schematic diagram of a third structure of a goods box take-out mechanism according to Embodiment IV of this application.

FIG. 65 is a schematic diagram of a third structure of a goods box take-out mechanism according to an embodiment of this application. As shown in FIG. 65, to realize full automation and multi-functionality of the transport robot, the transport robot further includes a first camera, where the first camera 6 is mounted on a side of the goods box take-out mechanism 4 facing the to-be-transferred goods box 9, and the first camera 6 is configured to obtain an identification code on the to-be-transferred goods box 9.

Specifically, to enable the first camera 6 to easily obtain the identification code on the to-be-transferred goods box 9, the first camera 6 may be disposed at the front end of the pedestal 44. In this way, when the goods box take-out mechanism 4 is close to the to-be-transferred goods box 9, the first camera 6 can directly scan the identification code on the to-be-transferred goods box 9. The identification code may be a barcode, a two-dimensional code, or the like that records relevant information of the to-be-transferred goods box 9. There is no need to manually register the information of the to-be-transferred goods box 9, thereby improving the carrying efficiency of the transport robot.

Further, to enable the transport robot to quickly carry and pick goods boxes, a second camera 7 may be further disposed on the transport robot, and the second camera 7 is mounted on the pedestal 44 through a column 10. In this way, the second camera 7 may be located at a higher position, so that three-dimensional shape information such as the size, the appearance, and the shape of the to-be-transferred goods box 9 can be acquired in an all-round way, and position information of the to-be-transferred goods box 9 on the warehousing shelving unit 8 can be acquired, implementing rapid picking and grabbing positioning, and further improving the carrying efficiency.

The transport robot provided in the embodiments of this application includes a movable base, a robot rack, a support beam, and a goods box take-out mechanism. The support beam is mounted on the robot rack. The goods box take-out mechanism is mounted on the support beam and located above the support beam. When the goods box take-out mechanism moves up and down with the support beam to the height of the to-be-transferred goods box, the goods box take-out mechanism is connected to the front of the to-be-transferred goods box to transfer the to-be-transferred goods box. The transport robot provided in the embodiments of this application can improve the utilization of the warehousing space and the versatility of the transport robot.

Embodiment V

A transport robot generally includes a movable base, a robot rack on the movable base, and a grabbing mechanism mounted on the robot rack. The movable base can move on the ground in the warehousing area. A beam is mounted on the robot rack and can move up and down on the robot rack. The grabbing mechanism is mounted on the beam. The grabbing mechanism includes gripping arms and gripping portions located at front ends of the gripping arms for grabbing a goods box. The gripping arms may be retracted forward and backward. The gripping arms drive the gripping portions to grip left and right sides or upper and lower sides of the goods box to move the goods box. Moreover, to avoid interference between the robot rack and the top surface of the warehousing area, a specific safety distance is reserved between the robot rack and the top surface of the warehousing area. However, the grabbing manner of the existing transport robot leads to low utilization of storage space in the warehousing area, and the grabbing mechanism cannot grab a to-be-transferred item placed below the upper surface of the movable base, leading to poor versatility.

Therefore, the embodiments of this application provide a transport robot, to transfer the to-be-transferred goods box by connecting the take-out assembly to the front surface of the to-be-transferred goods box. In this way, the utilization of the storage space can be improved. In addition, the take-out assembly is disposed below the mounting frame, so that the goods box take-out assembly can take out a to-be-transferred goods box placed lower than the upper surface of the movable base, thereby improving the versatility of the transport robot.

Figure 66:
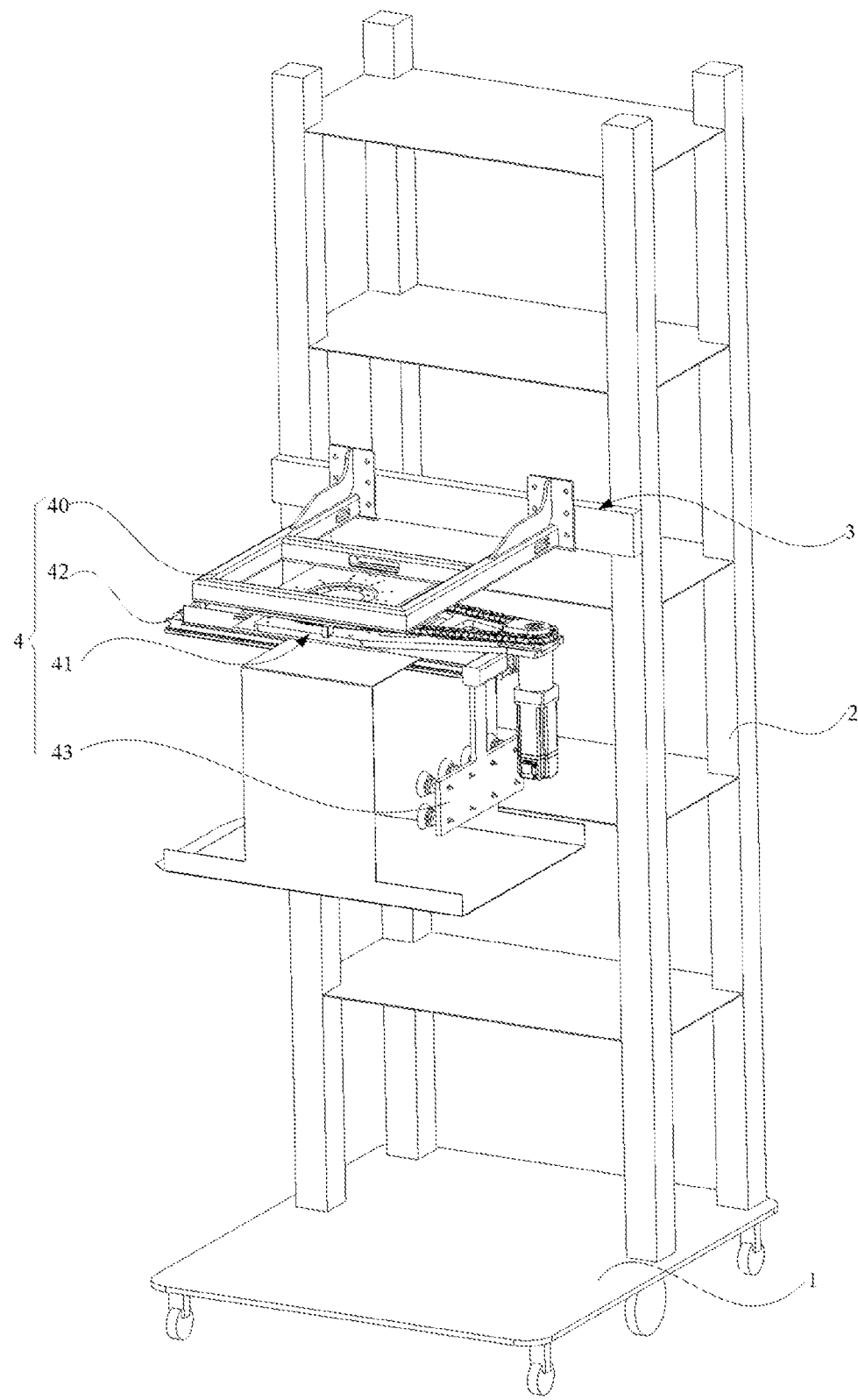
FIG. 66 is a schematic structural diagram of a transport robot according to Embodiment V of this application.
Figure 67:
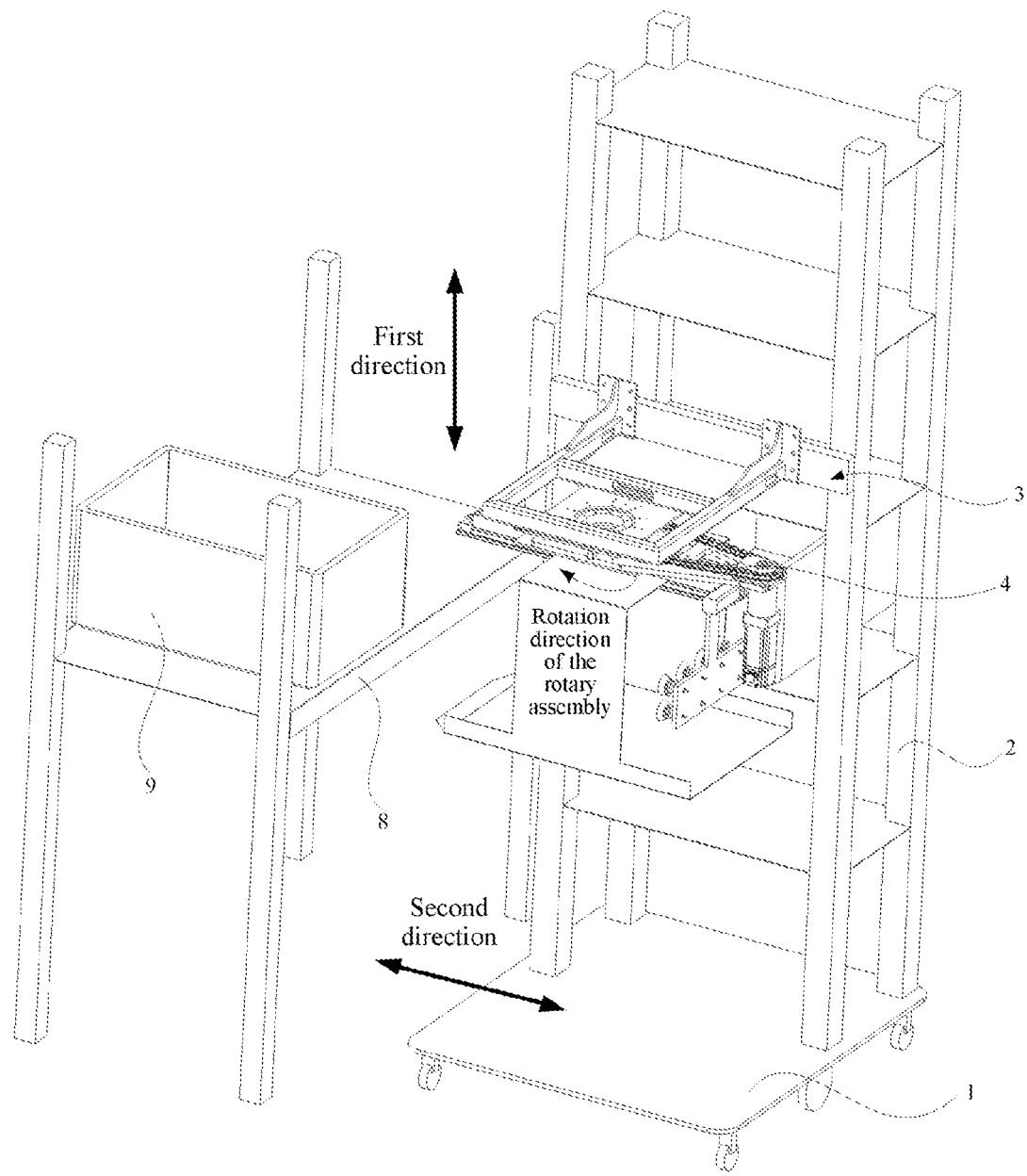
FIG. 67 is a diagram of an operating status of a transport robot according to Embodiment V of this application.
Figure 68:
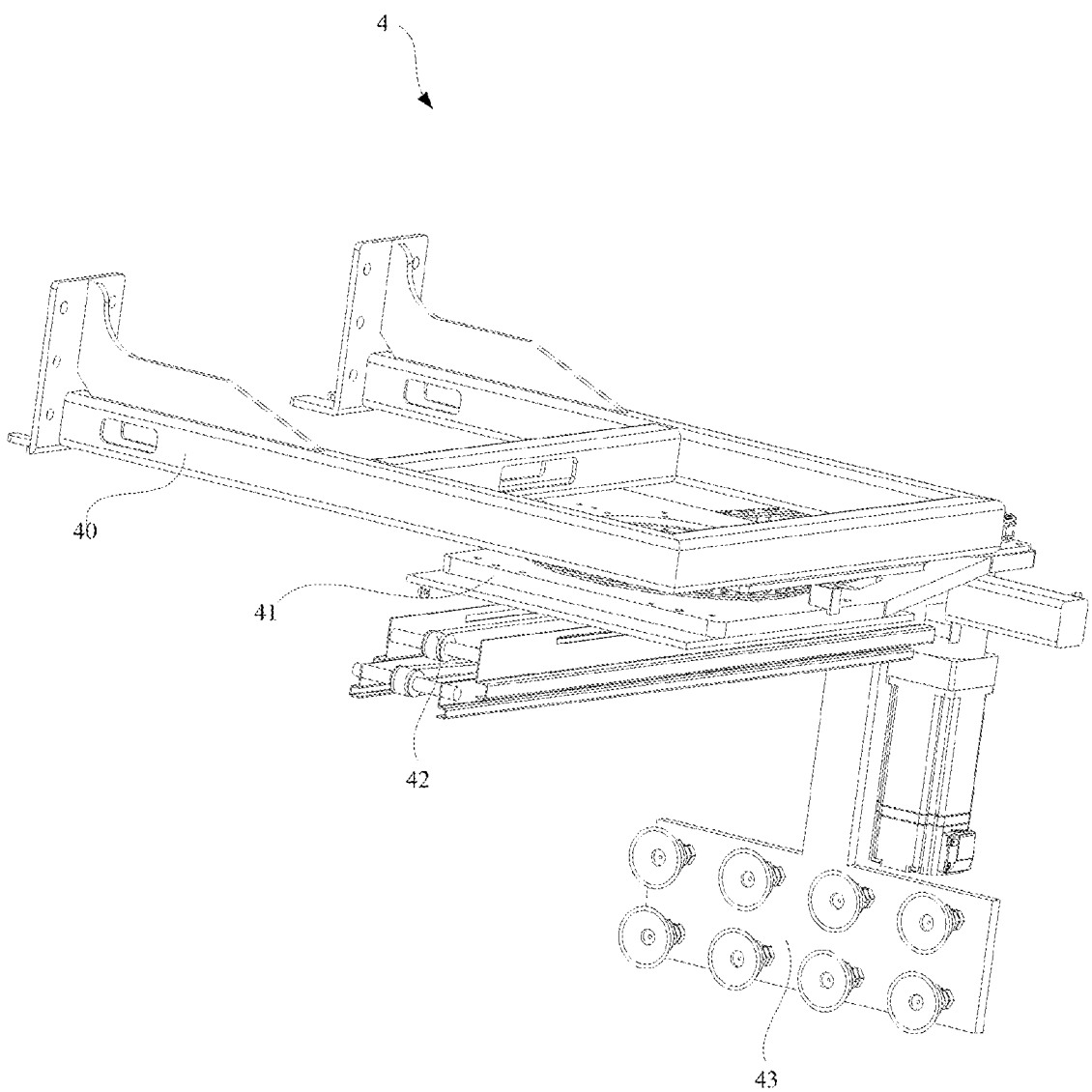
FIG. 68 is a schematic diagram of a first structure of a goods box take-out mechanism in a transport robot according to Embodiment V of this application.
Figure 69:
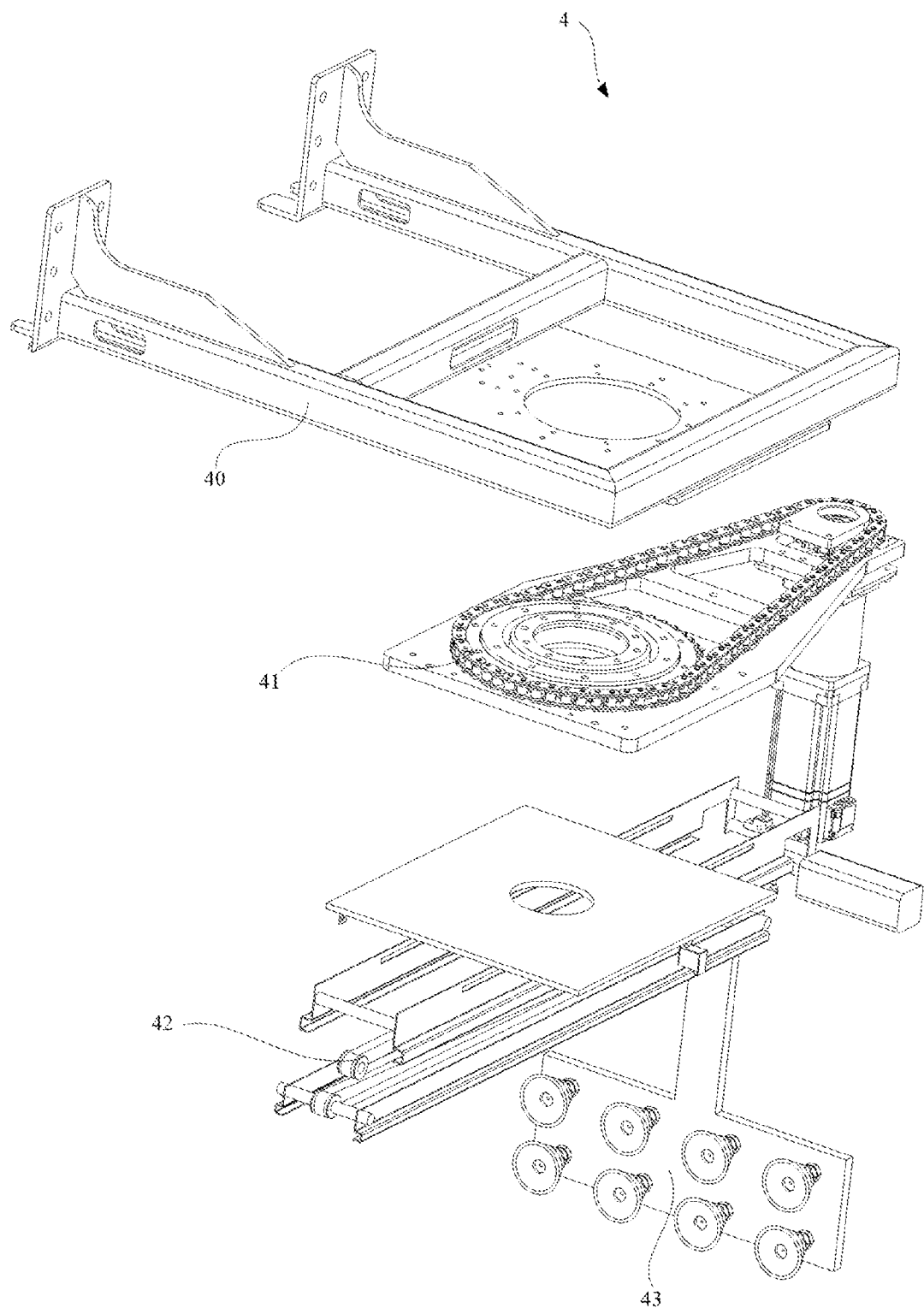
FIG. 69 is a schematic structural exploded view of FIG. 68.

FIG. 66 is a schematic structural diagram of a transport robot according to Embodiment V of this application; FIG. 67 is a diagram of an operating status of a transport robot according to Embodiment V of this application. FIG. 68 is a schematic diagram of a first structure of a goods box take-out mechanism in a transport robot according to Embodiment V of this application. FIG. 69 is a schematic structural exploded view of FIG. 68. Referring to FIG. 66 to FIG. 69, the transport robot provided in this embodiment of this application includes: a movable base 1, a robot rack 2, a support beam 3, and a goods box take-out mechanism 4, where the movable base 1 is the support structure of the transport robot, and is configured to support and carry other components and/or devices of the transport robot for walking. The robot rack 2 is mounted on the movable base 1, so that the movable base 1 can carry the robot rack 2 and devices mounted on the robot rack 2 to move, or the movable base 1 can carry a goods box placed on the robot rack 2 to move in the warehousing area.

The support beam 3 is mounted on the robot rack 2. The support beam 3 may be a beam, a horizontal plate, or the like slidably mounted on the robot rack 2, and the support beam 3 can move up and down on the robot rack 2. The goods box take-out mechanism 4 is mounted on the support beam 3. Therefore, the goods box take-out mechanism 4 can move up and down on the robot rack 2 along with the support beam 3.

The goods box take-out mechanism 4 includes a mounting frame 40, a rotary assembly 41, a transmission assembly 42, and a take-out assembly 43, where the take-out assembly 43, the transmission assembly 42, the rotary assembly 41, and the mounting frame 40 are sequentially mounted on the mounting frame 40 from bottom to top along the lifting direction of the support beam 3; the mounting frame 40 is fixedly mounted on the support beam 3; and the rotary assembly 41 may drive the transmission assembly 42 and the take-out assembly 43 to rotate in a plane perpendicular to a lifting direction of the support beam 3. The transmission assembly 42 is configured to drive the take-out assembly 43 to move toward or away from a front surface of a to-be-transferred goods box 9; and the take-out assembly 43 is connected to the front surface of the to-be-transferred goods box 9 to transfer the to-be-transferred goods box 9.

It should be noted that, the to-be-transferred goods box 9 may be a goods box with a packaging box or a packing box, or a goods box without a packaging box or a packing box. The front surface of the to-be-transferred goods box 9 refers to a surface facing the outside of the warehousing shelving unit 8 when the to-be-transferred goods box 9 is placed on the warehousing shelving unit 8, or, in other words, a surface exposed to the warehousing shelving unit 8. The front surface described in the whole text is only for the convenience of description, and is not limited to the front surface of the goods box. The take-out assembly 43 is connected to the front surface of the to-be-transferred goods box 9. Therefore, there is no need to reserve operation space on the left and right sides and/or the upper and lower sides of the to-be-transferred goods box 9, thereby improving the utilization of the warehousing space.

In addition, when the support beam 3 moves up and down on the robot rack 2, the support beam 3 can only reach the upper surface of the movable base 1 at least. Therefore, in this embodiment, the take-out assembly 43 is located below the mounting frame 40. When the support beam 3 moves to the lowest position of the robot rack 2, the take-out assembly 43 is located at a height lower than that of the upper surface of the movable base 1. In this way, the take-out assembly 43 can take out the to-be-transferred goods box 9 placed at a position lower than the upper surface of the movable base 1, thereby improving the versatility of the transport robot.

Figure 70:
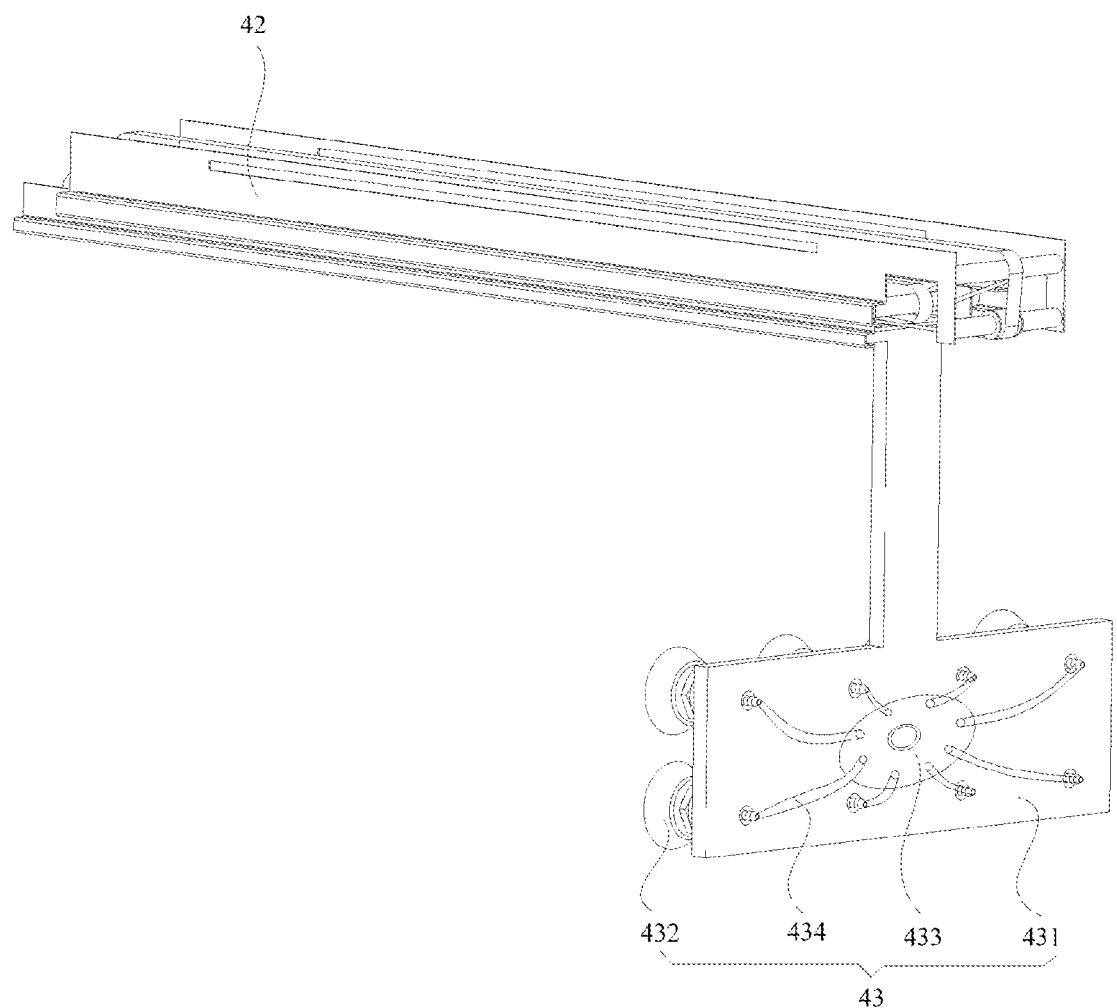
FIG. 70 is a schematic diagram of a first structure of a take-out assembly in a goods box take-out mechanism according to Embodiment V of this application.

FIG. 70 is a schematic diagram of a first structure of a take-out assembly in a goods box take-out mechanism according to Embodiment V of this application. In an optional implementation, as shown in FIG. 70, the take-out assembly 43 includes a fixed bracket 431 disposed on the transmission assembly 42 and a plurality of suction cups 432 mounted on a front surface of the fixed bracket 431.

It should be noted that, the front surface of the fixed bracket 431 refers to a surface of the fixed bracket 431 facing the to-be-transferred goods box 9 when the take-out assembly 43 is connected to the front surface of the to-be-transferred goods box 9.

Specifically, a plurality of suction cups 432 may be disposed on the front surface of the fixed bracket 431. The plurality of suction cups 432 are connected to the front surface of the to-be-transferred goods box 9, so that negative pressure is generated between the suction cups 432 and the front surface of the to-be-transferred goods box 9. The suction cups 432 form an adsorption force through the negative pressure with the front surface of the to-be-transferred goods box 9, and use the adsorption force to adsorb the to-be-transferred goods box 9 to achieve the purpose of moving the to-be-transferred goods box 9. The plurality of suction cups 432 may be arranged in a matrix on the front surface of the fixed bracket 431. In this way, the adsorption force formed by the plurality of suction cups 432 on the front surface of the to-be-transferred goods box 9 is relatively even, which improves the operating reliability of the suction cups 432, and prevents the to-be-transferred goods box 9 from dropping from the suction cups 432 due to uneven adsorption force.

Still referring to FIG. 70, to make the suction cups 432 have a larger adsorption force, a vacuum device 433 may be mounted on the back surface of the fixed bracket 431, so that the vacuum device 433 is respectively in communication with each suction cup 432 through an air pipe 434. A vacuum operation is performed between the suction cups 432 and the front surface of the to-be-transferred goods box 9 by using the vacuum device 433. The vacuum device 433 sucks the air in the suction cups 432, so that the pressure in the suction cups 432 is lower than the atmospheric pressure to generate negative pressure. Under the action of the negative pressure, the to-be-transferred goods box 9 can be firmly adsorbed on the front surface of the to-be-transferred goods box 9, to realize the fixation of the to-be-transferred goods box 9, and achieve the purpose of transferring the to-be-transferred goods box 9, thereby improving the operating reliability of the suction cups 432.

Further, the transport robot further includes a fault diagnosis system. The fault diagnosis system includes a gas pressure sensor and a processor. The gas pressure sensor is signally connected to the processor. The gas pressure sensor is disposed in the air pipe 434. According to actual pressure of gas in the air pipe 434 detected by the gas pressure sensor, the processor may determine whether the suction cups 432 are leaking according to a detection result, and determines that the suction cups 432 are leaking when the detection result is that the actual pressure is equal to the atmospheric pressure. The fault diagnosis system is not limited to this configuration, and may be any related, same, or similar structure that can sense whether the suction cups 432 are leaking.

Figure 71:
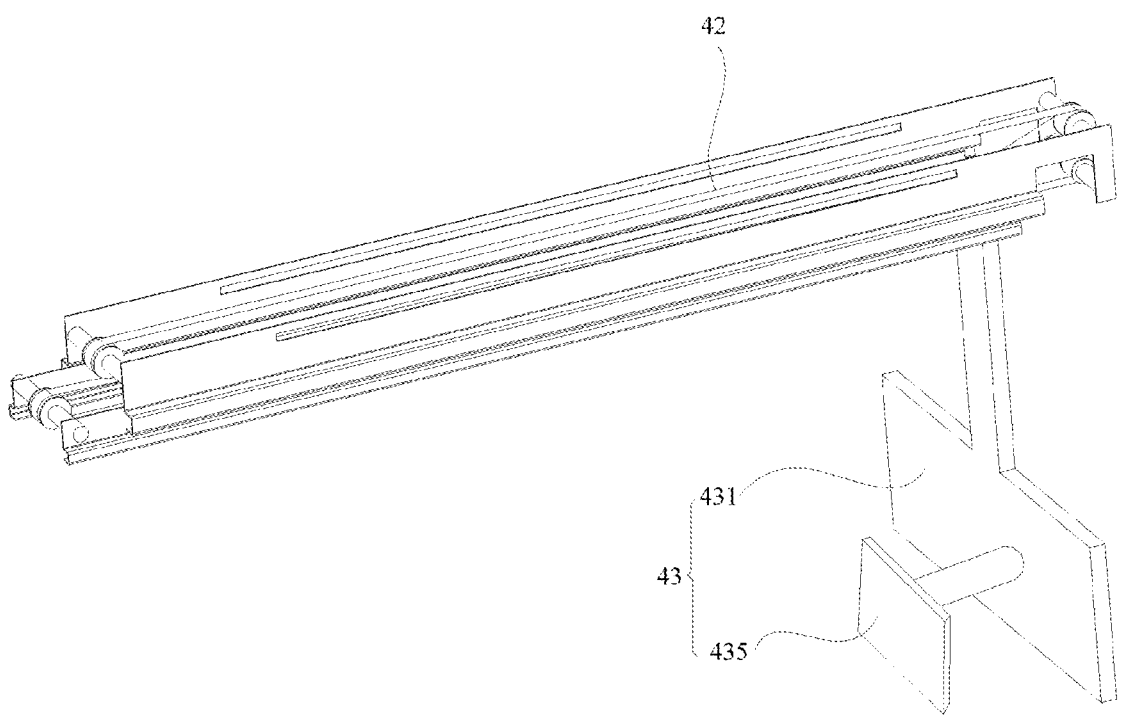
FIG. 71 is a schematic diagram of a second structure of a take-out assembly in a goods box take-out mechanism according to Embodiment V of this application.

FIG. 71 is a schematic diagram of a second structure of a take-out assembly in a goods box take-out mechanism according to Embodiment V of this application. In another optional embodiment, as shown in FIG. 71, the take-out assembly 43 includes a fixed bracket 431 disposed on the transmission assembly 42 and a magnet 435 mounted on the fixed bracket 431. The to-be-transferred goods box 9 is a metal goods box or a magnetic goods box, and the to-be-transferred goods box 9 is adsorbed by the magnetic adsorption force of the magnet 435. Alternatively, a partial structure of the to-be-transferred goods box 9 is made of a metal material or magnetic material; or an outer packaging box or a packing box of the to-be-transferred goods box 9 is made of a metal material or magnetic material; or a partial structure such as a frame of the outer packaging box or the packing box of the to-be-transferred goods box 9 is made of a metal material or magnetic material, as long as the to-be-transferred goods box 9 can be adsorbed on the magnet 435 by the magnetic adsorption force with the magnet 435. The magnet 435 may be an electromagnet 435, which has magnetism when energized, and adsorbs the to-be-transferred goods box 9 by magnetism. When the power is off, the magnetism disappears, and the magnet 435 is detached from the to-be-transferred goods box 9.

Figure 72:
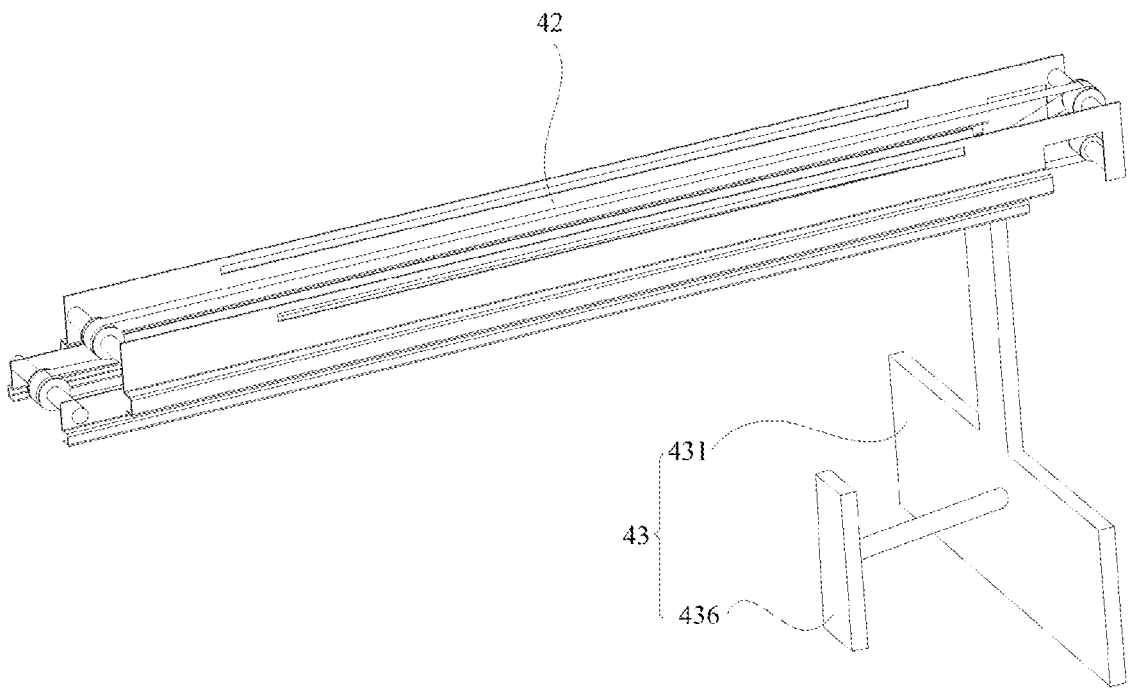
FIG. 72 is a schematic diagram of a third structure of a take-out assembly in a goods box take-out mechanism according to Embodiment V of this application.

FIG. 72 is a schematic diagram of a third structure of a take-out assembly 43 in a goods box take-out mechanism 4 according to Embodiment V of this application. In still another optional embodiment, as shown in FIG. 72, the take-out assembly 43 includes a fixed bracket 431 disposed on the transmission assembly 42 and a buckle 436 mounted on the fixed bracket 431. The front surface of the to-be-transferred goods box 9 has a slot matched with the buckle 436, and the take-out assembly 43 fixes the to-be-transferred goods box 9 through the buckle 436 engaged with the slot on the to-be-transferred goods box 9. In this embodiment, the to-be-transferred goods box 9 refers to a goods box having an outer packaging box or an outer packing box, and a front surface of the outer packaging box or the outer packing box has a slot matched with the buckle 436.

Figure 73:
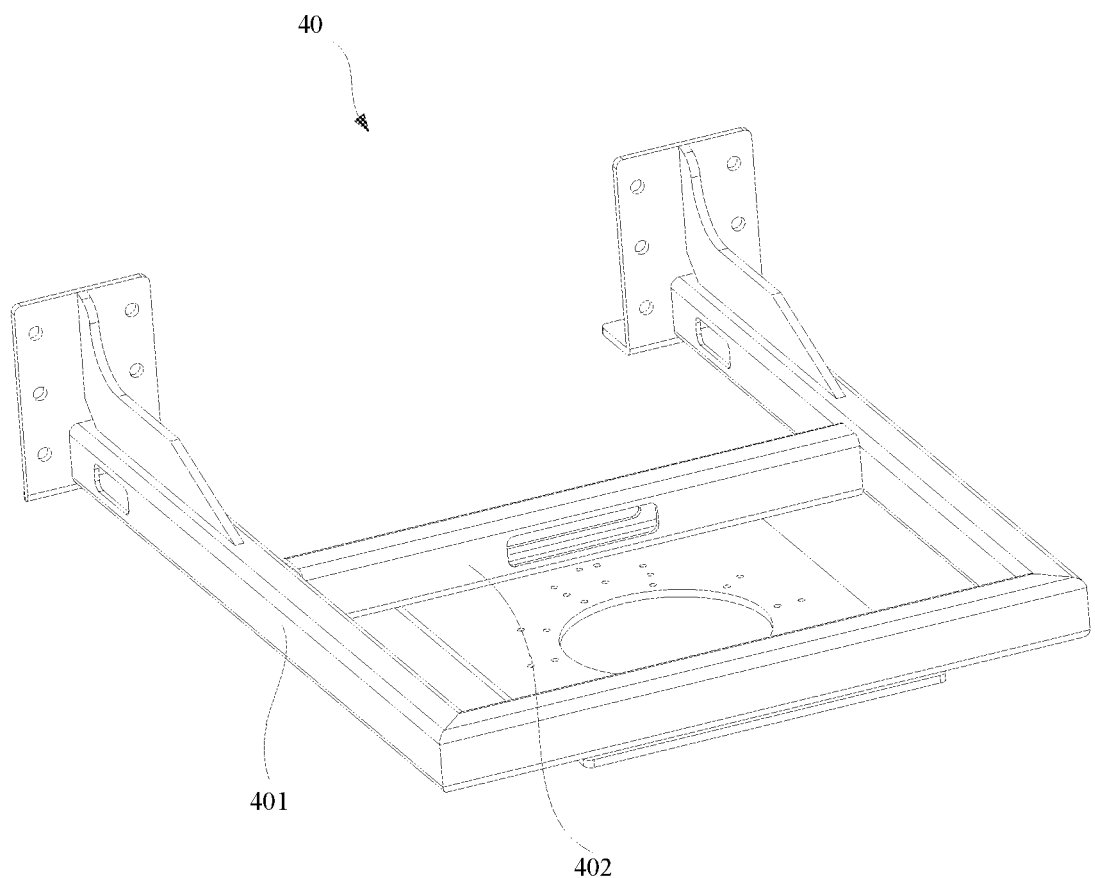
FIG. 73 is a schematic structural diagram of a mounting frame in a goods box take-out mechanism according to Embodiment V of this application.

FIG. 73 is a schematic structural diagram of a mounting frame in a goods box take-out mechanism according to Embodiment V of this application. Based on the foregoing embodiment, referring to FIG. 73, the mounting frame 40 includes two mounting plates 401 disposed oppositely, and the mounting frame 40 is mounted on the support beam 3 through the two mounting plates 401. In this way, the goods box take-out mechanism 4 can move up and down on the robot rack 2 along with the support beam 3, so that the goods box take-out mechanism 4 can take out the to-be-transferred goods box 9 placed on the warehousing shelving unit 8 at different heights.

Further, still referring to FIG. 73, the mounting frame 40 further includes a bearing beam 402 connecting the two mounting plates 401, and the rotary assembly 41 is mounted on the bearing beam 402.

Figure 74:
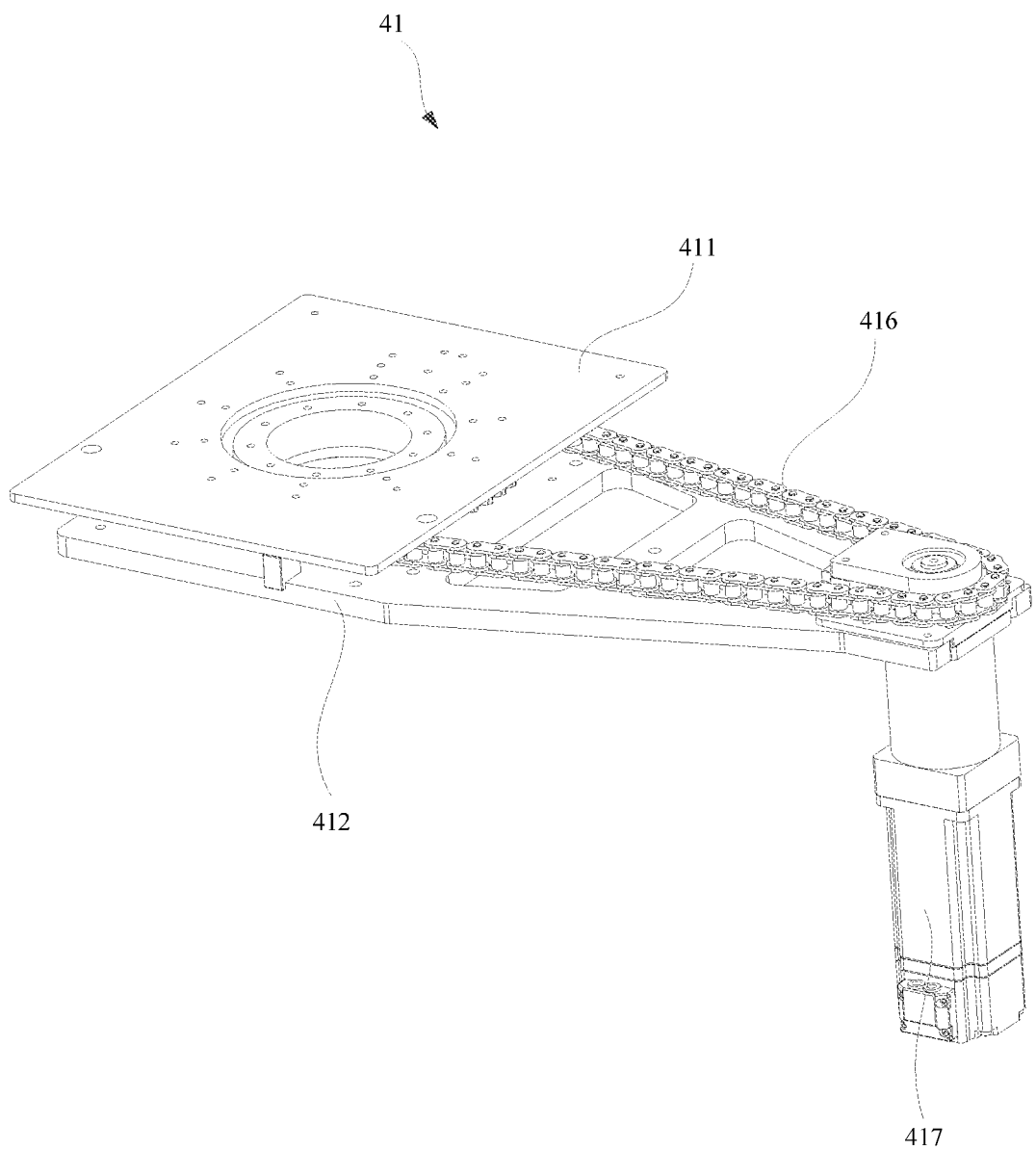
FIG. 74 is a schematic structural diagram of a rotary assembly in a goods box take-out mechanism according to Embodiment V of this application.
Figure 75:
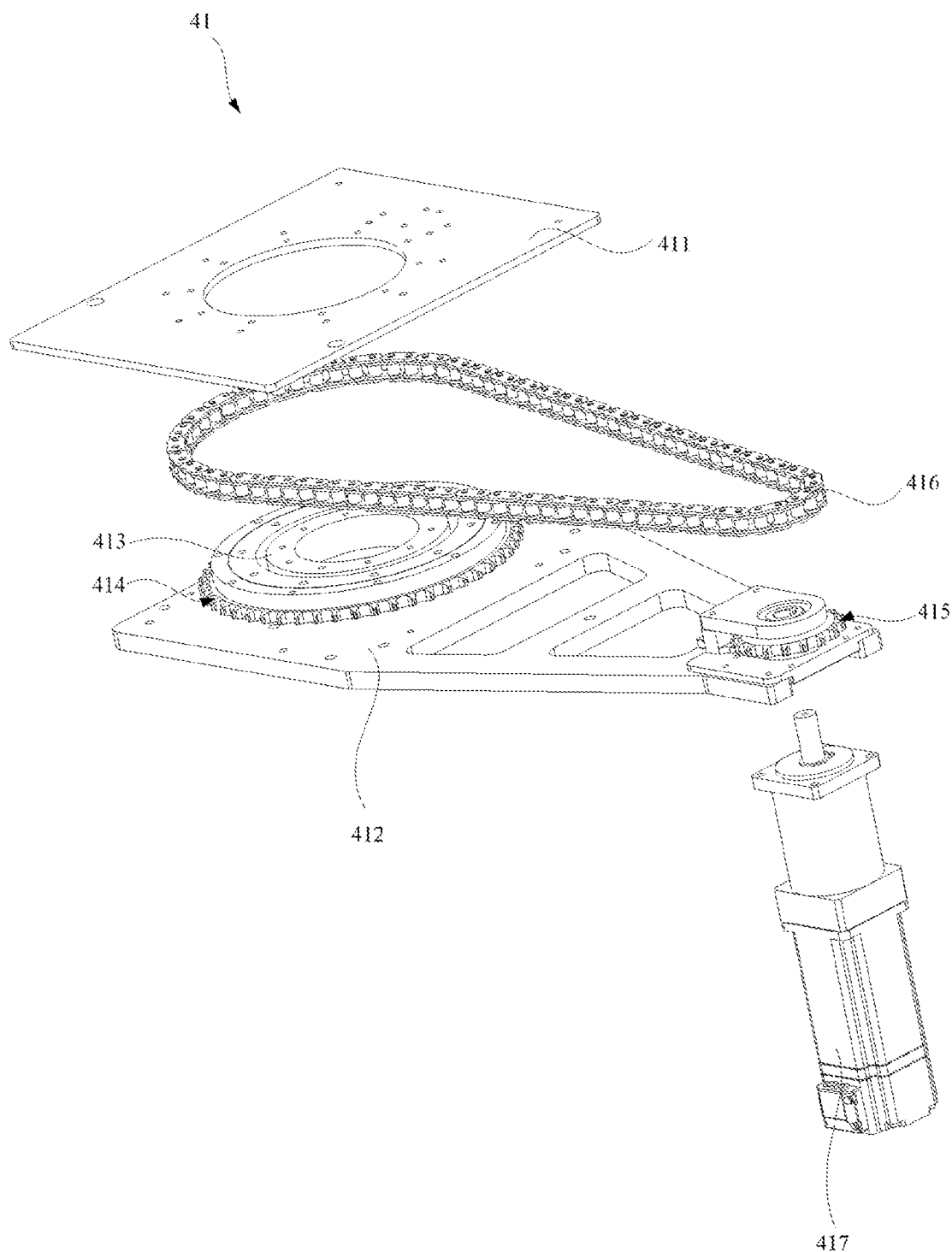
FIG. 75 is a schematic structural exploded view of FIG. 74.

FIG. 74 is a schematic structural diagram of a rotary assembly in a goods box take-out mechanism according to Embodiment V of this application. FIG. 75 is a schematic structural exploded view of FIG. 74. Referring to FIG. 74 and FIG. 75, optionally, the rotary assembly 41 includes a bearing plate 411 mounted on the bearing beam 402, a rotatory plate 412 spaced apart from the bearing plate 411, and a cross bearing 413 for connecting the bearing plate 411 and the rotatory plate 412; the cross bearing 413 is connected to a first sprocket 414; a second sprocket 415, a motor 417 that drives the second sprocket 415 to rotate, and the transmission assembly 42 are disposed on the rotatory plate 412; the first sprocket 414 and the second sprocket 415 are connected by a chain 416; when the motor 417 drives the second sprocket 415 to rotate, the second sprocket 415 drives the first sprocket 414 to rotate through the chain 416; and when the first sprocket 414 rotates, the transmission assembly 42 on the rotatory plate 412 is driven to rotate about an axis of the first sprocket 414.

For example, the bearing plate 411 has a through hole matching the cross bearing 413. One end of the cross bearing 413 is located in the through hole of the bearing plate 411 to position the rotary assembly 41, and the other end of the cross bearing 413 is provided with the first sprocket 414. The output shaft of the motor 417 is connected to the second sprocket 415. After the motor 417 starts, the motor 417 drives the second sprocket 415 to rotate, the second sprocket 415 drives the chain 416 to rotate, and the chain 416 drives the first sprocket 414 to rotate, so that the entire rotary assembly 41 rotates around the axis of the second sprocket 415, and the rotary assembly 41 drives the transmission assembly 42 and the take-out assembly 43 to rotate in a plane perpendicular to a lifting direction of the support beam 3.

Figure 76:
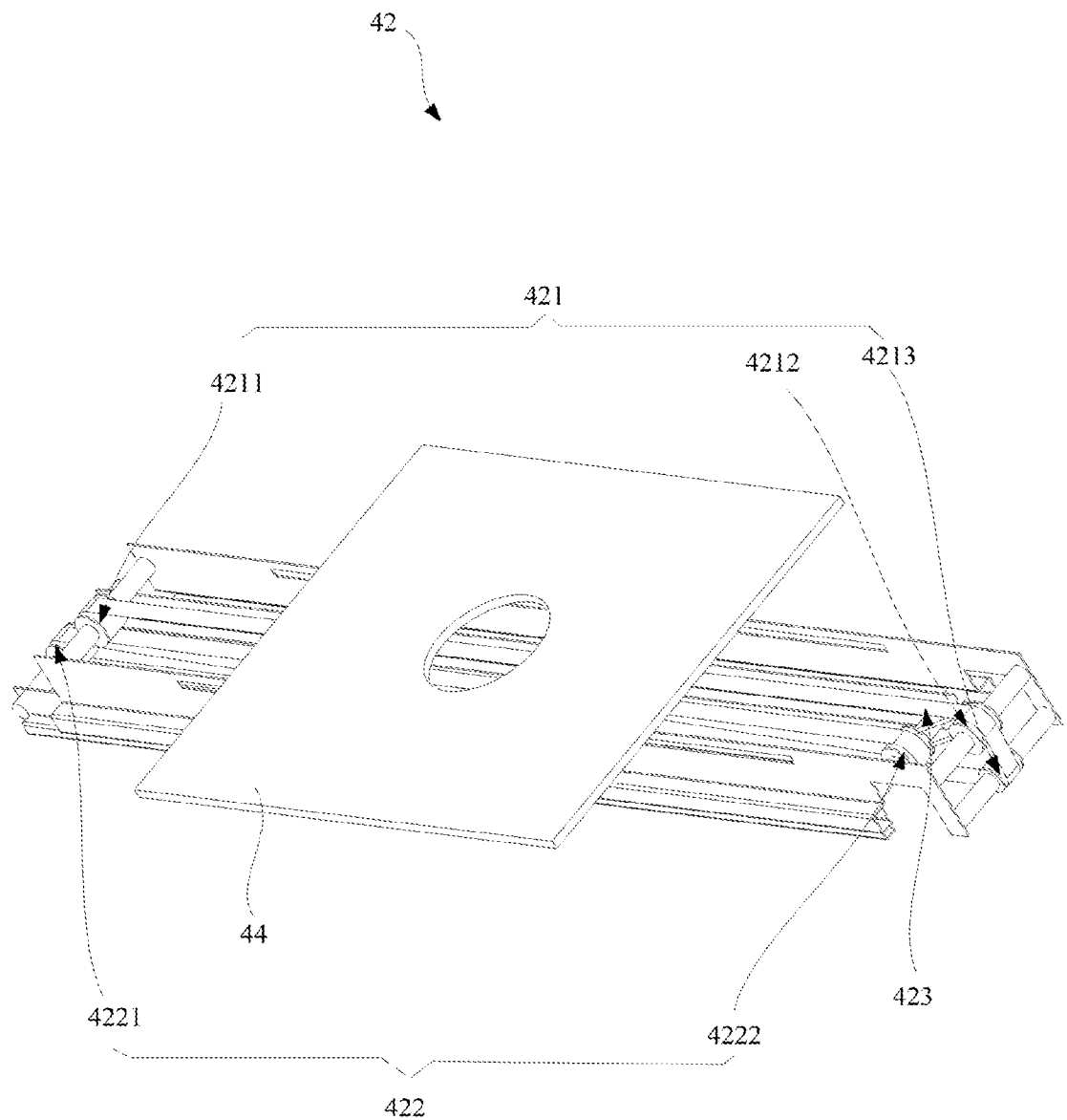
FIG. 76 is a schematic structural diagram of a transmission assembly in a goods box take-out mechanism according to Embodiment V of this application.
Figure 77:
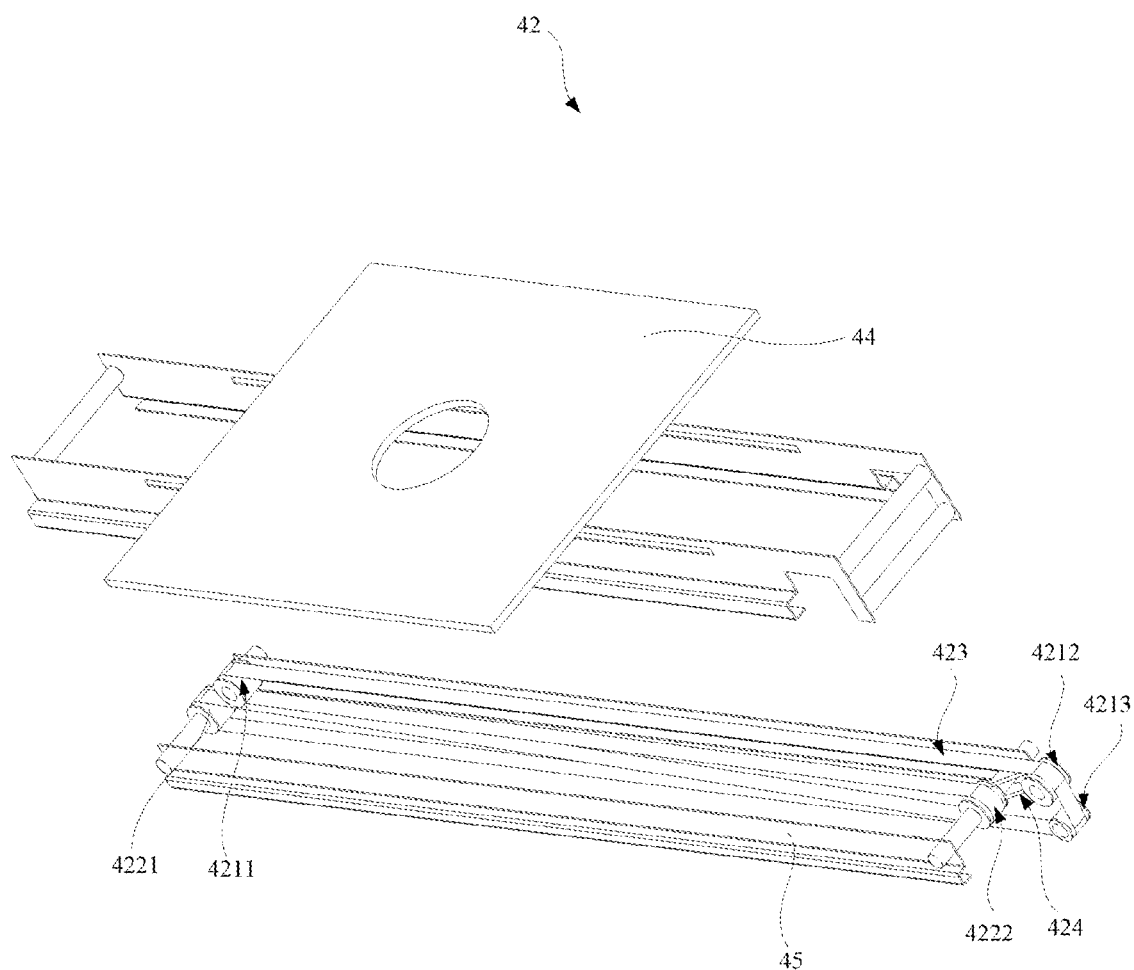
FIG. 77 is a schematic structural exploded view of FIG. 76.
Figure 78:
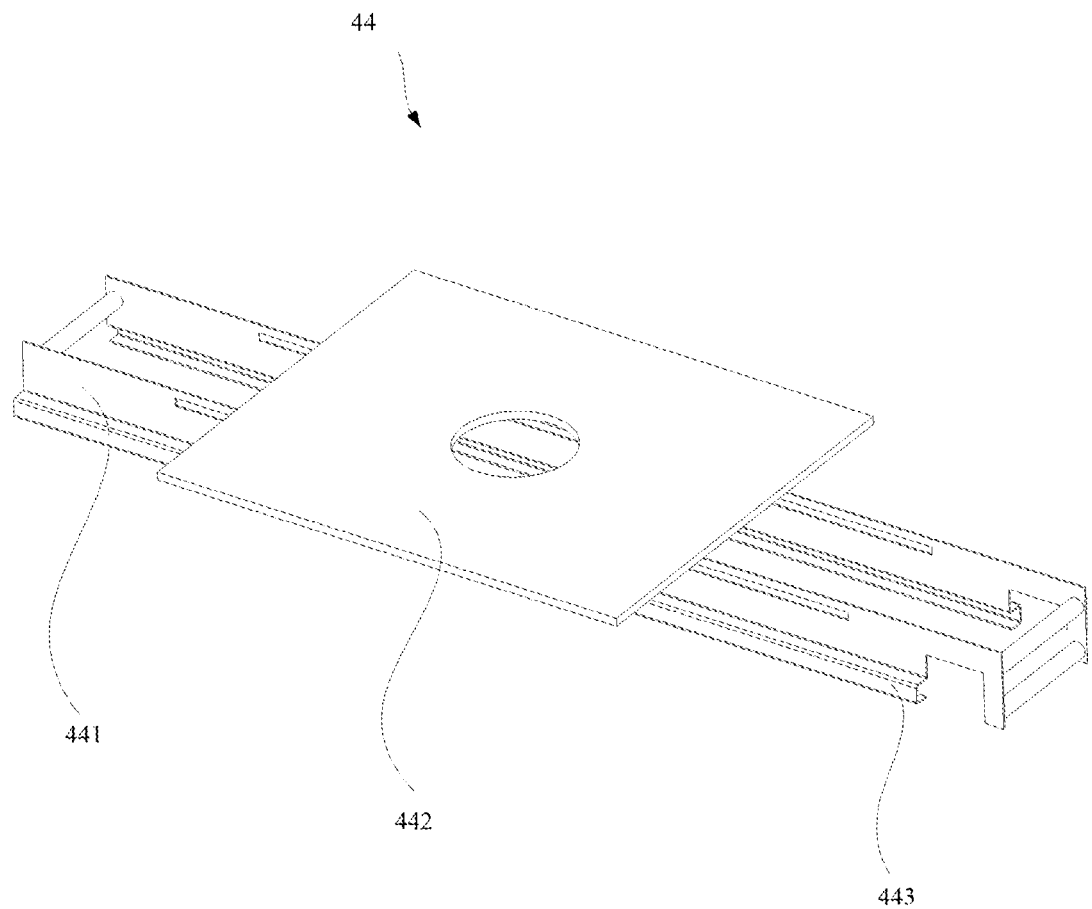
FIG. 78 is a schematic structural diagram of a pedestal in a transmission assembly according to Embodiment V of this application.
Figure 79:
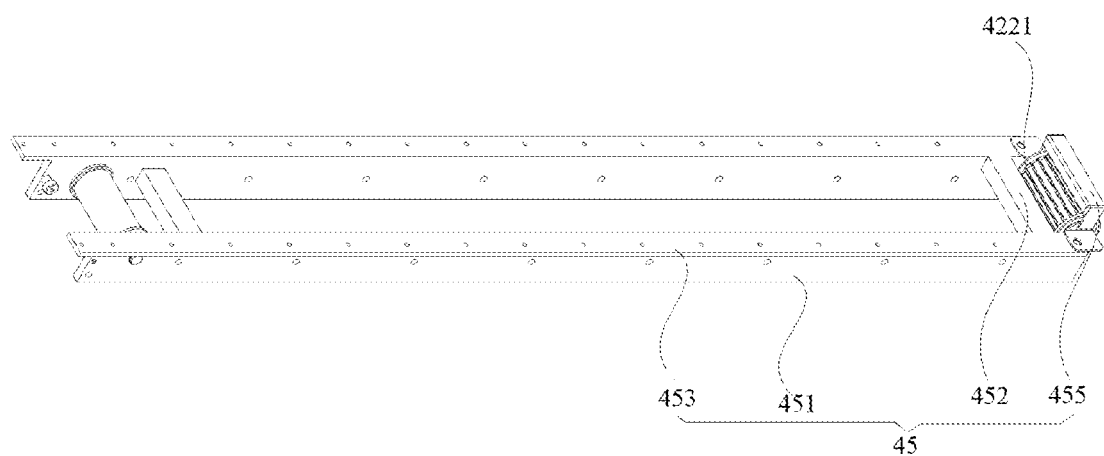
FIG. 79 is a schematic diagram of a first structure of a sliding seat in a transmission assembly according to Embodiment V of this application.
Figure 80:
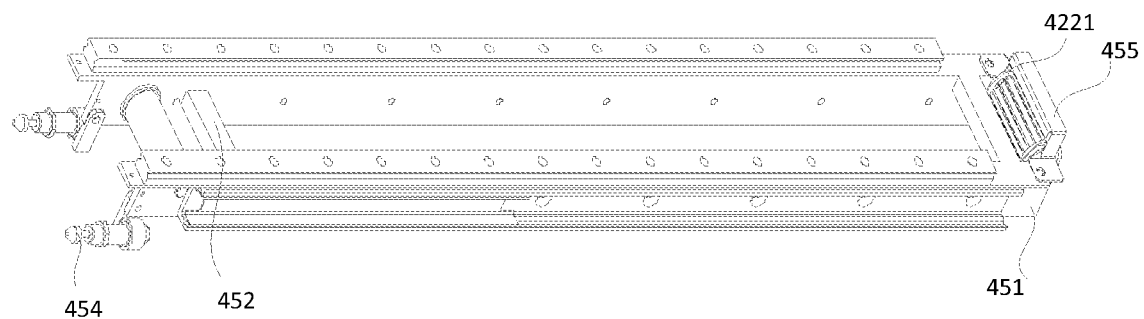
FIG. 80 is a schematic diagram of a second structure of a sliding seat in a transmission assembly according to Embodiment V of this application.
Figure 81:
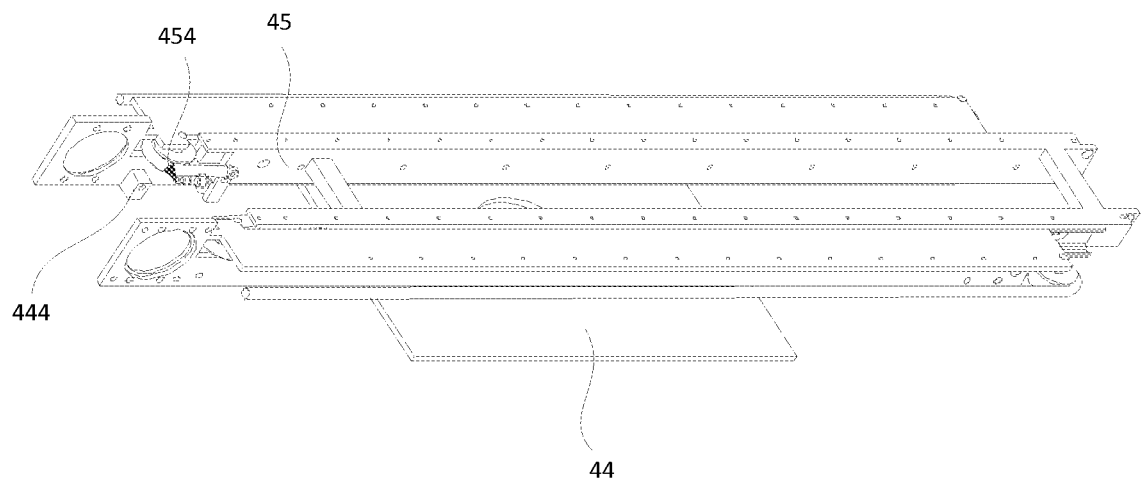
FIG. 81 is a schematic diagram of an assembly structure of a sliding seat mounted on a pedestal according to Embodiment V of this application.

FIG. 76 is a schematic structural diagram of a transmission assembly in a goods box take-out mechanism according to Embodiment V of this application. FIG. 77 is a schematic structural exploded view of FIG. 76. FIG. 78 is a schematic structural diagram of a pedestal in a transmission assembly according to Embodiment V of this application. FIG. 79 is a schematic diagram of a first structure of a sliding seat in a transmission assembly according to Embodiment V of this application. FIG. 80 is a schematic diagram of a second structure of a sliding seat in a transmission assembly according to Embodiment V of this application. FIG. 81 is a schematic diagram of an assembly structure of a sliding seat mounted on a pedestal according to Embodiment V of this application. Based on the foregoing embodiment, referring to FIG. 76 to FIG. 81, to implement that the transmission assembly 42 drives the take-out assembly 43 to move toward or away from the front surface of the to-be-transferred goods box 9: The transmission assembly 42 includes a pedestal 44 mounted on the rotary assembly 41, a fixed wheel assembly 421, a movable wheel assembly 422, and a transmission belt 423.

It should be noted that, the first direction is perpendicular to the second direction, and the second direction is a moving direction in which the take-out assembly 43 moves toward or away from the front surface of the to-be-transferred goods box 9. The front end of the pedestal 44 refers to the end that is consistent with the second direction and is close to the front surface of the to-be-transferred goods box 9, and the end far from the front surface of the to-be-transferred goods box 9 is the rear end of the pedestal 44. The front end of the sliding seat 45 is consistent with the front end of the pedestal 44, and the rear end of the sliding seat 45 is consistent with the rear end of the pedestal 44.

The fixed wheel assembly 421 includes a first fixed wheel 4211, a second fixed wheel 4212, and a third fixed wheel 4213. The first fixed wheel 4211 is mounted at the front end of the pedestal 44, and the second fixed wheel 4212 and the third fixed wheel 4213 are mounted at the rear end of the pedestal 44 at an interval along the first direction. That is, the first fixed wheel 4211, the second fixed wheel 4212, and the third fixed wheel 4213 form a shape of a triangle, so that mounting space for the movable wheel assembly 422 is formed among the second fixed wheel 4212, the third fixed wheel 4213, and the first fixed wheel 4211.

The front end of the pedestal 44 may be provided with a wheel shaft, the first fixed wheel 4211 is mounted on the wheel shaft, and the first fixed wheel 4211 can rotate on the wheel shaft. Two wheel shafts are mounted at the rear end of the pedestal 44 at an interval along the first direction. The second fixed wheel 4212 and the third fixed wheel 4213 are respectively mounted on the upper and lower wheel shafts, and the second fixed wheel 4212 and the third fixed wheel 4213 can rotate relative to the respective wheel shafts.

The movable wheel assembly 422 includes a sliding seat 45 mounted on the pedestal 44, a first movable wheel 4221, and a second movable wheel 4222, the first movable wheel 4221 is mounted at a front end of the sliding seat 45, and the second movable wheel 4222 is mounted at a rear end of the sliding seat 45. The front end of the sliding seat 45 refers to the end facing the to-be-transferred goods box 9, and the rear end of the sliding seat 45 refers to the end opposite to the front end of the sliding seat 45.

The front end of the sliding seat 45 is provided with a limiting structure 455, the rear end of the sliding seat 45 is connected to a reset mechanism 424, and the transmission belt 423 is sequentially wound around the second fixed wheel 4212, the first movable wheel 4221, the second movable wheel 4222, the first fixed wheel 4211, and the third fixed wheel 4213. When the take-out assembly 43 is driven by the transmission belt 423 to move to the limiting structure 455 in the second direction, the take-out assembly 43 abuts against the limiting structure 455. The transmission belt 423 drives the take-out assembly 43 to continue to move forward. The take-out assembly 43 pushes the limiting structure 455 on the sliding seat 45, so that the limiting structure 455 drives the movable wheel assembly 422 to move together with the take-out assembly 43 in the second direction. In this way, the path along which the take-out assembly 43 can move in the second direction is longer, avoiding the problem that the to-be-transferred goods box 9 cannot be taken out due to the short moving path. When the transmission belt 423 is driven in an opposite direction, the reset mechanism 424 is configured to reset the movable wheel assembly 422, and after the movable wheel assembly 422 is reset, the transmission belt 423 drives the take-out assembly 43 to reset.

For example, the limiting structure 455 may be a limiting plate, where two ends of the limiting plate are respectively fixed at the rear end of the pedestal 44. The reset mechanism 424 may be a spring, where one end of the spring is connected to wheel shaft of the second movable wheel 4222 at the rear end of the sliding seat 45, and the other end of the spring is connected to the wheel shaft of the second fixed wheel 4212 at the rear end of the pedestal 44.

It should be noted that, the second fixed wheel 4212 may be used as a driving wheel of the transmission assembly 42. The transmission assembly 42 further includes a motor 417, where an output shaft of the motor 417 is connected to the second fixed wheel 4212, and the second fixed wheel 4212 rotates to drive the transmission belt 423 wound around the second fixed wheel 4212 to move. The transmission belt 423 drives the first movable wheel 4221, the second movable wheel 4222, the first fixed wheel 4211, and the third fixed wheel 4213 to rotate.

In a specific implementation, the take-out assembly 43 is mounted on the transmission belt 423, and the take-out assembly 43 is driven by the transmission belt 423 to move toward the front surface of the to-be-transferred goods box 9 in the second direction. When the take-out assembly 43 moves to the limiting structure 455 at the front end of the sliding seat 45, the take-out assembly 43 abuts against the limiting structure 455. The transmission belt 423 drives the take-out assembly 43 to continue to move toward the front surface of the to-be-transferred goods box 9. The take-out assembly 43 pushes the limiting structure 455 to drive the movable wheel assembly 422 to move forward together. In this case, the spring connected to the second movable wheel 4222 and the second fixed wheel 4212 starts to be stretched. When the take-out assembly 43 moves to the front surface of the to-be-transferred goods box 9 and is connected to the front surface of the to-be-transferred goods box 9, the motor 417 starts to reverse, the transmission belt 423 rotates in the opposite direction, the take-out assembly 43 drives the to-be-transferred goods box 9 to rotate in the opposite direction along with the transmission belt 423, and a power assembly also moves in the opposite direction under the tension of the spring until the spring is in the free stretching state. The movable wheel assembly 422 resets and then stops moving, and the transmission belt 423 drives the take-out assembly 43 to continue to move in the opposite direction until the take-out assembly 43 is reset.

Referring to FIG. 78, specifically, the pedestal 44 includes two support plates 441 disposed oppositely and a bottom connecting plate 442 disposed between the two support plates 441 and connected to the two support plates 441 respectively, where the first fixed wheel 4211 is mounted at a front end of the bottom connecting plate 442, and the second fixed wheel 4212 and the third fixed wheel 4213 are mounted at a rear end of the bottom connecting plate 442 at an interval along the first direction.

Referring to FIG. 78, the sliding seat 45 includes two sliding plates 451 disposed oppositely and a fixed connecting plate 452 connecting the two sliding plates 451. The first movable wheel 4221 is mounted at a front end of the fixed connecting plate 452, and the second movable wheel 4222 is mounted at a rear end of the fixed connecting plate 452.

Referring to FIG. 78 and FIG. 79, optionally, sliding rails 453 are disposed on the sides of the two sliding plates 451 facing the two support plates 441, and guide blocks 443 matching the sliding rails 453 are disposed on the two support plates 441, where sliding grooves are provided on the guide blocks 443, so that the sliding seat 45 can move in the sliding grooves through the sliding rails 453 on the two sliding plates 451.

Referring to FIG. 80 and FIG. 81, further, to reduce the impact force between the sliding seat 45 and the pedestal 44 during reset, in this embodiment, Buffers 454 may be disposed at the rear ends of the two sliding plates 451 of the sliding seat 45, and collision blocks 444 facing the buffers 454 may be disposed at the rear ends of the two support plates 441 of the pedestal 44. When the sliding seat 45 moves to the rear end of the pedestal 44 in the second direction, the collision blocks 454 on the sliding plates 451 first collide with the collision blocks 444 on the support plates 441. Since the buffers 454 have a buffering capability, the buffers 454 can reduce the impact force between the sliding seat 45 and the pedestal 44, thereby reducing the shock to the goods box take-out mechanism 4. In addition, the collision blocks 444 are disposed on the pedestal 44, which can further limit the sliding seat 45 to prevent the sliding seat 45 from moving to the rear end of the pedestal 44 and continuing to move backward with the transmission belt 423, causing the sliding seat 45 to slip off from the pedestal 44.

Figure 82:
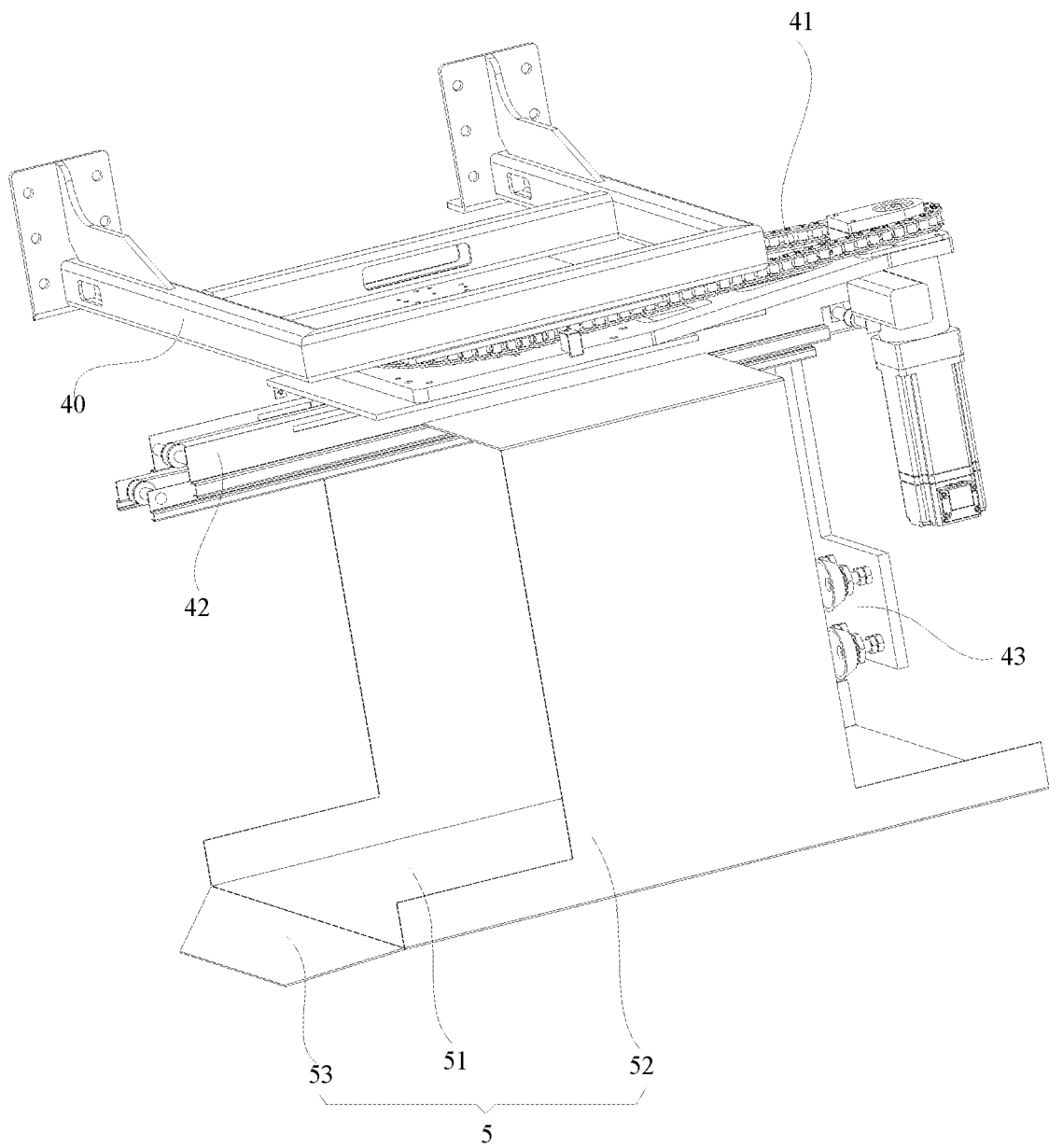
FIG. 82 is a schematic diagram of a second structure of a goods box take-out mechanism according to Embodiment V of this application.

FIG. 82 is a schematic diagram of a second structure of a goods box take-out mechanism according to Embodiment V of this application. Referring to FIG. 82, the goods box take-out mechanism 4 further includes a tray 5 mounted on the pedestal 44, where the tray 5 is located below the take-out assembly 43, and the tray 5 is configured to carry the to-be-transferred goods box 9 taken out by the take-out assembly 43.

The tray 5 includes a tray body 51, and extension portions 52 respectively connected to the pedestal 44 are disposed on two sides of the tray body 51. That is, the tray body 51 is mounted on the pedestal 44 through the two extension portions 52 disposed on the two sides of the tray body 51. The to-be-transferred goods box 9 taken out by the take-out assembly 43 is carried by the tray body 51 disposed between the two extension portions 52.

In an optional embodiment, a guide surface 53 is disposed on the surface of the front end of the tray body 51 and away from the pedestal 44. The guide surface 53 extends obliquely downward toward the ground.

Specifically, since there may be errors in the first direction between the tray body 51 and the warehousing shelving unit 8, stagnation may occur between the to-be-transferred goods box 9 and the tray 5 when the take-out assembly 43 transfers the to-be-transferred goods box 9. Therefore, a guide surface 53 may be disposed at the front end of the tray body 51 and away from the surface of the pedestal 44. The guide surface 53 may extend obliquely downward toward the ground. In this way, when the take-out assembly 43 takes out the to-be-transferred goods box 9, the to-be-transferred goods box 9 can be smoothly moved to the tray body 51 through the guide surface 53, to avoid that the to-be-transferred goods box 9 is stuck when moving to the tray body 51.

Figure 83:
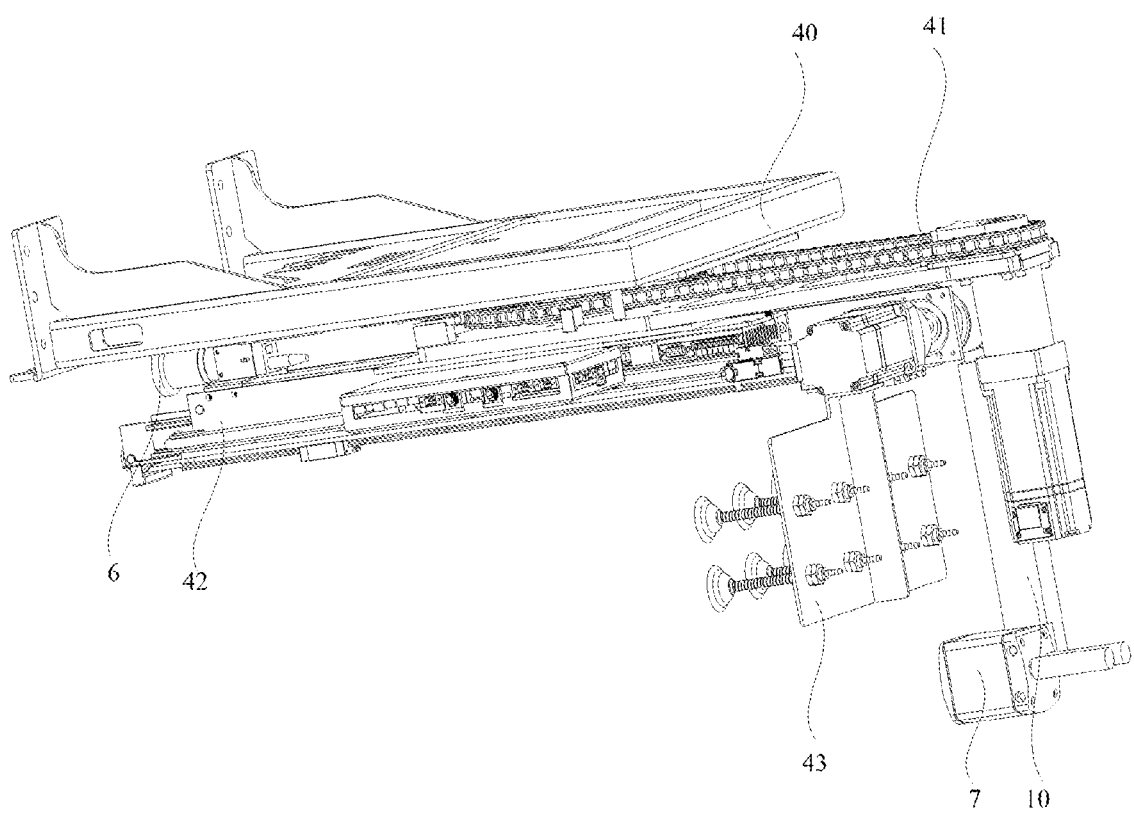
FIG. 83 is a schematic diagram of a third structure of a goods box take-out mechanism according to Embodiment V of this application.

FIG. 83 is a schematic diagram of a third structure of a goods box take-out mechanism according to Embodiment V of this application.

Based on the foregoing embodiment, referring to FIG. 83, to realize full automation and multi-functionality of the transport robot, the transport robot further includes a first camera, where the first camera 6 is mounted on a side of the goods box take-out mechanism 4 facing the to-be-transferred goods box 9, and the first camera 6 is configured to obtain an identification code on the to-be-transferred goods box 9.

Specifically, to enable the first camera 6 to easily obtain the identification code on the to-be-transferred goods box 9, the first camera 6 may be disposed at the front end of the pedestal 44. In this way, when the goods box take-out mechanism 4 is close to the to-be-transferred goods box 9, the first camera 6 can directly scan the identification code on the to-be-transferred goods box 9. The identification code may be a barcode, a two-dimensional code, or the like that records relevant information of the to-be-transferred goods box 9. There is no need to manually register the information of the to-be-transferred goods box 9, thereby improving the carrying efficiency of the transport robot.

Still referring to FIG. 83, further, to enable the transport robot to quickly carry and pick goods boxes, a second camera 7 may be further disposed on the transport robot, and the second camera 7 is mounted on the pedestal 44 through a column 10. In this way, the second camera 7 may be located at a higher position, so that three-dimensional shape information such as the size, the appearance, and the shape of the to-be-transferred goods box 9 can be acquired in an all-round way, and position information of the to-be-transferred goods box 9 on the warehousing shelving unit 8 can be acquired, implementing rapid picking and grabbing positioning, and further improving the carrying efficiency.

The transport robot provided in the embodiments of this application includes a movable base, a robot rack, a support beam, and a goods box take-out mechanism. The support beam is mounted on the robot rack. The goods box take-out mechanism is mounted on the support beam and located below the support beam. When the goods box take-out mechanism moves up and down with the support beam to the height of the to-be-transferred goods box, the goods box take-out mechanism is connected to the front of the to-be-transferred goods box to transfer the to-be-transferred goods box. The transport robot provided in this application can improve the utilization of the warehousing space and the versatility of the transport robot.

An embodiment of this application further provides a goods box take-out mechanism, including: a mounting frame, a rotary assembly, a transmission assembly, and a take-out assembly. The take-out assembly, the transmission assembly, the rotary assembly, and the mounting frame are sequentially mounted on the mounting frame from bottom to top along a lifting direction of the support beam; the mounting frame is mounted on the support beam; and the rotary assembly is configured to drive the transmission assembly and the take-out assembly to rotate in a plane perpendicular to a lifting direction of the support beam. The transmission assembly is configured to drive the take-out assembly to move toward or away from a front surface of a to-be-transferred goods box; and the take-out assembly is configured to be connected to the front surface of the to-be-transferred goods box to transfer the to-be-transferred goods box. The goods box take-out mechanism further includes a tray mounted on the pedestal, where the tray is located below the take-out assembly and configured to carry the to-be-transferred goods box taken out by the take-out assembly.

The goods box take-out mechanism provided in the embodiments of this application is the goods box take-out mechanism provided in Embodiment V. The working principle and the structure of the goods box take-out mechanism are described in Embodiment V, and the details are not repeated in this embodiment.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A goods box take-out device, comprising: a pedestal, a transmission mechanism, and a take-out assembly, wherein
    the take-out assembly is configured to be connected to a front surface of a to-be-transferred goods box to transfer the goods box; the transmission mechanism comprises a fixed wheel assembly, a movable wheel assembly, and a transmission belt, and the fixed wheel assembly comprises at least two fixed wheels mounted apart on the pedestal; the movable wheel assembly comprises a sliding seat slidably mounted on the pedestal and at least two movable wheels mounted apart on the sliding seat; and along a moving direction of the sliding seat toward the goods box, the sliding seat is provided with a first limiting structure at a front end of the sliding seat, and a rear end of the sliding seat is connected to a reset mechanism; and
    the take-out assembly is disposed on the transmission belt; the transmission belt is wound around each of the movable wheels and each of the fixed wheels; when the take-out assembly is driven by the transmission belt to move toward the goods box and move to the first limiting structure, the transmission belt drives the take-out assembly and the movable wheel assembly to move toward the goods box together; and when the transmission belt is driven in an opposite direction, the reset mechanism is configured to reset the movable wheel assembly, and after the movable wheel assembly is reset, the transmission belt drives the take-out assembly to reset.

2. The goods box take-out device according to claim 1, wherein the pedestal comprises two support plates disposed oppositely and a bottom connecting plate connecting the two support plates; and
    each of the fixed wheels is mounted between the two support plates.

3. The goods box take-out device according to claim 2, wherein the fixed wheel assembly comprises a first fixed wheel and a second fixed wheel;
    the first fixed wheel is mounted between the two support plates and located at front ends of the support plates, and the second fixed wheel is mounted between the two support plates and located at rear ends of the support plates; and
    mounting space for the movable wheel assembly is formed between the first fixed wheel and the second fixed wheel.

4. The goods box take-out device according to claim 2, wherein the movable wheel assembly comprises a first movable wheel and a second movable wheel mounted on the sliding seat;
    the sliding seat comprises two mounting plates disposed oppositely and a connecting plate disposed between the two mounting plates; and
    the first movable wheel is mounted between the two mounting plates and located at front ends of the mounting plates, and the second movable wheel is mounted between the two mounting plates and located at rear ends of the mounting plates.

5. The goods box take-out device according to claim 4, wherein a first buffer is disposed at the rear end of each of the mounting plates, and a collision block directly opposite to the first buffer is disposed at rear end of each of the support plates.

6. The goods box take-out device according to claim 4, wherein the reset mechanism is an elastic element, one end of the elastic element is connected to the rear end of the sliding seat, and an other end of the elastic element is connected to a rear end of the pedestal.

7. The goods box take-out device according to claim 4, wherein the take-out assembly comprises a fixed bracket and a plurality of suction cups;
   the plurality of suction cups are mounted on the fixed bracket, and suction surfaces of the suction cups are opposite to the front surface of the goods box; and
   the fixed bracket is connected to the transmission belt and moves along with the transmission belt.

8. The goods box take-out device according to claim 7, wherein a tray is further provided on the pedestal, and the tray comprises a first supporting plate and a second supporting plate disposed oppositely;
   the first supporting plate and the second supporting plate are respectively mounted on the two support plates, and a passage for movement of the fixed bracket is formed between the first supporting plate and the second supporting plate; and
   an end of the fixed bracket away from the transmission belt is located above the tray.

9. A transport robot, comprising a robot body and the goods box take-out device according to claim 1, wherein the goods box take-out device is mounted on the robot body.

10. A goods box take-out method using the transport robot according to claim 9, wherein the transport robot comprises a goods box take-out device; the goods box take-out device comprises a pedestal, a transmission mechanism, and a take-out assembly; the take-out assembly is configured to be connected to a front surface of a to-be-transferred goods box to transfer the goods box; the transmission mechanism comprises a fixed wheel assembly, a movable wheel assembly, and a transmission belt; the movable wheel assembly comprises a sliding seat slidably mounted on the pedestal; along a moving direction of the sliding seat toward the goods box, the sliding seat is provided with a first limiting structure at a front end of the sliding seat, and a rear end of the sliding seat is connected to a reset mechanism; and the method comprises the following steps:
   the transport robot with the goods box take-out device moving to be in front of a warehousing shelving unit where the to-be-transferred goods box is located;
   driving, by using the transmission mechanism, the take-out assembly to move toward the front surface of the goods box;
   driving, by the transmission mechanism when the take-out assembly moves to the first limiting structure, the movable wheel assembly and the take-out assembly to move toward the front surface of the goods box together;
   connecting, after the take-out assembly is in contact with the front surface of the goods box, the take-out assembly to the front surface of the to-be-transferred goods box to transfer the goods box;
   driving, by the reset mechanism when the transmission mechanism drives the take-out assembly to move in an opposite direction, the movable wheel assembly to reset; and
   continuously driving, by the transmission mechanism after the movable wheel assembly is reset, the take-out assembly to move in the opposite direction and reset.

* * * * *